(12) United States Patent
Brandl et al.

(10) Patent No.: US 6,834,370 B1
(45) Date of Patent: Dec. 21, 2004

(54) METHOD FOR CREATING MASTER RECIPES

(75) Inventors: Dennis Brandl, Cary, NC (US); Ray Hall, Scottsdale, AZ (US); Xiaojin Xi, Phoenix, AZ (US)

(73) Assignee: OSI Software, Inc., San Leandro, CA (US)

( * ) Notice: Subject to any disclaimer, the term of this patent is extended or adjusted under 35 U.S.C. 154(b) by 0 days.

(21) Appl. No.: 09/350,036

(22) Filed: Jul. 8, 1999

(51) Int. Cl.[7] ............................................. G06F 17/21
(52) U.S. Cl. ...................................... 715/500; 715/530
(58) Field of Search ................................ 715/500, 530, 715/531; 700/96, 97, 121

(56) References Cited

U.S. PATENT DOCUMENTS

| | | | |
|---|---|---|---|
| 4,607,256 A | 8/1986 | Henzel | |
| 4,796,194 A | 1/1989 | Atherton | |
| 4,807,108 A | 2/1989 | Ben-Arieh et al. | |
| 5,014,207 A | 5/1991 | Lawton | |
| 5,325,287 A | 6/1994 | Spahr et al. | |
| 5,469,361 A | 11/1995 | Moyne | |
| 5,485,620 A | 1/1996 | Sadre et al. | |
| 5,499,188 A | 3/1996 | Kline, Jr. et al. | |
| 5,546,301 A | 8/1996 | Agrawal et al. | |
| 5,576,946 A | 11/1996 | Bender et al. | |
| 5,591,299 A | 1/1997 | Seaton et al. | |
| 5,751,580 A | * | 5/1998 | Chi ............................. 700/101 |
| 5,777,876 A | * | 7/1998 | Beauchesne ................. 700/95 |
| 5,841,660 A | * | 11/1998 | Robinson et al. ........... 700/115 |
| 5,867,382 A | 2/1999 | McLaughlin | |
| 5,875,108 A | 2/1999 | Hoffberg et al. | |
| 5,903,455 A | 5/1999 | Sharpe, Jr. et al. | |
| 6,122,556 A | 9/2000 | Tochiori et al. | |
| 6,148,239 A | 11/2000 | Funk et al. | |
| 6,415,192 B1 | * | 7/2002 | Satoguchi .................... 700/96 |
| 6,415,193 B1 | * | 7/2002 | Betawar et al. .............. 700/97 |
| 6,424,878 B1 | * | 7/2002 | Barker et al. ............... 700/121 |
| 6,438,441 B1 | * | 8/2002 | Jang et al. .................. 700/121 |
| 6,442,446 B1 | * | 8/2002 | Nakamura et al. .......... 700/121 |
| 6,453,210 B1 | * | 9/2002 | Belotserkovskiy et al. ... 700/96 |
| 6,470,227 B1 | * | 10/2002 | Rangachari et al. .......... 700/95 |

FOREIGN PATENT DOCUMENTS

| | | |
|---|---|---|
| EP | 0331478 | 9/1989 |
| EP | 0740 241 | 10/1996 |
| EP | 0915507 | 5/1999 |

* cited by examiner

*Primary Examiner*—Stephen S. Hong
(74) *Attorney, Agent, or Firm*—Fenwick & West LLP

(57) ABSTRACT

A method is provided for automatically creating a set of master recipes from a general recipe using site information. Each master recipe includes a plurality of recipe segments. The general recipe includes a plurality of process actions. Each master recipe is for manufacturing at least one product from at least one input material by performing the process actions on the at least one input material. Each master recipe is for use with a specific set of equipment in a process cell. Each process action has one or more corresponding recipe segments that implement the process action on the set of equipment. The general recipe describes how to manufacture the at least one product from the at least one input material by performing the process actions on the at least one input material. The general recipe is independent of equipment. The method includes a first step of creating a list of recipe segments from the general recipe and the site information. The list of recipe segments includes each process action in the general recipe and a listing of all the corresponding recipe segments for that process action which can perform that process action in the process cell. The method includes a second step of creating the set of master recipes from the list of recipe segments, the general recipe, and the site information.

127 Claims, 64 Drawing Sheets

| General Recipe Procedure | Master Recipe Procedure |
|---|---|
| | 1. Open purge valve PV1 to unit U1. |
| | 2. Activate purge pump PP1. |
| | 3. Deactivate discharge pump PP1 after 5 minutes. |
| | 4. Close discharge valve PV1. |
| 1. Add 0.5 lbs material A per pound product C required. | 5. Open inlet valve IV1A to unit U1. (to material A) |
| | 6. Read unit U1 weight on load cell LC1, store initial weight 1. |
| | 7. Activate inlet pump IP1A. (to material A) |
| | 8. Read load cell LC1, when |
| | weight - initial weight 1 = 0.5 X lbs product reqd., deactivate IP1A. |
| | 9. Close inlet valve IV1A. |
| 2. Add 0.5 lbs material B per pound product C required. | 10. Open inlet valve IV1B to unit U1. (to material B) |
| | 11. Read weight on load cell LC1, store initial weight 2. |
| | 12. Activate inlet pump IP1B. (to material B) |
| | 13. Read load cell LC1, when |
| | weight - initial weight 2 = 0.5 X lbs product reqd., deactivate IP1B. |
| | 14. Close inlet valve IV1B. |
| 3. Mix for 30 minutes at 1/2 turn over of material per minute. | 15. Activate mixer M1 on unit U1 at 15 rpm. |
| | 16. Deactivate mixer M1 after 30 minutes. |
| | 17. Open flow valve FV1/2 from unit U1 to unit U2. |
| | 18. Read unit U2 weight on load cell LC2, store initial weight 3. |
| | 19. Activate flow pump FP1/2 (from unit U1 to unit U2). |
| | 20. Read load cell LC2, when |
| | weight - initial weight 3 = 1 X lbs product reqd., deactivate FP1/2. |
| | 21. Close flow valve FV1/2. |
| | 22. Read unit U1 weight on load cell LC1, verify weight = initial weight 1, |
| | else activate alarm A1 to operator. |
| 4. Heat mixture for 45 minutes at 90 degrees C. | 23. Activate heater H2 on unit U2. |
| | 24. Monitor temperature sensor TS2 on U2, |
| | using H2, control TS2 to 90 degrees C for 45 minutes. |
| 5. Allow product to cool to < 40 degrees C. | 25. Deactivate HS2, monitor TS2, when temp. < 40 degrees C, |
| | open discharge valve DV2C to tank C. |
| 6. Discharge 1 pound product C. | 26. Activate discharge pump DP2C to tank C. |
| | 27. Monitor unit 2 load cell LC2, when weight = initial weight 3, |
| | deactivate discharge pump DP2C. |
| | 28. Close valve DV2C. |
| | 29. Open purge valve PV2 to unit U2. |
| | 30. Activate discharge pump PP2 to unit U2. |
| | 31. Deactivate discharge pump PP2 after 5 minutes. |
| | 32. Close discharge valve PV2. |

FIG. 10

| Unit From | Unit To | Transfer From Recipe Segment | Transfer To Recipe Segment |
|---|---|---|---|
| U2 | U1 | SEG U2-T5 | SEG U1-T2 |
| U2 | U5 | SEG U2-T5 | SEG U5-T2 |
| U1 | U5 | SEG U1-T5 | SEG U5-T1 |
| U3 | U4 | SEG U3-T4 | SEG U4-T3 |
| U4 | U6 | SEG U4-T6 | SEG U6-T4 |
| U5 | U6 | SEG U5-T6 | SEG U6-T5 |
| U5 | U7 | SEG U5-T7 | SEG U7-T5 |
| U6 | U7 | SEG U6-T7 | SEG U7-T6 |
| U6 | U8 | SEG U6-T8 | SEG U8-T6 |

FIG. 15

| Recipe Segment | Unit | Class | Material | Action |
|---|---|---|---|---|
| SEG U1-1-7 | U1 | No | M7 | Action 1 |
| SEG U1-2 | U1 | No | | Action 2 |
| SEG U1-3-8 | U1 | No | M8 | Action 3 |
| SEG U1-5 | U1 | No | | Action 5 |
| SEG U1-4 | U1 | No | | Action 4 |
| SEG U2-1-7 | U2 | No | M7 | Action 1 |
| SEG U2-1-7B | U2 | No | M7 | Action 1 |
| SEG U3-15-3 | U3 | Yes | M3 | Action 15 |
| SEG U3-16 | U3 | Yes | | Action 16 |
| SEG U3-17-4 | U3 | Yes | M4 | Action 17 |
| SEG U4-1-5 | U4 | No | M5 | Action 1 |
| SEG U4-16 | U4 | No | | Action 16 |
| SEG U4-17 | U4 | No | | Action 17 |
| SEG U4-5 | U4 | No | | Action 5 |
| SEG U4-3-1 | U4 | Yes | M1 | Action 3 |
| SEG U4-3-2 | U4 | No | M2 | Action 3 |
| SEG U4-7 | U4 | Yes | | Action 7 |
| SEG U5-1-7 | U5 | No | M7 | Action 1 |
| SEG U5-5 | U5 | No | | Action 5 |
| SEG U5-4 | U5 | No | | Action 4 |
| SEG U6-1-7 | U6 | No | M7 | Action 1 |
| SEG U6-5 | U6 | No | | Action 5 |
| SEG U6-7 | U6 | Yes | | Action 7 |
| SEG U7-6 | U7 | No | | Action 6 |
| SEG U7-10 | U7 | No | | Action 10 |
| SEG U8-6 | U8 | No | | Action 6 |
| SEG U8-10 | U8 | No | | Action 10 |

FIG. 16

| Unit | Start Recipe Segment | End Recipe Segment |
|------|---------------------|--------------------|
| U1 | SEG U1-S | <null> |
| U2 | SEG U2-S | SEG U2-E |
| U3 | <null> | SEG U3-E |
| U4 | SEG U4-S | SEG U4-E |
| U5 | <null> | <null> |
| U6 | <null> | <null> |
| U7 | <null> | <null> |
| U8 | <null> | <null> |

FIG. 17

| Unit | Material of Construction | Unit Type | Volume | Agitation Speed | | Temperature | | Pressure | |
|------|--------------------------|-----------|--------|-----------------|-----|-------------|-----|----------|-----|
| | | | | Max. | Min | Max. | Min. | Max. | Min. |
| U1 | SS | Mixer | 10000 | 200 | 0 | <NULL> | <NULL> | <NULL> | <NULL> |
| U2 | SS | Chiller | 5000 | 20 | 20 | <NULL> | -50 | <NULL> | <NULL> |
| U3 | SS/GL | Mixer | 5000 | 100 | 0 | <NULL> | <NULL> | 30 | -1 |
| U4 | SS/GL | Reactor | 3000 | 100 | 0 | 300 | -50 | 100 | -1 |
| U5 | SS | Reactor | 5000 | 100 | 0 | 250 | <NULL> | 50 | <NULL> |
| U6 | SS/GL | Reactor | 2000 | 50 | 0 | 400 | -100 | 100 | -1 |
| U7 | SS | Separator | 5000 | 100 | 0 | 300 | -50 | 30 | -1 |
| U8 | SS/GL | Separator | 10000 | 200 | 0 | 250 | <NULL> | 10 | -1 |

FIG. 18

| From Element | To Element | From Type | To Type |
|---|---|---|---|
| Path 1 | Join 1 | Path | Join |
| Path 2 | Join 1 | Path | Join |
| Join 1 | Path 4 | Join | Path |
| Path 3 | Join 2 | Path | Join |
| Path 4 | Join 2 | Path | Join |
| Join 2 | Path 5 | Join | Path |

FIG. 39

Path 1
```
OPERATION 20
ACTION 3 ON M1
OPERATION 21
ACTION 16
ACTION 3 ON M2
```

Path 2
```
OPERATION 10
ACTION 15 ON M3
ACTION 16
ACTION 17 ON M4
```

Join 1
`<intermediate join>`

Path 4
```
OPERATION 22
ACTION 1 ON M5
ACTION 16
ACTION 17

OPERATION 40
ACTION 5
ACTION 1 ON M7
ACTION 7
```

Path 3
```
OPERATION 1
ACTION 1 ON M7
ACTION 2
ACTION 3 ON M4
OPERATION 2
ACTION 4
ACTION 5
```

Join 2
`<intermediate join>`

Path 5
```
OPERATION 60
ACTION 5
OPERATION 61
ACTION 6
ACTION 10
```

FIG. 40

| PROCESS ACTION | RECIPE SEGMENT |
|---|---|
| MIX | ▽<br>─ TRUE  ← 64<br>[ Mix ]  ← 54<br>─ Mix.State = Complete<br>△ |
| CHARGE SALT | ▽<br>─ TRUE  ← 64<br>[ AddSalt ]  ← 54<br>△ |
| CHARGE WATER | ▽<br>─ TRUE  ← 64<br>[ ValveCheck ]<br>[ Add DistilledWater ]  ← 54<br>─ Heat  ─ No Heat<br>[ Heat 100° F ]<br>△ |

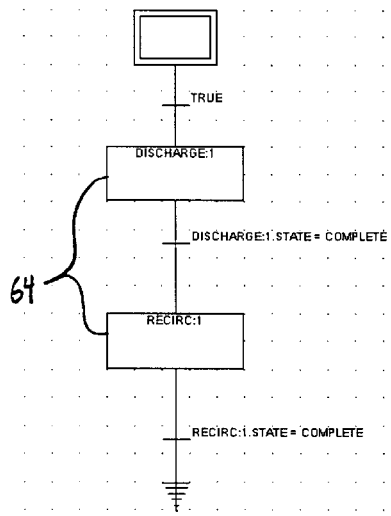

FIG. 87

| Recipe Segment | Process Action | Class/Instance Based | Associated Unit | Material |
|---|---|---|---|---|
| Add, SU2 | Charge:1 | Instance | Premix_A | A |
| Add, SU4 | Charge_B:1 | Instance | Premix_A | B |
| Add, SU7 | Charge:2 | Instance | Premix_A | C |
| Heat, SU5 | Temp_Ctrl:1 | Class | Premix_A | |
| Heat, SU8 | Maintain_Temp:1 | Class | Premix_A | |
| Hold, SU9 | Temp_Ctrl:2 | Class | Premix_A | |
| Add, E4 | Charge_X:1 | Instance | Reactor_1 | D |
| Add, E5 | M_Charge:1 | Instance | Reactor_1 | E |
| Sample, E3 | Analyze:1 | Instance | Reactor_1 | |
| Sample, E6 | Analyze:2 | Instance | Reactor_1 | |
| Cool, E7 | Ramp_Temp:1 | Class | Reactor_1 | |
| Dump, SE2 | Discharge:1 | Instance | Reactor_1 | Product_C |
| Recycle, SE3 | Recirc:1 | Instance | Reactor_1 | Recoverable_Gas |

FIG. 88

METHOD FOR CREATING MASTER RECIPES

BACKGROUND OF THE INVENTION

1. Field of the Invention

The present invention relates to methods for creating master recipes for manufacturing products with process equipment in a plant with a plant-level batch control computer system. More specifically it relates to methods for creating master recipes automatically or semi-automatically by converting them from general recipes which are independent of equipment.

2. Description of the Related Art

The process industry is the segment of industry which handles bulk materials, such as chemicals, food products, bulk polymeric materials, fuels, pharmaceuticals, etc., by processing input materials in a bulk manner to change their physical or chemical state to manufacture products. Industrial processes within this industry often can be segregated into one of three categories, i.e., continuous operations, batch operations and discrete operations. Batch operations are required when the products being manufactured, for example, either: (1) do not justify a dedicated, continuous operation, (2) are not capable of being produced by a continuous operation, (3) pose an unreasonable risk if the batch is fouled or lost, etc. Batch type operations of the second category (i.e., those which are incapable of continuous operation) which do not fall within the first category (do justify a dedicated continuous operation) typically will have a dedicated production line, which operates in a semi-continuous manner. Products, which fall into the first category, create a unique, and very significant sector in the process industry. The term "batch process" typically refers to processes in the first category (processes which do not justify a continuous operation).

Process plants, which perform batch processes, deal with a variety of unique issues. Each plant, or manufacturing site, will typically have manufacturing areas with one or more subordinate process cells. The process cells contain process equipment arranged in a manner, which will allow them to manufacture a variety of products. Very often these process cells will perform as independent or contract manufacturing facilities, manufacturing different products on a regular basis depending upon customer or company needs. The process cells will be designed to allow materials to flow in a variety of flow paths within the cell. The equipment within these cells is typically selected to allow the plant to perform a variety of different process operations, such as mixing, heating, cooling, filtering, distilling, crystallizing, etc. The combination of the variable flow paths between the equipment and the variety of process operations available within the cell provide the flexibility to manufacture a large variety of batch products to different procedures. This allows the plant to maximize the utilization of its resources, thereby minimizing the cost to produce the products.

Products manufactured by batch processes are no different than any other product. They require a detailed procedure to be performed by the equipment within the process cell in order to manufacture the product. These procedures, by their very nature, must be specific to the process cell to assure they are executed accurately. Most of the process cells used today are either partially, or fully automated. In the case of automated cells, the procedure typically will not even run if the procedure is not absolutely specific. This means that a different procedure is required for every process cell. In fact, a single process cell is often able to produce the same product with a variety of different procedures, in many cases using different equipment and material routings within the process cell.

Companies that specialize in batch processes in the process industry often have a large number of process cells, usually with a variety of different configurations. A company may have multiple sites, or plants, each site having multiple process cells. The sites may have different operating standards. For example, the process control systems often include process controllers interfacing the equipment and controlling the operation of the equipment directly, and computer systems in communication with the process controllers. The computer systems allow operators to monitor and supervise the process by indirectly interfacing the process controllers through the computer system. Different sites may have different process controllers operating on different control software and different computer systems operating on different supervisory software. For example, one site may have a WINDOWS® based operating system and another may have a UNIX-based operating system. There are also many different process controllers in use. Commonly used process controllers include Allen Bradley PLC 5, Allen Bradley PCL 5/250, Allen Bradley SLC 5/04, Siemens 505, Siemens S5, Siemens S7/PCS7, Siemens Teleperm M, Honeywell TPS 100, Honeywell PlantScape, Honeywell IPC 620, Hartman & Braun Freelance 2000, Fischer Provox, Modicon Quantum, and Moore APACS.

Differences between process cells and between company sites combined with the discontinuous nature of batch processes more often than not result in a vary large number of procedures to create the same product throughout the company. There are also different kinds of procedures associated with any one product. The need to disseminate the general procedure for making any one product throughout the company creates the need for procedures, which are not equipment specific, and do not include the details associated with the process cell. These procedures are process specific and provide the necessary detail to communicate how to manufacture the product independent of equipment. They are typically normalized relative to quantity of product (i.e., percentages, lb. per lb., etc.). Other needs, for example, resource planning and scheduling needs such as are required by production controllers and enterprise resource planning systems, define other types of procedures which typically are even more general than those previously described. An example of this type of procedure is a simple bill of materials and general operations.

It is generally recognized in the industry that there are four major categories of procedure types for batch processes. These procedure types are defined by the Instrument Society of America (ISA) in ISA standard S88.01, released in October of 1995. These four procedural categories are given in ISA S88.01 as the "general recipe," the "site recipe," the "master recipe," and the "control recipe." The definitions of these categories of procedures as given in ISA S88.01 follow. The ISA S88.01 definition of "recipe" is also given for reference purposes.

General Recipe—A type of recipe that expresses equipment and site independent processing requirements.

Site Recipe—A type of recipe that is site specific.

Master Recipe—A type of recipe that accounts for equipment capabilities and may include cell-specific information.

Control Recipe—A type of recipe, which, through its execution, defines the manufacture of a single batch of specific product.

Recipe—The necessary set of information that uniquely defines the production requirements for a specific product.

The term "master recipe" as used herein refers to the equipment specific procedure for manufacturing a product, or group of products, from one or more input materials in a process cell using a specific set of equipment with a specific equipment layout. The master recipes are generally quantity independent and represent material quantity requirements normalized to the amount of product being produced. The term master recipe as used herein also includes quantity-specific recipes such as control recipes, as described in more detail later. The term specific set of equipment means the same type and numbers of equipment, which can perform the same processes, requiring the same commands from the supervisory computer system to perform these processes.

The term specific equipment layout means the equipment items are interconnected to allow materials to flow between the different pieces of equipment in the same manner, so that materials may be routed to and from equipment in the same manner with the same control commands from the supervisory computer system.

The term "general recipe" as used herein means the equipment independent procedure for manufacturing a product or group of products from one or more input materials. As with the master recipe, the general recipes are typically quantity independent. The definition of term general recipe as used herein includes both the definition of the term general recipe and the term site recipe as given in ISA S88.01. The term general recipe as used herein may or may not include certain site specific information that is independent of equipment, such as local language (i.e., English, French, German, etc.), engineering units (i.e., metric vs. British system), site specific operating instructions, safety and regulatory requirements, etc.

The term "control recipe" as used herein conforms to the ISA S88.01 definition of control recipe, and means the specific recipe for manufacturing a specific lot of product in a specific quantity from specific quantities of input materials. The control recipe is the recipe required to "push the button" on the control system and make the product. Generally speaking, the master recipe and the control recipe as defined in ISA S88.01 are very closely related. Each control recipe is generally created from a quantity independent master recipe prior to production of the product in the process cell, often immediately prior to production. The additional information required to create the control recipe from the quantity independent master recipe will vary from product to product and site to site. The additional information generally includes the quantity of product to be manufactured. This may be the only information required to create the control recipe from the quantity independent master recipe, or the information may further include, for example, identification of the input material lots to be used, time stamps for the actual time of manufacture, identification of the actual product lot to be produced, and other lot and batch specific information that is required to manufacture a specific lot of product in a specific quantity.

The control recipe may be created from the quantity independent master recipe automatically without human intervention, semi-automatically with only slight human intervention, or manually by having an operator enter the required information directly into a copy of the quantity independent master recipe or, Alternatively, an old control recipe on file. This will vary from company to company and from site to site depending upon such things as the company standards and the process control system available at the location of manufacture. Typically, the conversion of quantity independent master recipes to control recipes is a relatively straightforward process. The master recipe and the control recipe as defined in ISA S88.01 are very similar. Therefore, the term master recipe as used herein includes both the master and control recipes as defined in ISA S88.01. The conversion of general recipes to master recipes is not a trivial process, however. This effort requires complete knowledge of the set of equipment (such as its processing capabilities and constraints) and the equipment layout in the process cell for which the product is targeted to be manufactured. Process cells often can support many procedures due to the multitude of possible permutations of the equipment included in the set of equipment, which may be used to manufacture the product. This further complicates the process. In addition, typically there is not a one to one relationship between process operations, which are to be performed, and the equipment operations available to perform them. ISA S88.01 identifies the two different models required to describe the general and the master recipe as the process model and the procedural control model respectively. The process model defines the equipment independent procedure for manufacturing the products, or the general recipe, in terms of process actions. Process actions are the smallest element, which can be performed in the process model. "Process actions" are simple actions to be performed on the materials, such as charge material, heat, mix, discharge material, etc. The procedural control model defines the equipment specific procedure for manufacturing the products, or the master recipe, in terms of recipe phases. "Recipe phases" are the smallest element of the procedural control model that can be performed on the equipment with the master or control recipe. Unfortunately, there is rarely a one-to-one relationship between the elements of the two models. It often takes multiple recipe phases to perform one process action. The simple process action of charge 0.2 lb. per lb. product of material A into unit one may require the recipe phases corresponding to open the exit valve, evacuate the vessel, verify the vessel weight indicates empty, close the exit valve, monitor the vessel weight, activate inlet pump A at 30 RPM, open inlet valve A, when vessel weight increase equals 200 lbs close inlet valve A, deactivate inlet pump A. Historically master recipes have generally been created manually from the general recipes or, Alternatively, from other master recipes for products with similar manufacturing procedures. Due to the complex nature of the task, the creation and verification of master recipes from corresponding general recipes has historically been a costly and time-consuming task. Additionally, manual creation and verification of master recipes is not very reliable and is prone to error. It usually requires one or more pilot or trial runs with the new master recipe to validate the recipe. The material used for this validation often becomes scrap.

The time consuming nature of manually creating and maintaining master recipes often means that the optimization of master recipes relative to parameters such as cost, production time, or even production location, is not performed. Companies are generally forced to have a restricted number of non-optimized master recipes with which to manufacture their products.

OBJECTS OF THE INVENTION

Accordingly, an object of the present invention is to provide a method for creating master recipes quickly relative to commercially known methods.

Another object of the present invention is to provide a method for creating master recipes with minimal human intervention.

Another object of the present invention is to provide a method for creating master recipes directly from a general recipe.

Another object of the present invention is to provide a method for creating master recipes reliably.

Another object of the present invention is to provide a method for creating master recipes that allows for selection of an optimum master recipe.

Additional objects and advantages of the invention will be set forth in the description, which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, in accordance with one aspect of the invention a method is provided for automatically creating a set of master recipes from a general recipe using site information. Each master recipe comprises a plurality of recipe segments and the general recipe comprising a plurality of process actions. Each master recipe is for manufacturing at least one product from at least one input material by performing the process actions on the at least one input material. Each master recipe is for use with a specific set of equipment in a process cell. Each process action has one or more corresponding recipe segments that implement the process action on the set of equipment. The general recipe describes how to manufacture the at least one product from the at least one input material by performing the process actions on the at least one input material. The general recipe is independent of equipment.

The method according to this aspect of the invention includes a first step of creating a list of recipe segments from the general recipe and the site information. The list of recipe segments includes each process action in the general recipe and a listing of all the corresponding recipe segments for that process action which can perform that process action in the process cell.

The method includes a second step of creating the set of master recipes from the list of recipe segments, the general recipe, and the site information.

In the preferred embodiments, the method does not require human interaction or intervention. It is carried out automatically or semi-automatically. Each master recipe is for use with a single process cell. Alternatively, each master recipe may be for use with a group or class of process cells with the same equipment configuration. Each master recipe includes one or more a data files. The data files are preferably linked with at least one OLE object. The master recipe preferably is depicted as a procedure flow chart.

In the preferred applications, the process cell includes a batch control system interfacing the set of equipment. The batch control system is for controlling the operation of the set of equipment. Each master recipe is for use with the batch control system to control the set of equipment in the process cell.

The batch control system further includes a batch server in communication with at least one process connected device. The process connected devices interface the set of equipment and are for controlling the set of equipment. The batch server is for controlling the process connected devices, and the master recipe is for use with the batch server to control the process connected devices to manufacture the at least one product.

Preferably, the batch control system has a process control application residing on the batch control system. The process control application is for operating on the batch control system and each master recipe is for execution by the process control application to control the set of equipment.

In the preferred embodiments in accordance with this aspect of the invention, each master recipe includes a formula and equipment requirements. Each master recipe may include at least one unit operation and each unit operation may include a procedure, a formula, and equipment requirements. In addition, each master recipe may further include at least one unit procedure and each unit procedure may include a procedure, a formula, and equipment requirements.

Further in accordance with the preferred embodiments of this aspect of the invention, the recipe segments are organized into at least one segment path in the master recipe. The segment paths are interconnected in a production path to form the master recipe. The process actions are organized into at least one process branch in the general recipe. The process branches are interconnected in a dependency path to form the general recipe. Each process branch has one or more corresponding segment paths, which can perform the process branch on the set of equipment. The second step preferably includes: a) dividing the general recipe into the dependency path and a collection of the at least one process branches; and b) using the list of recipe segments to analyze each process branch in the collection of the at least one process branches to create a segment path series for the process branch. The segment path series includes all the segment paths corresponding to the process branch. The analysis results in a collection of segment path series corresponding to the collection of the at least one process branch. This second step also includes: c) using the collection of segment path series, the dependency path, and the site information to create a set of production paths; and d) using the set of production paths, the collection of segment path series, and the site information to create a set of master recipes.

In the preferred versions, the at least one process branch typically includes two or more process branches. Each process branch has a branch end. The dependency path often includes at least one material join. Each material join connects at least two branch ends. The segment paths are for processing at least one material separately without a material join from another segment path. The process branches are for describing how to process the at least one material separately without a material join from another process branch. The at least one material is an input material, a product, or an intermediate material.

In the preferred embodiments, the general recipe includes one or more data files. The data files are linked with at least one OLE object. The general recipe preferably is depicted by one or more process dependency charts. The general recipe is preferably represented by one or more process sequence tables. Alternatively, but preferably, the general recipe is depicted by one or more sequence function charts.

Preferably, each general recipe includes a formula and equipment requirements. Each general recipe may include at least one process operation and each process operation may further include a procedure, a formula, and equipment requirements. In addition, each general recipe may include at least one process stage. Each process stage may further include a procedure, a formula, and equipment requirements.

Preferably, the site information includes one or more data files. The site information includes material flow information, recipe segment information, and equipment information. The material flow information includes information describing how material can flow between the equipment in the process cell. The recipe segment information includes a listing of all the recipe segments available to perform the process actions in the process cell, and a summary of the process action that each available recipe segment performs. Preferably, the set of equipment includes units and the recipe segment information further includes a listing of the unit associated with each recipe segment and a listing of the at least one input material associated with each recipe segment. The recipe segment information includes operational limits associated with the process action that each recipe segment performs in the process cell. The equipment information includes equipment limits. The set of equipment includes units, and each unit may have a unit start recipe segment or a unit end recipe segment associated with the unit, and the equipment information includes a list of the unit start recipe segments and the unit end recipe segments associated with each unit.

In the preferred embodiments in accordance with this aspect of the invention, each recipe segment includes one or more data files for performing the corresponding process action on the set of equipment, and the data files are linked with at least one OLE object. Each recipe segment includes one or more recipe phases. Each recipe segment includes recipe segment parameters. Preferably, each recipe segment includes a procedure, a formula, and equipment requirements.

In the preferred versions, each process action includes one or more data files. Each process action includes process action parameters.

In the preferred versions of the method in accordance with this aspect of the invention, the at least one input material and the at least one product are bulk materials.

Further in accordance with the preferred versions of this aspect of the invention, the site information includes optimization information. The second step of the method includes using the optimization information to select at least optimal production path from the set of production paths to create the set of master recipes from the optimal production paths. The selection information may be cycle time information. The selection criteria may be used to select the optimal production paths, which will produce the product in the least time. Alternatively, the selection information may be equipment path information. The selection criteria may be used to select the optimal production paths, which will produce the product in the least numbers of equipment. The selection information may be material transfer cost information. In this case, the selection criteria may be used to select the optimal production paths, which will produce the product with the least material transfer costs.

In the preferred embodiments in accordance with this aspect of the invention, the set of equipment has an equipment layout and the general recipe is independent of equipment layout.

In accordance with another aspect of the invention, a method is provided for automatically creating a set of master recipes from a general recipe using site information. Each master recipe comprises a plurality of recipe segments. The recipe segments are organized into at least one segment path. The segment paths are interconnected in a production path to form the master recipe. The general recipe comprises a plurality of process actions. The process actions are organized into at least one process branch. The process branches are interconnected in a dependency path to form the general recipe.

Each master recipe is for manufacturing at least one product from at least one input material by performing the process actions on the at least one input material. Each master recipe for use with a specific set of equipment in a process cell. Each process action has one or more corresponding recipe segments that implement the process action on the set of equipment. Each process branch has one or more segment paths, which perform the process branch on the set of equipment.

The general recipe describes how to manufacture the at least one product from the at least one input material by performing the process actions on the at least one input material. The general recipe is independent of equipment. The site information includes recipe segment information, material flow information, and equipment information. The method includes the step of creating a list of recipe segments from the general recipe and the site information. The list of recipe segments includes each process action in the general recipe and a listing of all the corresponding recipe segments for that process action which can perform that process action in the process cell. This method also includes the steps of dividing the general recipe into the dependency path and a collection of the at least one process branches, and using the list of recipe segments to analyze each process branch in the collection of the at least one process branches and create a segment path series for the process branch. The segment path series including all the segment paths corresponding to the process branch, the analysis resulting in a collection of segment path series corresponding to the collection of the at least one process branch, a step of using the collection of segment path series, the dependency path, and the site information to create a set of production paths, and a step of using the set of production paths, the collection of segment path series, and the site information to create a set of master recipes.

In the preferred embodiments in accordance with this aspect of the invention, the method does not require human interaction. Each master recipe is for use with a single process cell. Each master recipe includes one or more a data files. The data file preferably is linked with at least one OLE object. The master recipe is preferably depicted by a procedure flow chart.

In the preferred embodiments, the process cell includes a batch control system interfacing the set of equipment. The batch control system is for controlling the operation of the set of equipment and each master recipe is for use with the batch control system to control the set of equipment in the process cell. Each master recipe may include at least one unit operation. Each master recipe may further include at least one unit procedure.

The at least one process branch typically is two or more process branches. Each process branch has a branch end. The dependency path includes at least one material join the material joins connect at least two branch ends. The segment paths are for processing at least one material separately without a material join from another segment path. The process branches describe how to process the at least one material separately without a material join from another process branch. The at least one material is an input material, a product, or an intermediate material.

In the preferred embodiments in accordance with this aspect of the invention, the general recipe includes one or more a data files. The data files are linked with at least one OLE object.

One or more process dependency charts preferably depict the general recipe. The general recipe preferably is depicted by one or more a process sequence tables. Alternatively, but preferably, the general recipe is depicted by one or more sequence function charts. Each general recipe may include at least one process operation. Each general recipe may also include at least one process stage.

In the preferred embodiments, the site information includes one or more a data files. The recipe segment information includes a listing of all the recipe segments available to perform the process actions in the process cell and a summary of the process action that each available recipe segment performs.

Each recipe segment includes one or more data files for performing the corresponding process action on the set of equipment. The data files are preferably linked with at least one OLE object. Each recipe segment includes one or more recipe phases. Each process action includes one or more a data files.

In the preferred embodiments in accordance with this aspect of the invention, the site information includes optimization information. The method includes using the optimization information to select at least one optimal production path from the set of production paths to create the set of master recipes from the optimal production paths.

In accordance with another aspect of the invention, a method is provided for automatically creating a set of master recipes from a general recipe using site information. Each master recipe comprising a plurality of recipe segments. The recipe segments organized into at least one segment path. The segment paths interconnected in a production path to form the master recipe. The general recipe comprising a plurality of process actions. The process actions organized into at least one process branch. The process branches interconnected in a dependency path to form the general recipe.

Each master recipe is for manufacturing at least one product from at least one input material by performing the process actions on the at least one input material. Each master recipe is for use with a specific set of equipment in a process cell. Each process action has one or more corresponding recipe segments that implement the process action on the set of equipment. Each process branch has one or more segment paths, which perform the process branch on the set of equipment.

The general recipe describes how to manufacture the at least one product from the at least one input material by performing the process actions on the at least one input material. The general recipe is independent of equipment. The site information includes recipe segment information, material flow information, and equipment information. The method includes the step of creating a list of recipe segments from the general recipe and the recipe segment information. The list of recipe segments includes each process action in the general recipe and a listing of all the corresponding recipe segments for that process action which can perform that process action in the process cell. The method also includes the step of dividing the general recipe into the dependency path and a collection of the at least one process branches, and the step of using the list of recipe segments and the material flow information to analyze each process branch in the collection of the at least one process branches and create a segment path series for the process branch. The segment path series includes all the segment paths corresponding to the process branch. The analysis results in a collection of segment path series corresponding to the collection of process branches. The method also includes the step of using the collection of segment path series, the dependency path, and the material flow information to create a set of production paths, and the step of using the set of production paths, the collection of segment path series, and the site information to create a set of master recipes.

In the preferred embodiments in accordance with this aspect of the invention, the method does not require human interaction. Each master recipe is for use with a single process cell. Each master recipe includes one or more a data files. The data file preferably is linked with at least one OLE object. The master recipe is preferably depicted by a procedure flow chart.

In the preferred embodiments, the process cell includes a batch control system interfacing the set of equipment. The batch control system is for controlling the operation of the set of equipment, and each master recipe is for use with the batch control system to control the set of equipment in the process cell. Each master recipe may include at least one unit operation. Each master recipe may further include at least one unit procedure.

The at least one process branch typically is or includes two or more process branches. Each process branch has a branch end. The dependency path includes at least one material join. The material joins connect at least two branch ends. The segment paths are for processing at least one material separately without a material join from another segment path. The process branches describe how to process the at least one material separately without a material join from another process branch. The at least one material is an input material, a product, or an intermediate material.

In the preferred embodiments in accordance with this aspect of the invention, the general recipe includes one or more data files. The data files are linked with at least one OLE object. The general recipe preferably is depicted by one or more process dependency charts. The general recipe preferably is depicted by one or more process sequence tables. Alternatively, but preferably, the general recipe is depicted by one or more sequence function charts. Each general recipe may include at least one process operation. Each general recipe may also include at least one process stage.

In the preferred embodiments, the site information includes one or more data files. The recipe segment information includes a listing of all the recipe segments available to perform the process actions in the process cell and a summary of the process action that each available recipe segment performs.

Each recipe segment includes one or more data files for performing the corresponding process action on the set of equipment. The data files are preferably linked with at least one OLE object. Each recipe segment includes one or more recipe phases. Each process action includes one or more data files.

In the preferred embodiments in accordance with this aspect of the invention, the site information includes optimization information. The method includes using the optimization information to select at least one optimal production path from the set of production paths to create the set of master recipes from the optimal production paths.

In accordance with another aspect of the invention, a method is provided for automatically creating a set of master recipes from a general recipe using site information. Each master recipe comprises a plurality of recipe phases, the general recipe comprises a plurality of process actions, each master recipe is for manufacturing at least one product from at least one input material by performing the process actions on the at least one input material by using recipe segments, the recipe segments comprise at least one recipe phase, each process action is performed by one recipe segment, each master recipe is for use with a specific set of equipment in a process cell, and each process action has one or more corresponding recipe segments that implement the process action on the set of equipment.

The general recipe is for describing how to manufacture the at least one product from the at least one input material by performing the process actions on the at least one input material. The general recipe is independent of equipment.

In accordance with this aspect of the invention, the method comprises a first step of creating a list of recipe segments from the general recipe and the site information, the list of recipe segments including each process action in the general recipe and a listing of all the corresponding recipe segments for that process action which can perform that process action in the process cell, and a second step of creating the set of master recipes from the list of recipe segments, the general recipe, and the site information.

In the preferred embodiments in accordance with this aspect of the invention, the method requires little or no human interaction or intervention. Each master recipe is for use with a single process cell. Each master recipe includes one or more a data files. The data file preferably is linked with at least one OLE object. The master recipe is preferably depicted by a procedure flow chart.

In the preferred embodiments, the process cell includes a batch control system interfacing the set of equipment. The batch control system is for controlling the operation of the set of equipment and each master recipe is for use with the batch control system to control the set of equipment in the process cell. Each master recipe may include at least one unit operation. Each master recipe may further include at least one unit procedure.

Further in accordance with the preferred embodiments of this aspect of the invention, the recipe segments are organized into at least one segment path in the master recipe. The at least one segment path is interconnected in a production path to form the master recipe. The process actions are organized into at least one process branch in the general recipe. The process branches are interconnected in a dependency path to form the general recipe. Each process branch has one or more corresponding segment paths that can perform the process branch on the set of equipment. The second step of the method includes the steps of dividing the general recipe into the dependency path and a collection of process branches, and using the list of recipe segments to analyze each process branch in the collection of process branches to create a segment path series for the process branch. The segment path series includes all the segment paths corresponding to the process branch. The analysis results in a collection of segment path series corresponding to the collection of process branches. The method also includes the step of using the collection of segment path series, the dependency path, and the site information to create a set of production paths, and a step of using the set of production paths, the collection of segment path series, and the site information to create a set of master recipes.

The at least one process branch typically is or includes two or more process branches. Each process branch has a branch end. The dependency path includes at least one material join the material joins connect at least two branch ends. The segment paths are for processing at least one material separately without a material join from another segment path. The process branches describe how to process the at least one material separately without a material join from another process branch. The at least one material is an input material, a product, or an intermediate material.

In the preferred embodiments in accordance with this aspect of the invention, the general recipe includes one or more data files. The data files are linked with at least one OLE object. The general recipe preferably is depicted by one or more process dependency charts. The general recipe preferably is depicted by one or more a process sequence tables. Alternatively, but preferably, the general recipe is depicted by one or more sequence function charts. Each general recipe may include at least one process operation. Each general recipe may also include at least one process stage.

In the preferred embodiments, the site information includes one or more data files. The recipe segment information includes a listing of all the recipe segments available to perform the process actions in the process cell and a summary of the process action that each available recipe segment performs.

Each recipe segment includes one or more data files for performing the corresponding process action on the set of equipment. The data files are preferably linked with at least one OLE object. Each recipe segment includes one or more recipe phases. Each process action includes one or more a data files.

In the preferred embodiments in accordance with this aspect of the invention, the site information includes optimization information. The method includes using the optimization information to select at least one optimal production path from the set of production paths to create the set of master recipes from the optimal production paths.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention.

FIG. 10 is another simplified comparison of the procedural steps of a general recipe and a master recipe;

FIG. 15 is shows material flow information for the process cell of the first example;

FIG. 16 shows recipe segment information and material flow information for the process cell of the first example;

FIG. 17 shows unit start and unit end recipe segments for the process cell of the first example;

FIG. 18 shows equipment information for the process cell of the first example;

FIG. 39 is a tabular representation for the dependency path of FIG. 38;

FIG. 40 is a detailed depiction of the general recipe of the first example including the identification of the material joins and the process branches;

FIG. 54 provides the recipe segments for the process actions of the process operation of FIG. 53;

Figure 83:
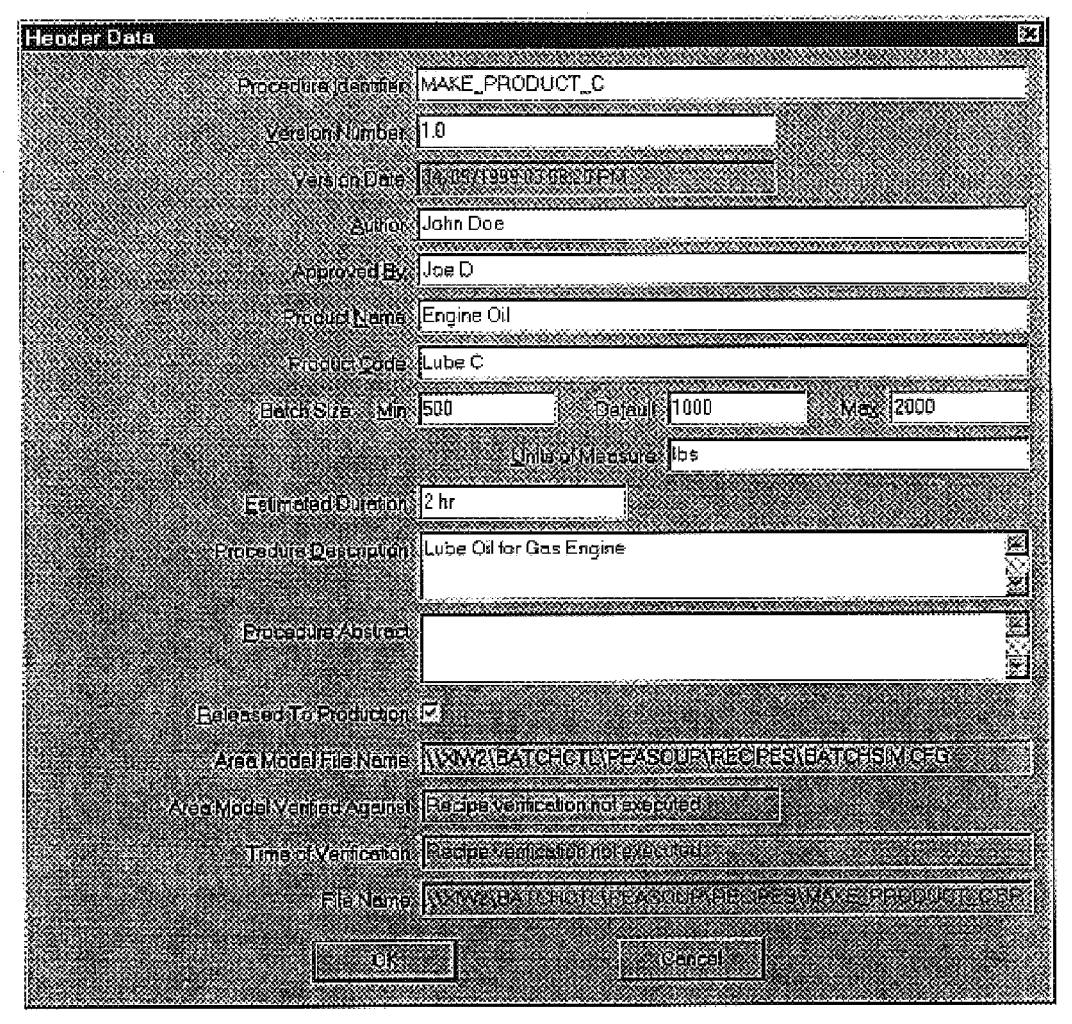

FIG. 83 shows a view from the OPENBATCH professional recipe editor in accordance with the preferred embodiments of the invention for header information for the master recipe of the second example;

FIG. 87 shows a the detailed Procedure Flow Chart for the unit procedure Separate_UPC:1 from the master recipe of the second example;

FIG. 88 is a table showing the relationship between the process actions of the general recipe of the second example and the recipe segments from the corresponding master recipe for the example;

DETAILED DESCRIPTION OF THE PREFERRED EMBODIMENTS AND METHODS

Figure 1:
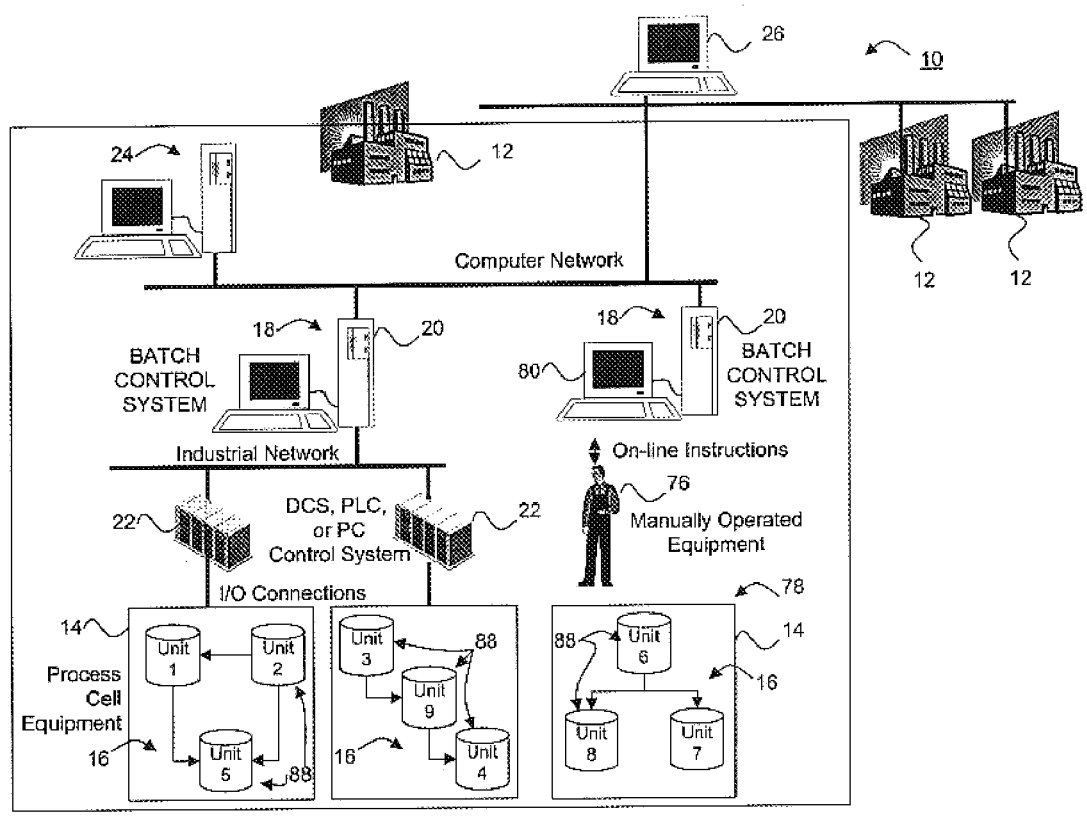
FIG. 1 depicts an illustrative company with multiple manufacturing sites.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiment and method. The invention according to its various aspects is particularly pointed out and distinctly claimed in the attached claims read in view of this specification, and appropriate equivalents.

In accordance with one aspect of the invention, a method is provided for automatically creating a set of master recipes from a general recipe using site information.

In the presently preferred embodiment according to this aspect of the invention, the master recipe is for use in a process company 10 at a manufacturing site 12 to control the batch manufacture of at least one product, as will be described in more detail later. The company may have multiple sites as shown in FIG. 1. Each manufacturing site has at least one process cell 14, which manufactures the product or group of products. The process cell has a set of equipment 16 located in the cell, which is used to process materials and manufacture the products. The process cell 14 has a batch control system 18 that controls operation of the process cell. The batch control system preferably includes a batch server 20 that interfaces the process cell through the process connected devices 22. There may be one batch control system 18 for each process cell 14, or the batch control system may interface and control multiple process cells. The process connected devices 22 are preferably process controllers or equipment with the capability of directly communicating to the batch server 20. The process connected devices 22, or PCD's, are electrically or physically connected to the set of equipment 16. The process controllers include both the software programming and logic to interface with and control the operation of the set of equipment. Typical process controllers are made by various companies throughout the control industry. Examples of adequate process controllers were provided previously under the Background of the Invention section of this document. The batch control system 18 may be connected to the site computer system 24. The site computer system may be connected to a company 10, or global computer system 26, such as a global enterprise resource planning system, or ERP.

The batch server preferably interfaces the PCD's by industry standard interface software such as WINDOWS® Dynamic Data Exchange, or WINDOWS® DDE by Microsoft Corporation of Redmond, Wash., or OPC defined by the OPC Foundation, Boca Raton, Fla. This software provides the communications protocols for the communication link between the PCD's 22 and the batch control system 18 through the batch server 20. The process connected devices 22 are connected to the batch server by industry standard communication connections, such as Modbus by Schneider Electric of North Andover Mass., DeviceNet by Open Devicenet Vendors Association of Boca Raton Fla., Profibus by Siemens Corporation of Munich Germany, and Data Highway by Honeywell Corporation of Minneapolis Minn. The batch server 20 preferably has a process control application, or PCA, such as a batch control software application operating on it to allow operators to interface with the process cell 14. This allows the operators to monitor and control the set of equipment 16 in the process cell directly from the batch control system. The preferred PCA is Open Batch by Sequencia Corporation of Phoenix, Ariz. The batch server 20 is any configuration of computer that will operate the PCA and allow the operators to control the process cells to manufacture the products. The batch server 20 has the appropriate software loaded on the server required by the PCA. A typical configuration of a preferred server is an IBM type personal computer with a minimum of a 300 megahertz Pentium processor with 256K of cache RAM by Intel Corporation of Santa Clara, Calif. or equivalent with a minimum of 128 megabytes of RAM, a 2 gigabyte hard drive, a 20X CD ROM, a 10 megabit Ethernet Card, a 3½ inch floppy drive, a 512K 800×600 resolution graphics card, an 800×600 resolution VGA 17 inch monitor, and a UPS with ½ hour rating. The server 20 preferably has the following minimum software loaded and operating on it: WINDOWS® NT 4.0, WINDOWS DDE, and SQL Server Version 7 by Microsoft Corporation of Redmond Wash. and OPENBATCH, Batch Service Manager, and Batch History Archiving by Sequencia Corporation of Phoenix, Ariz. The batch control system 18 preferably has operator terminals configured to allow the operator to interface the system. One server may support multiple terminals or clients. These terminals are typically personal computers with a configuration sufficient to allow the operators to access the batch control system 18 and perform their duties. An example configuration for an operator terminal is an IBM type personal computer with a minimum of a 166 megahertz Pentium processor with 256K of cache RAM by Intel Corporation of Santa Clara, Calif. or equivalent with a minimum of 64 megabytes of RAM, a 1 gigabyte hard drive, a 20X CD ROM, a 10 megabit Ethernet Card, a 3½ inch floppy drive, a 512K 800×600 resolution graphics card, an 800×600 resolution VGA 17 inch monitor, and a UPS with ½ hour rating. The terminal preferably has the following minimum software loaded and operating on it: WINDOWS® NT 4.0, WINDOWS® DDE, and SQL Server Version 7 by Microsoft Corporation of Redmond Wash. and OPENBATCH, BATCH SERVICE MANAGER, and BATCH HISTORY ARCHIVING by Sequencia Corporation of Phoenix, Ariz. The batch control system 18 from any one process cell 14 is preferably connected to the site computer system 24 so that other personnel may access some or all of the data and features provided by the process control application.

Figure 2:
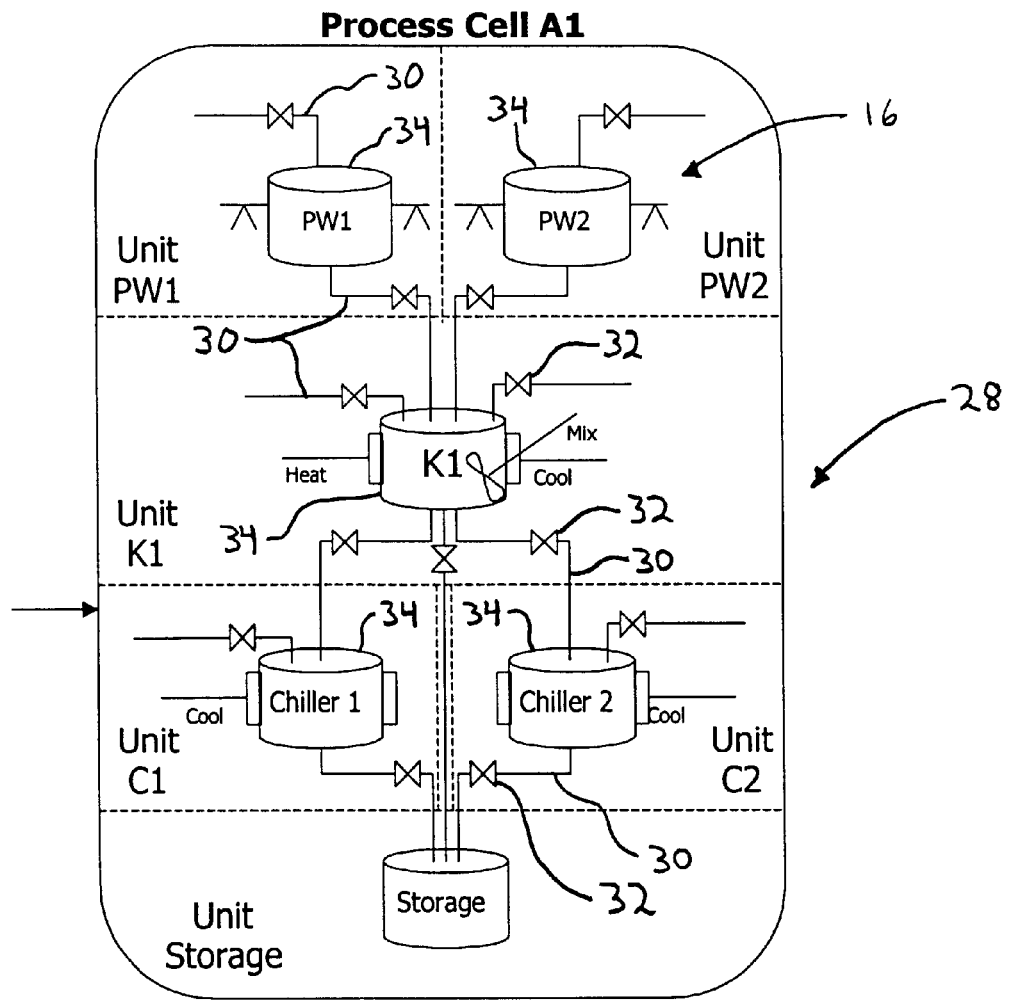
FIG. 2 depicts an example process cell layout.

In the preferred application, the set of equipment 16 in the process cell 14 is preferably process equipment for batch processing lots of bulk materials such as gases, liquids, or bulk solids such as powders or granules. This variety of equipment is commonly used throughout the chemical, pharmaceutical, and food industries, as previously described. The set of equipment 16 is typically arranged in the process cell 14 with a specific equipment layout 28 which includes the location of the equipment within the process cell as well as the allowable material flow paths 30 within the process cell and between the equipment. The material flow paths 30 generally include flow control devices 32, such as valves, pumps, flow regulators, flow meters, etc., to route and control the flow of materials throughout the process cell as shown in FIG. 2. The material flow paths 30 route input materials into the process cell and into the equipment, process intermediate materials between the equipment within the process cell, and final products out of the process cell.

Figure 3:
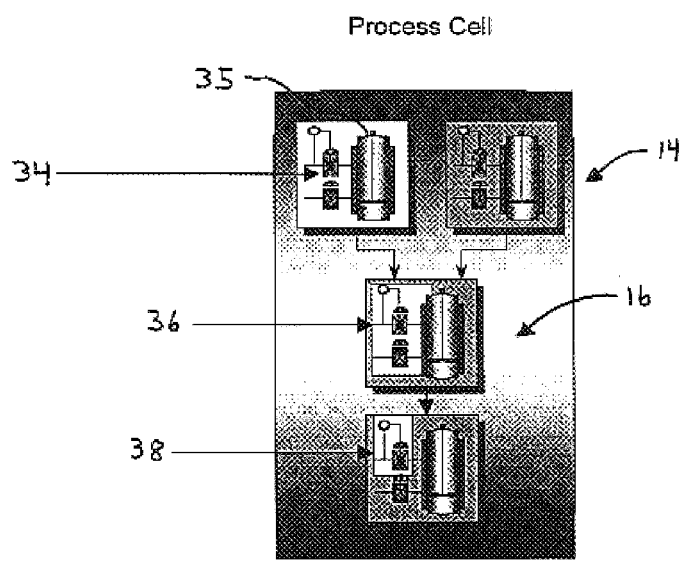
FIG. 3 depicts the elements of a unit.

The set of equipment 16 in the process cell 14 is broken down into units 34 that are for processing a batch of material, as shown in FIG. 3. These units are typically capable of holding the batch of material as it is being processed. They often consist of large reservoirs 35 that hold the material and the associated equipment module 36 that performs the processing of the batch of material. The equipment module 36 is a collection of control modules 38 that are associated with a specific unit 34. Each equipment module 36 can carry out a finite number of specific processing activities related to the unit 34 with which they are associated, for example, a weigh tank, a process heater, a scrubber, etc. The control modules 38 are the lowest level of grouping of equipment that can carry out basic control, such as a valve and the associated solenoid to open and close the valve. The control modules 38 are preferably connected to a process connected device 22 or are themselves a process connected device in communication with the batch control system 18. The batch control system 18 controls manufacture in the process cell 14 through its interface to the control modules 38 within the process cell. Although each control module typically can be operated independently of all of the other control modules in the process cell, the logical grouping of the control modules 38 into the hierarchy of equipment modules 36, units 34, and process cells 14 provides for a more organized picture of the process equipment. This structure often simplifies the task of controlling a process to manufacture a product.

Each piece of equipment in the process cell has a variety of characteristics associated with it. These characteristics include capabilities (such as capacities, maximum and minimum limits, material compatibilities, etc.), classifications (such as unit, control module, heater, chiller, scrubber, reactor, etc.), associations with other equipment (such as identification of material flow paths to other equipment, unit ID with which a control or equipment module is associated, etc.), etc. All this information is specific to a process cell 14 and a site and constitutes site information 40, as discussed in more detail later.

Figure 4:
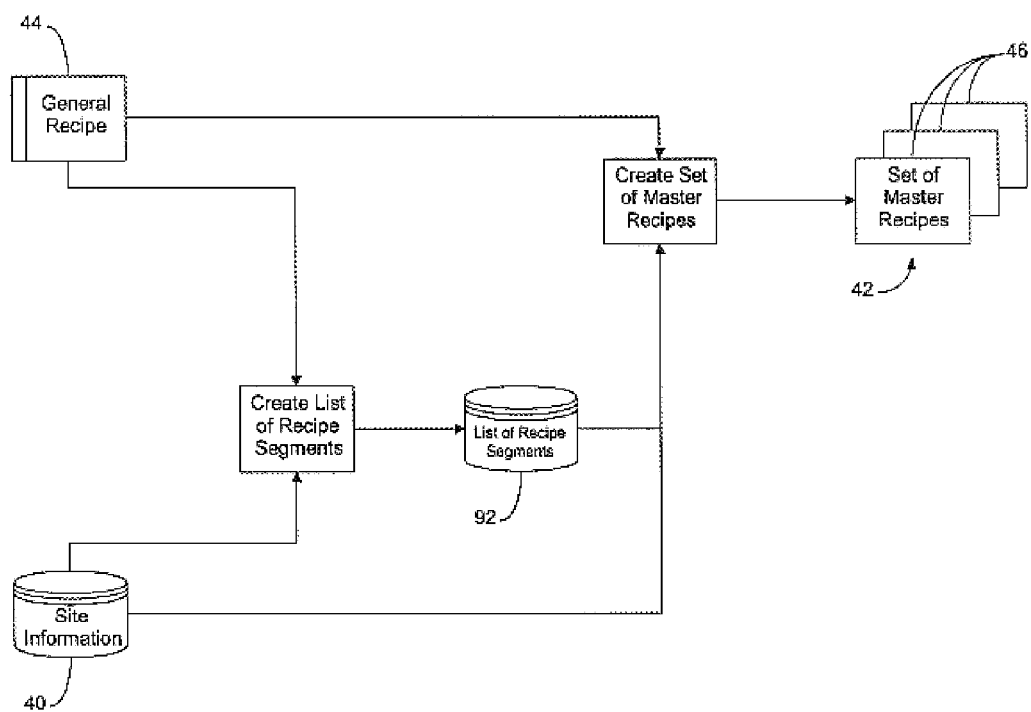
FIG. 4 is a simple block diagram of the first preferred embodiment of the invention.

Further in accordance with the preferred embodiments of this aspect of the invention, a method is provided for automatically creating a set of master recipes 42 from a general recipe 44 using site information 40, as depicted in FIG. 4. The set of master recipes 42 created from the general recipe 44 are a group of discrete master recipes 46 which can manufacture the product to the process requirements of the general recipe in the process cell 14 or in a class of process cells with a common equipment configuration. The set of master recipes may consist of as few as one master recipe if only one master recipe exists which will meet the constraints of the general recipe and the site information.

When used with the preferred embodiments, the batch control system 18 controls the manufacture of products in the process cell 14 through the use of the master recipe 46. The master recipe 46 defines how to supervise and control the set of equipment 16 in the process cell 14. As described previously, the master recipe preferably is a quantity independent recipe for manufacturing a specific product or group of products from at least one input material. A master recipe 46 may produce one product or a group of products in a single batch, depending upon the recipe. As used herein, the term product refers to a specific product or a specific group of products manufactured to the master or control recipe in a single batch. The master recipe 46 preferably includes all the process and equipment specific information necessary to manufacture the product, except the master recipe preferably is normalized with respect to quantity. The master recipe 46 is generally used to create the control recipe. The control recipe is the batch specific recipe to manufacture the product, as previously described. Alternatively, the master recipe 46 may be the control recipe as described previously.

The master recipe 46 preferably is for the control of the manufacture of the product automatically, so that no human interaction is required between the batch control system 18 and the operator. Alternatively, the master recipe 46 can allow for partial or complete manual control of the manufacture of the product. In either case, the master recipe simplifies the operator's tasks by providing specific and detailed operating instructions in the order required for the recipe. The instructions could be either fully automatic control commands to control the equipment or devices (such as a valve or pump) or manual instructions to operators, or any combination of the two. For example, the control recipe issues an "Open" command to a valve or a "Start" command to a pump, and the automated devices go to the command state. Alternatively, the operator controls a material addition by specifying the amount of material to be added and actuating the addition of the material through the batch control system; however, the master recipe may perform multiple tasks, such as opening valves, actuating pumps, monitoring flow meters or load cells, turning off pumps, closing valves, etc., to accomplish the addition for the operator. Even a fully manual master recipe will most likely guide the operator through the steps of the recipe to simplify the operator's tasks. The operator may be allowed to perform tasks other than the standard task required by the recipe, but he might be provided the standard tasks in order before being allowed the option to over ride.

The master recipe 46 is preferably for the control of either one process cell 14 or multiple process cells of one process cell configuration. The master recipe 46 may be used with more than one process cell 14, provided each process cell the master recipe is used with has the same process cell configuration. For the process cell configuration to be the same, the process cell 14 must have an identical interface to the batch control system 18. In other words, each process cell 14 must look identical to the control system 18. In general, this means that the equipment in the process cell 14, as well as the layout of the equipment 28 and the material flow paths 30 between the equipment must be the same between the process cells.

The master recipe 46 preferably is one or more data files, which contain the procedure, required to manufacture the product. The master recipe 46 is preferably for use with the process control application residing on the batch control system 18. The master recipe 46 provides the necessary data required to operate the set of equipment 16 in the process cell through the process control application. The form and type of data file are preferably selected to operate with the process control application. For use with the preferred process control application, OPENBATCH by Sequencia Corporation, the master recipe data file type is preferably either a binary file or a relational database. The data file type is preferably selected by the user from one of the preferred data file types. Alternatively, the master recipe 46 may be one or more program routines or subroutines that operate on the batch control system 18. A combination of data files and subroutines may be used as well. The exact form of the master recipe 46 does not matter, provided it is capable of implementing the master recipe on the batch control system 18 to manufacture the product. Similar to the master recipe 46, the preferred embodiments of the general recipe 44 are one or more data files. Alternatively, the general recipe 44 may be one or more program routines or subroutines. Like the master recipe, the exact form of the general recipe 44 does not matter, provided it is capable of describing how to manufacture the product, as will be described in more detail later.

In the preferred embodiments, both the master recipes 46 and the general recipes 44 include the five major elements identified in ISA S88.01. These elements are the header, formula, equipment requirements, procedure, and other information. These major elements preferably contain the same information in them that is identified in ISA S88.01. The following is a summary description of the information provided in each of these major elements in accordance with ISA S88.01. The definition of process input, process output, and process parameter provided as well for the sake of clarity:

Header—The administrative information in the recipe, usually including the recipe and product identification, the version number, the originator, the issue date, approvals, status, and other administrative information.

Formula—The category of recipe information that includes process inputs, process outputs, and process parameters. The type of data provided in the formula is that which may be needed by different parts of the enterprise, without including processing details not required by the balance of the enterprise. For example, the formula usually includes a general bill of materials and a bill of materials segregated by procedural elements.

Equipment Requirements—The category of recipe information that includes equipment constraints which limit the choice of equipment which may be used to manufacture the product. For the general recipes these constraints are typically broad, such as allowable equipment materials of construction and required processing characteristics, such as categories of allowable mixer types. For the master recipes the equipment requirements often limits the equipment to specific units, such as reactor R-5, or they may limit the equipment to vary specific classes of units.

Procedure—The category of recipe information that defines the actual strategy for carrying out the process, preferably in a step by step manner. In the case of general recipes, the procedure is independent of equipment and describes the basic material related process for creating the product. In the case of master recipes, the procedure includes both the equipment and the material processing details required to manufacture the product in a specific process cell or configuration of process cells.

Other Information—The category of recipe information that includes batch processing information not included in the other four categories of information. Examples include regulatory compliance information, materials and process safety information, process flow diagrams, and packaging and labeling information.

Process Input—The identification and quantity of a raw material or other resource required to make a product.

Process Output—An identification and quantity of material or energy expected to result from one execution of a control recipe.

Process Parameter—Information that is needed to manufacture a material but does not fall into the classification of process input or process output.

Figure 5:
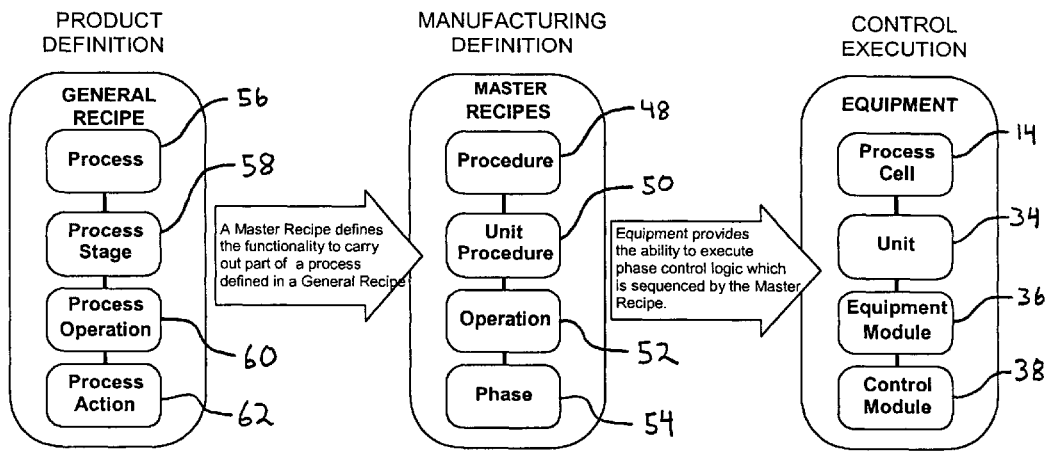
FIG. 5 illustrates the relationship between a general recipe, master recipe, and equipment.
Figure 6:
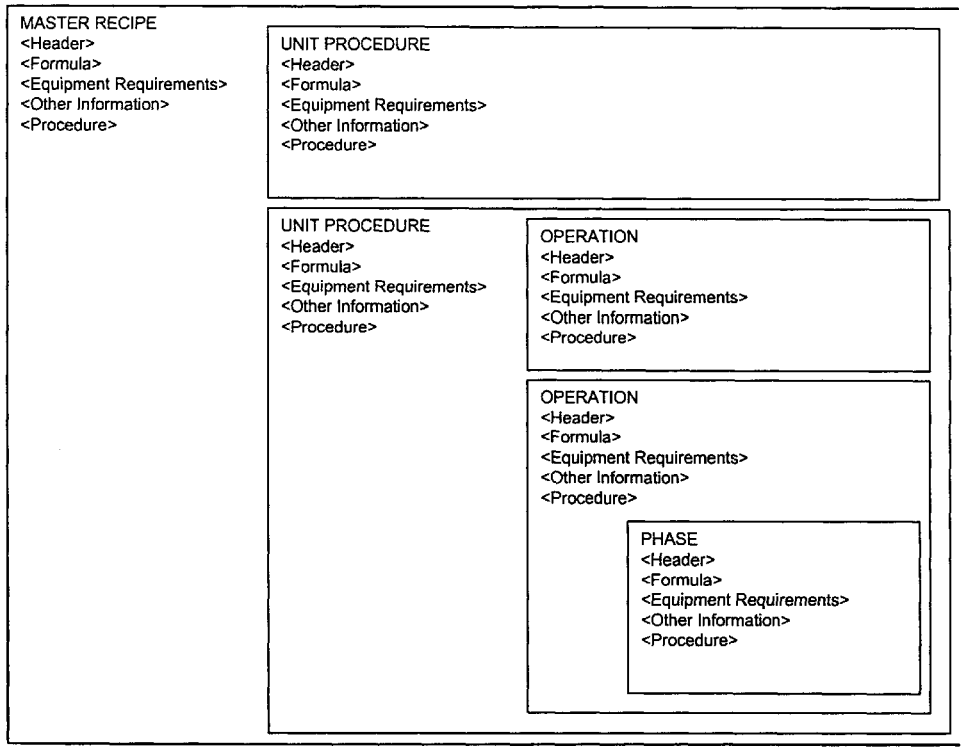
FIG. 6 shows the subdivision of elements in a master recipe.

In the preferred embodiments, the procedure section of both the general 44 and master recipes 46 may be divided into a hierarchy of elements, as shown in FIG. 5. The top level element in the master recipe 46 is procedure 48. Under the procedure are unit procedures 50. The unit procedures are subroutines or sub-procedures that identify a specific, major operation that is carried out on one unit 34. The ISA S88.01 definition for a unit procedure is "a strategy for carrying out a contiguous process within a unit. It consists of contiguous operations and the algorithm necessary for the initiation, organization, and control of those operations." The next level of subdivision in the master recipes 46 are the operations 52. Operations are typically the procedural elements necessary to accomplish one task, such as charge, react, mix, etc. As defined by ISA S88.01, the operations are "the procedural element defining an independent processing activity consisting of the algorithm necessary for the initiation, organization, and control of phases." Phases 54 are the lowest level of procedural control available to the batch control system 18. Phases correspond to a single, discrete action available to the process control system in the process cell 14 on the set of equipment 16. As defined in ISA S88.01, a phase is "the lowest level of procedural element in the procedural control model." Examples of the actions performed by recipe phases 54 are the opening of a valve, the actuation of a mixer, the actuation of a pump, the reading of a meter or gauge, etc. Recipe phases 54 are the only necessary procedural elements to perform the procedure 48 of a master recipe. They are the procedural elements corresponding directly to the discrete physical actions or process communications, such as the reading of a value, being performed on the materials in the process cell. The unit procedures 50 and operation 52 do not need to be present in a discrete and identifiable form to create the procedure 48 in the master recipe 46. All the procedural elements, when they are present in the master recipe, preferably are in the same general form of the master recipe 46. Specifically, they include a header, a formula, equipment requirements, a procedure, and other information. FIG. 6 depicts the nested nature of the hierarchy of elements in master recipe 46, each element including a header, a formula, equipment requirements, a procedure, and other information, much the same as the master recipe itself.

Figure 7:
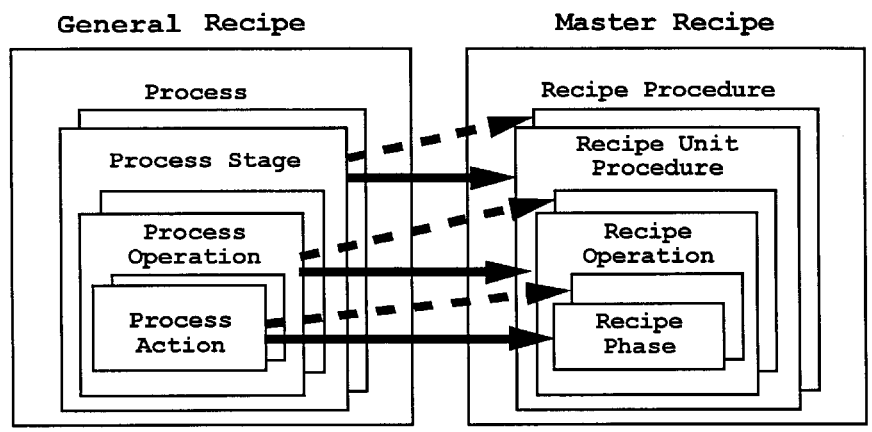
FIG. 7 illustrates the relationship between the procedural elements of a general recipe and a master recipe.

FIGS. 6 and 7 illustrate the division of possible procedural elements in a master recipe 46. The master recipe is subdivided into the unit procedures, unit operations, and recipe phases. As described previously, each of these elements is in the same basic format as the master recipe itself, that is, each element includes the same five categories of information as the master recipe—a header, a formula, equipment requirements, a procedure, and other information. The actual information contained in each of these categories of information is dependent upon which element the category pertains to. For example, the formula and equipment requirements for a recipe phase 54 are very specific. The formula may include material A as the process input and may specify valve 3b as the equipment requirements. The procedure may be actuated at 5 volts for 3 minutes. The same basic data structure used for the master recipe 46 is used for any of the modular subcomponents of the master recipe to provide a consistent form for all recipe components. This simplifies the process of analyzing data associated with recipes. The same basic data structure is also used for the general recipe 44a nd its subcomponents (for example, the process stages, process operation, and process actions).

The preferred hierarchy of procedural elements in the general recipe 44 is process 56, process stage 58, process operation 60, and process action 62. This hierarchy follows the guidelines of ISA S88.01. The process 56 of the general recipe is the equipment independent procedure for manufacturing the product. As described previously, in the preferred embodiments the general recipe 44 includes the same five major elements as the master recipe 46—the header, the formula, equipment requirements, the procedure, and other information. The specific section of the general recipe 44 containing the process is the procedure section of the general recipe. Process is simply another name for the equipment independent procedure for manufacturing the product. Although the elements of the general recipe 44 and those of the master recipe 46 are often directly related, there is no one to one relationship between the elements. For example, there may be more than one master recipe procedure 48 for performing the process 56 of the general recipe, process stages 58 do not necessarily correlate to unit procedures 50, process operations 60 do not necessarily correlate to operations 52 in the master recipe, and process actions 62 generally require more than one recipe phase 54 to perform the process action. The fuzzy relationship between the procedural elements of the general recipe and the master recipe is depicted in FIG. 7.

Figure 8:
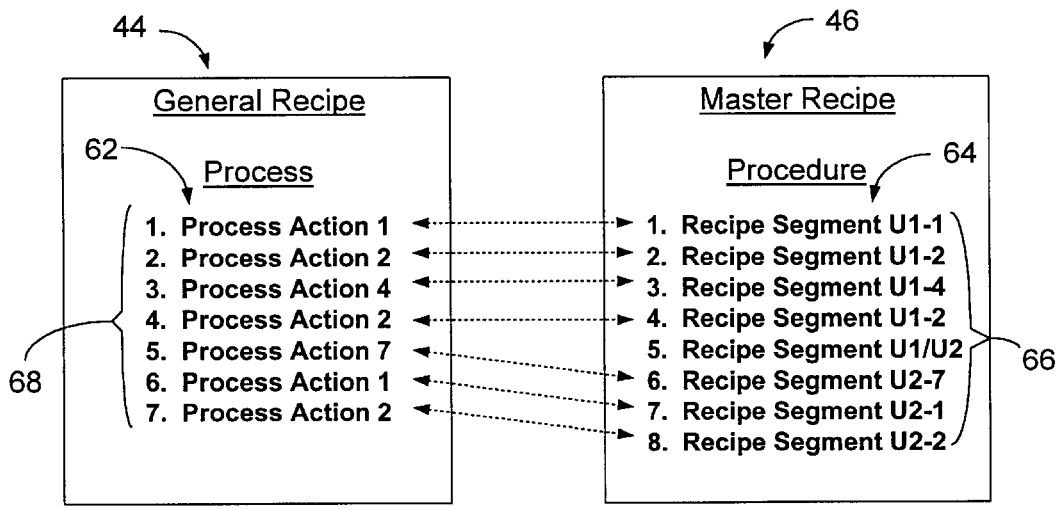
FIG. 8 is a simplified comparison of the procedural steps of a general recipe and a master recipe.
Figure 9:
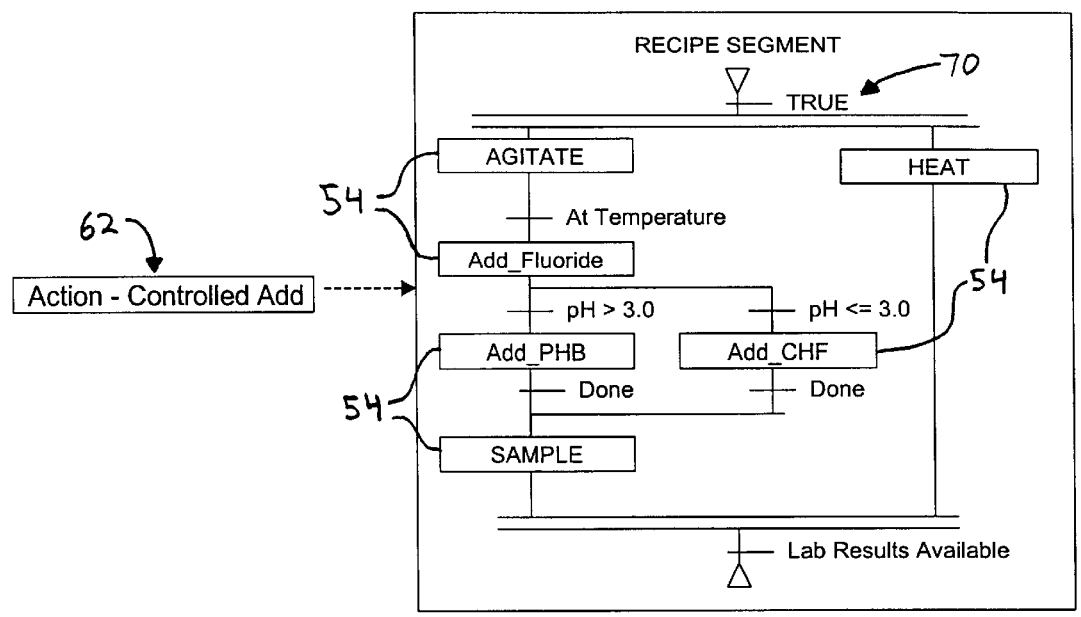
FIG. 9 is an example recipe segment for a process action.

Further in accordance with this aspect of the invention, each master recipe includes a plurality of recipe segments arranged in a manufacturing sequence and the general recipe includes a plurality of process actions arranged in a process sequence. In the preferred embodiments, the procedure 48 of the master recipe 46 is composed of recipe segments 64 arranged in a manufacturing sequence 66 that defines the sequence of operations to manufacture the product. Each recipe segment 64 preferably is a group of recipe phases 54 that is organized to perform one specific process action 62 on one specific piece of equipment. Alternatively, each recipe segment 64 may be a group of recipe phases 54 that is organized to perform a specific process action on a set of equipment 16 with one specific equipment configuration, as will be described in more detail later. The process 56 of the general recipe is preferably composed of process actions 62 arranged in a process sequence 68 that defines the sequence of operations required to define the process of the general recipe. The relationship between these elements of the master recipe 46 and the general recipe 44 is depicted in FIG. 8. The division of the master recipe 46 into recipe segments 64 provides a logical grouping of the recipe phases 54. FIG. 9 depicts the recipe segment 64 for the process action 62 corresponding to a controlled material addition. The recipe phases 54 are represented by the blocks "agitate," "add fluoride," "add PHB," "sample," "add CHF," and "heat." The logic 70, or logical sequence of operation of the phases 54 and any corresponding states which must be true to begin and end a phase are depicted by the flow lines interconnecting the blocks which represent the phases 54 as well as the other logic symbols. The logical sequence 70 for a recipe segment 64 is essentially the equivalent of the manufacturing sequence 66 for the master recipe 46. The logical sequence 70 of a recipe segment 64 defines the order in which the recipe phases 54 must be executed to accomplish the process action 62 performed by the recipe segment. The flow chart depicted in FIG. 9 is in the form of a sequential function chart (SFC), also known as a procedure flow chart (PFC), and is drawn in accordance with the requirements of ISA S88.02. Appendix 1 provides further description of how to read an SFC or PFC. The elements of a general recipe 44 can be depicted in a flow diagram or chart form called a process dependency chart, or PDC, in accordance with ISA dS88.02. The elements of a PDC, and how to read them, are provided in Appendix 2. The figures for master recipes 46 and subcomponents of master recipes (such as unit procedures, unit operations, and recipe segments) provided herein which follow the SFC or PFC format of ISA S88.02 shall be interpreted in accordance with ISA S88.02 and Appendix 1. The figures for general recipes 44 and subcomponents of general recipes (such as process stages, process operations, and process actions) provided herein which follow the PDC format of Appendix 2 shall be interpreted in accordance with Appendix 2.

The grouping of recipe phases 54 within the master recipe 46 into recipe segments 64 (which perform the process actions of the general recipe in the process cell) provides a relationship between the elements of the process 56 in the general recipe and the elements of the procedure 48 of the master recipe. This allows the general recipe 44 to be mapped to the process cell 14, as will be described in more detail later. Thus, for every process action 62 in the general recipe, there should be at least one corresponding recipe segment 64 available to the batch control system 18 which performs that process action in the process cell 14. If this is not true, the general recipe typically cannot be converted to a master recipe and cannot be performed in that process cell.

The manufacturing sequence 66 corresponds to the order in which the recipe segments 64 and recipe phases 54 should be performed in the process cell 14 to manufacture the product. The manufacturing sequence is defined by both the product and process constraints and the equipment constraints. The process sequence 68 corresponds to the order in which the process actions 62 should be performed to manufacture the product independent of equipment constraints. The process sequence 68 may be viewed as a manufacturing sequence 66 in an ideal process cell in which the equipment does not impose any additional constraints above and beyond those required by the process 56. Generally, the process sequence 68 is the simplest manufacturing sequence possible to produce the product. The one to one or more relationship between the process actions 62 and the recipe segments 64 allows the process sequence 68 to be used as an initial guess at the manufacturing sequence 66 when converting a general recipe 44 to a set of master recipes 42, as will be described in more detail later.

FIG. 8 provides a simplified representation of the organization of the process actions 62 in a general recipe 44 and the organization of the recipe segments 64 in a master recipe 46 corresponding to the general recipe. Referring to FIG. 8, the process sequence 68 corresponds to the order in which the process actions are performed in the process 56. In FIG. 8 this is represented by the order of the process actions listed from the top to the bottom. The process actions 62 can be repeated, as is shown in FIG. 8. This is because each process action 62, for example heat, may need to be performed multiple times in a single process 56.

The master recipe 46 corresponding to the general recipe 44 in FIG. 8 has more recipe segments 64 than the number of process actions 62 listed in the general recipe in the figure. The recipe segments 64 of the master recipe 46 which correlate to a specific process action 62 in the general recipe 44 are shown by the dashed line between the process action and the recipe segment in FIG. 8. The identification scheme used for the recipe segments 64 in this figure is the unit number the recipe segment is performed in followed by the process action the recipe segment performs. For example, U1-1 is the recipe segment that performs process action 1 in unit U1. This identification scheme provides a simplified representation of the general and master recipes that aids in the visualization of the processes described herein. The detailed representation of the elements of the general and master recipes for use with the preferred embodiments of the invention are the PDC's and the PFC's respectively, as described previously.

The additional recipe segment U1/U2 for which no corresponding process action 62 exists represents a material transfer from unit U1 to unit U2 that is not included in the general recipe 44. As described previously, this recipe segment is not required by the equipment independent process of the general recipe, but the equipment constraints require the transfer to perform the master recipe in the process cell. This may be required, for example, if process action 7 is not available in U1 in the process cell, but is available in U2 as recipe segment U2-7. In this case, if the procedure begins in unit U1, the material must be transferred to unit U2 prior to the performing of process action 7 for the process of the general recipe to be performed in the process cell. As discussed previously, the process sequence 68 of the general recipe corresponds to the minimum manufacturing sequence required to manufacture the product (for example, if the constraints provided by the site information are not limiting). In the example provided in FIG. 8 the manufacturing sequence 66 requires one more step than the process sequence 68 due to the equipment constraints.

Figure 13:
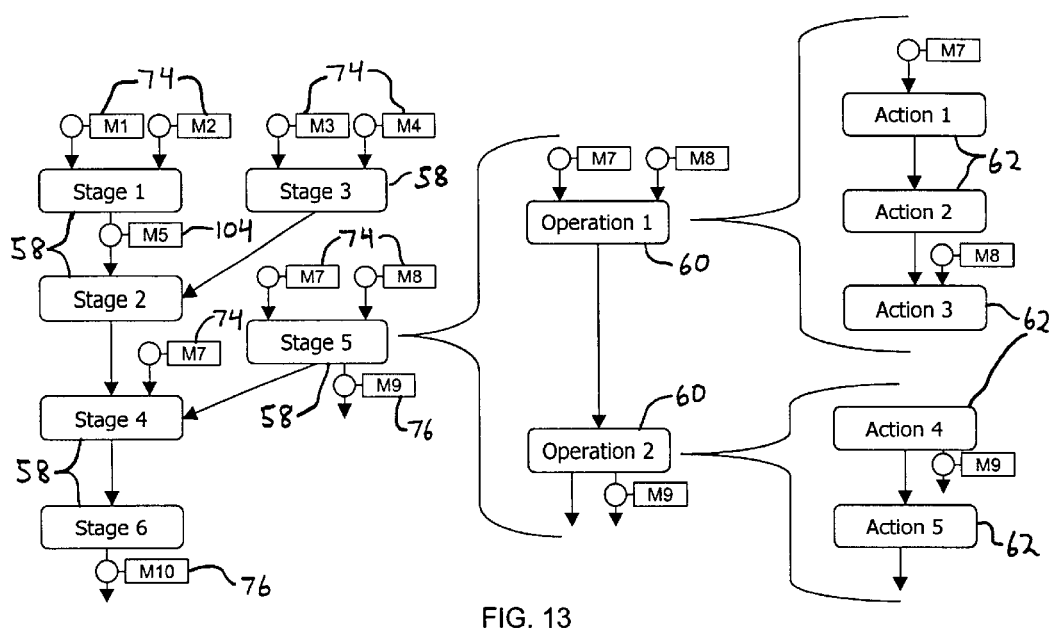
FIG. 13 is a depiction of a general recipe for the first example.

Further in accordance with this aspect of the invention, each master recipe is for manufacturing at least one product from at least one input material by performing the process actions on the at least one input material in the manufacturing sequence. In the preferred embodiments each master recipe is for manufacturing as least one product 72 from the at least one input material 74 by performing the process actions 62 on the input material 74 in the manufacturing sequence 66. Each master recipe 46 is for use with a specific set of equipment 16 in a process cell 14 and each process action 62 has one or more corresponding recipe segments 64 that implement the process action on the set of equipment. In the preferred embodiments, each master recipe 46 is for manufacturing a product or group of products 72 using the batch control system 18, as previously discussed. The master recipes 46 preferably provide the control algorithms to operate the process connected devices 22 in the process celli 14. If the master recipe 46 is a control recipe, it can be used to manufacture the product directly from the input materials 74 by operating the batch control system with the master recipe. FIG. 13 provides an example general recipe 44. If the master recipe 46 is a quantity independent master recipe, or a master recipe as otherwise defined in ISA S88.01, the master recipe can be used to manufacture the product 72 from the input materials 74 by inserting the quantity and batch or lot specific information into the master recipe to create the control recipe for the batch. In general, the specific quantities of input materials and products of a batch are determined by scaling the input materials and products of a recipe in proportion to one of the other materials, for example, one of the products in the recipe. The control recipe generated from the master recipe is then used to manufacture the lot of product requested. The latter scenario is often desirable when it can be integrated with an enterprise resource planning (ERP) system so that the lot and quantity specific information may be provided directly from the ERP system, such as SAP R/3 by SAP Corporation of Waldorf, Germany In this case, the quantity independent master recipe may be automatically converted to the control recipe using the information provided by the ERP system. This can be used to further reduce the level of operator interface, and the resulting costs and possible human errors that are often associated with the human interface.

The master recipes 46 are typically automatic, requiring little or no human interface to manufacture the product 72. This usually reduces manufacturing costs. Typically, an operator monitors the process on a control terminal communicating with the batch control system 18. He can monitor the process for any alarm conditions, provide any necessary operator input or decisions, and communicate to other functions and areas of the plant regarding manufacturing operations which are not fully automated.

Alternatively, the master recipe 46 could provide the manufacturing instructions to produce the product 72 to an operator 76 in a manual process cell 78, or in an automated process cell when manual manufacture of the product is required. The batch control system 18 for automatic or manual manufacture is depicted in FIG. 1. In this case, the process connected device is actually an instruction terminal 80 using a manual operator to perform the procedure on the set of equipment 16 in the process cell. This set up might be preferable if the process cell is not automated, or if the manufacturing operation is sensitive and requires a significant amount of human interface and decision making to assure the product is properly manufactured. This might be the case with pilot runs, or if the product is of a highly sensitive nature. The manufacturing procedure may be manual, automatic, or any combination of the two. This depends upon the needs of the company manufacturing the product, and will vary anywhere from one extreme to the other.

Further in accordance with this aspect of the invention, the general recipe is for describing how to manufacture the at least one product from the at least one input material by performing the process actions on the at least one input material in the process sequence. The general recipe is independent of equipment.

In the preferred embodiments, the general recipe 44 is for describing how to manufacture the at least one product 72 from the at least one input material 74 by performing the process actions 62 on the at least one input material in the process sequence 68. The process 56 of the general recipe 44 describes the order in which to perform the process actions 62, independent of equipment, as previously described. The general recipe 44 is analogous to the recipe one might use in the kitchen to make a cake, where the recipe does not specify what type of oven to use, or what type of mixer. It defines the minimum process necessary to manufacture the product without equipment constraints. The process actions 62 are the actual steps of the process required to perform the various material transformations that create the product from the input materials. For example, mix, heat, dry, etc. It should be noted that the at least one product 72 and the at least one input material 74 do not need to be matter, both the at least one product and the at least one input material could be in the form of energy, matter, or any combination thereof. For example, a processing plant may use waste heat from a reaction to heat water to steam, use the steam to drive a turbine mechanically coupled to a generator, and produce electrical power to use within the plant or to sell. In this case the at least one product 72 includes electrical energy.

In the preferred embodiments, the site information 40 is includes material flow information 82, recipe segment information 84, and equipment information 86. The master recipe 46 includes equipment specific and process cell specific information, as well as the process and product specific information of the general recipe 44. This information is contained in the site information 40 as shown in FIG. 4. As described previously, the master recipe 46 includes all the detailed information necessary to manufacture the product 72. The key differences between the master recipe 46 and the general recipe 44 may be better understood by the simplified example provided in FIG. 10. FIG. 10 provides a verbal description of the steps associated with the process 56 of a general recipe 44 to manufacture a product C from input materials A and B. FIG. 10 also provides a verbal description of the steps associated with the procedure 48 of a corresponding master recipe 46 which might be used manufacture the product C from input materials A and B in a specific process cell. In FIG. 10, each step in the general recipe is adjacent to the step in the master recipe that corresponds to the first step of the master recipe required to perform the adjacent general recipe step. For example, step 3 of the general recipe in FIG. 10, "Mix for 30 minutes at ½ turn over of material per minute" is performed by steps 15 through 22 of the master recipe. Steps 1–4 and 29–32 of the master recipe do not correspond to any of the steps of the general recipe. These steps are startup and shutdown steps required by the equipment in the process cell. In this verbal example of a general and master recipe, the steps in the general recipe are equivalent to process actions 62 and the steps in the master recipe are equivalent to recipe phases 54.

The general recipe 44 provides the product and process information and the master recipe 46 provides the product, process, equipment, and equipment configuration information. The general recipe 44 answers the questions of:

1. What consumable or input materials are required to manufacture the products, both type and quantity (normalized to product quantity)?
2. What are the products or by-products created by the recipe, both type and quantity (normalized to product quantity)?
3. What is the process to be performed to manufacture the product from the input materials (procedural steps and execution order)?
4. What additional material or process constraints (including equipment requirements such as materials of construction) are necessary to manufacture the product?
5. What other general information is required (such as detailed product description, recipe management data, safety and regulatory data about the product or process, etc.)?

The master recipe 46 answers the above questions and the additional questions of:

6. What specific equipment is to be used to manufacture the product?
7. What specific operations are to be performed on the materials with each piece of equipment, in what order, and when?
8. How are the materials to be transported into and between the different units used in the procedure, in what order, and when?
9. (If the master recipe is a control recipe) What exact lots of input materials are to be used, exactly how much of each lot of input material is to be used, exactly now much product is to be manufactured, what lot identification is to be given to the product lot, and what other batch and lot specific information is required?
10. What manufacturing data needs to be collected and archived as historical data?

Figure 11:
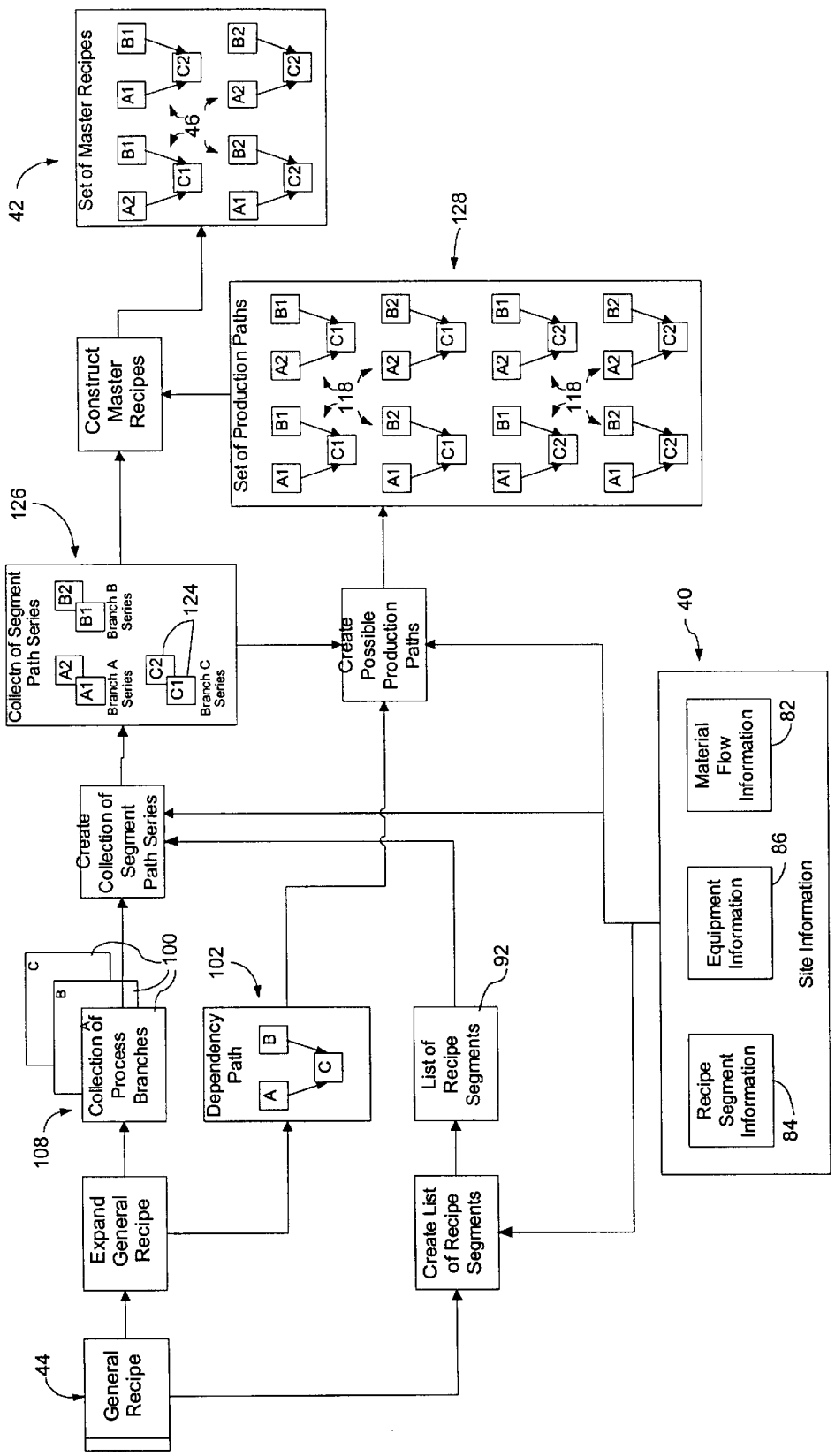
FIG. 11 is a block diagram for a second preferred embodiment of the invention.

The answers to questions six through eight are required to create quantity independent master recipes 46. The answers to question nine are only required when the master recipe 46 is a control recipe. In the preferred embodiments, the information required, above and beyond that which is provided in the general recipe 44, to answer questions six through eight is the site information 40. The site information 40 includes material flow information 82, recipe segment information 84, and equipment information 86, as depicted in FIG. 11. The site information may also include other site related information, such as restrictions on material usage for specific materials, equipment unit allocation information, etc. The site information 40 can be in any form that stores the necessary information and provides it for recipe conversion of the general recipe 44 to the master recipe 46. In the preferred embodiments the site information 40 is stored in relational databases, such as Microsoft SQL-SERVER by Microsoft Corporation of Redmond, Wash. or ORACLE 7 by Oracle Corporation of Redwood Shores, Calif. Alternatively, the data can be stored in binary or text files. The material flow information, recipe segment information, and equipment information may be stored in one database or a number of different databases. In the preferred embodiments these three varieties of site information 40 are stored in multiple databases.

Figure 12:
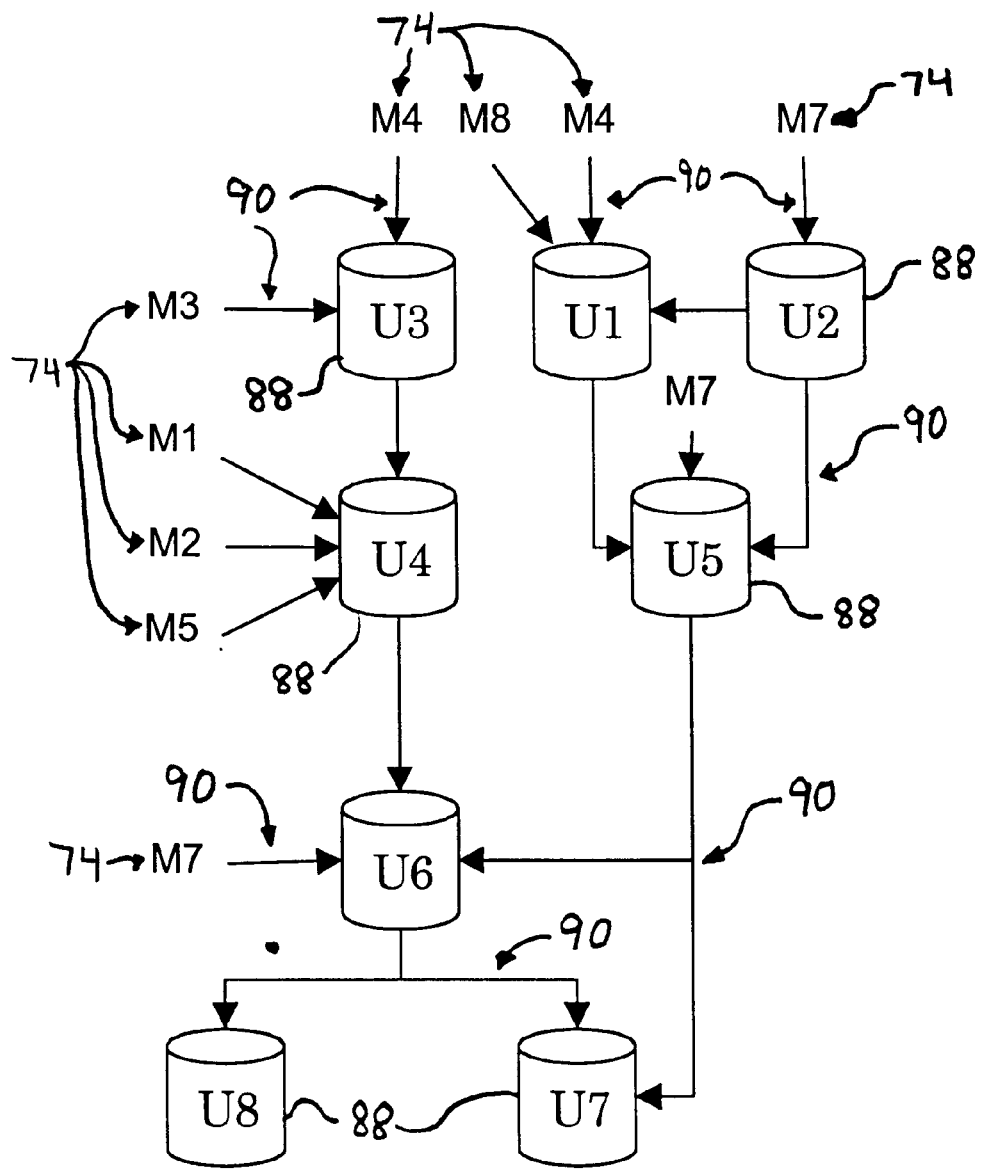
FIG. 12 is the process cell configuration for the first example.

To aid the reader in understanding the methods associated with the preferred embodiments of the invention, FIG. 12 provides an example of a specific process cell configuration and FIG. 13 provides the process dependency chart for a specific general recipe 44. The following description of the preferred methods of the invention will use the process cell configuration provided in FIG. 12 and the general recipe representation provided in FIG. 13. The following description will explain, in accordance with the preferred embodiments of the invention, how a set of master recipes 42 will be created to perform the process of the general recipe 44 of FIG. 13 in the process cell 14 of FIG. 12. FIGS. 14, and 35 through 45 will be used to aid in the description of the preferred methods of conversion of the general recipe to a set of master recipes. FIGS. 15 through 18 represent the site information 40 associated with the process cell depicted in FIG. 12. The representations of the data structures and the components of the general 44 and master recipes 46 provided in these figures are simplified representations to aid in the readers understanding of the preferred methods of the invention. The preferred data structures and form for the general and master recipes are described in detail later.

FIG. 12 shows the units 88 within the process cell 14, the material flow paths 90 between the units in the process cell, and the input materials 74 available to the process cell. The material flow paths 90 show both interconnections available between the units 88 and between the input materials 74 and the units, as well as the direction which material may flow via these flow paths. The allowable direction of flow is depicted by the arrow at the end of each material flow path 90. The units 88 are designated as U1 through U8. The input materials 74 are designated as M1 through M7.

FIG. 13 depicts the general recipe 44 of the example in the form of a PDC. The input materials 74 required by the general recipe are M1 through M4, M7 and M8. M5 is an intermediate material produced by Stage 1 of the general recipe. M9 and M10 are the products 72 produced by the general recipe of the example. The process stages 58 of the example are Stage 1 through Stage 6. Each process stage is an ordered grouping of process operations 60 and each process operation is an ordered grouping of process actions 62. FIG. 13 shows the expansion of Stage 5 into process operations 60 identified as Operation 1 and Operation 2. FIG. 13 further shows Operations 1 and 2 exploded to their respective underlying process actions 62 represented by Actions 1 through 3 for Operation 1 and Actions 4 and 5 for Operation 2. To simplify in the explanation of the method of the preferred embodiments of the invention, the following explanation will focus primarily on the details of the conversion process regarding Stage 5 of the general recipe in FIG. 13. The conversion and reconstruction of the balance of the stages follows the same method as is described for Stage 5 in the following; therefore, the explanation of the conversion of the other stages will be described with less detail.

Figure 14:
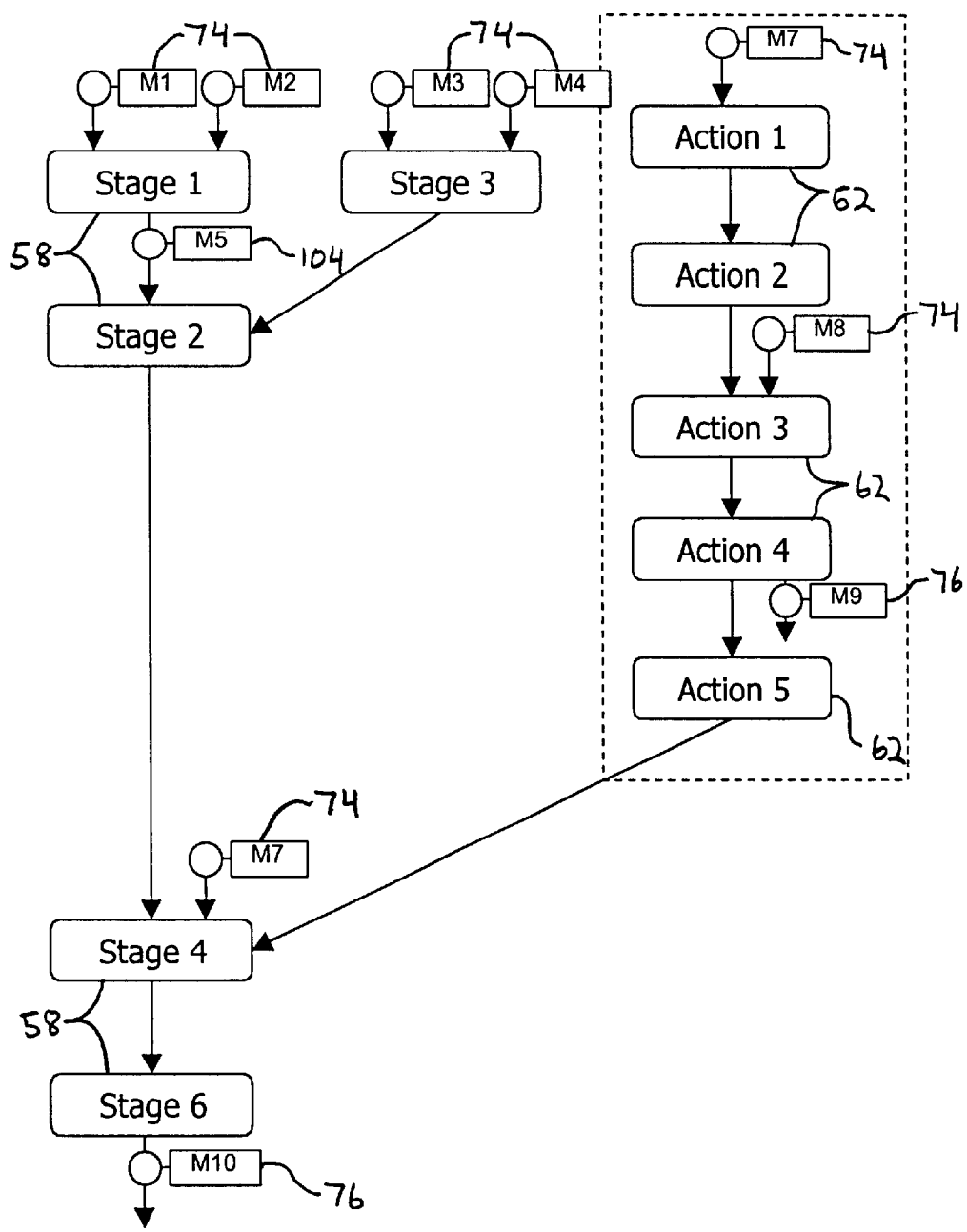
FIG. 14 is another depiction of the general recipe for the first example.

FIG. 14 depicts the general recipe 44 of FIG. 13 exploding Stage 5 into the Actions 1 through 5. As was described earlier, the process stages 58 and the process operations 60 provide useful groupings of the process actions 62 of the general recipe, but the process actions are the only required elements of the general recipe. The process stages and the process operations are for convenience only.

The material flow information 90 preferably includes information describing how material can flow in the process cell 14. This includes identifying the available flow paths between the different units and other pieces of equipment in the process cell, as well as the material flow paths providing material into and out of the process cell. The latter flow paths provide the information on the availability of materials (such as input materials), and the availability of storage reservoirs (such as for intermediate materials or products). This defines where material can be charged into the process, such as input materials, and where process products and byproducts can be routed for storage. These flow paths may be to storage vessels within the cell 14, or more typically, storage tanks located outside the cell.

An example of a database structure for the material flow information 90 is provided in FIGS. 15 and 16. The data structures in these figures are for the process cell depicted in FIG. 12. The database depicted in FIG. 15 identifies the flow connections between the units 88 and the recipe segments 64 associated with the transfers between the units. For each aterial transfer connection available, the database identifies:

1. the unit 88 from which the transfer may be performed identified in the "Unit From" column,
2. the unit 88 to which the transfer may be made identified in the "Unit To" column,
3. the recipe segment 64 associated with the unit from which the transfer may be performed identified in the "Transfer From Recipe Segment" column, and
4. the recipe segment associated with the unit to which the transfer may be performed identified in the "Transfer To Recipe Segment" column.

As described previously, these recipe segments 64 include all the necessary recipe phases 54 to accomplish the transfer. The transfer from recipe segment typically will include the recipe phases to open the appropriate outlet valve to allow the transfer to occur. It may include the recipe phase to activate the pump to affect the transfer and recipe phases for monitoring flow meters or unit load cells to monitor the transfer as it is performed. The transfer to recipe segment will typically include the recipe phase to open the inlet valve to allow the transfer to the receiving unit to occur. It may also include the recipe phase for activating the pump and recipe phases for monitoring flow meters or unit load cells to monitor the progress of the transfer.

The example database provided in FIG. 16 contains both material flow information 82 and recipe segment information 84. The material flow information contained in this database is the information defining input material availability to the process cell 14. The column labeled "Recipe Segment" identifies the recipe segments available within the process cell. Because some of these recipe segments 64 are the segments associated with the charging of an input material 74 into a unit 88, this database contains information that falls under the category of material flow information 82. The column labeled "Material" identifies the input material 74 associated with the corresponding recipe segment contained in its row. The column labeled "Unit" identifies the unit 88 in which the recipe segment contained in the same row is available. If the cell in the material column is blank for any row, then the recipe segment does not correspond to an input material addition or charge. The column labeled "Action" identifies the process action 62 which is performed by the recipe segment 64 contained in the same row. Thus, the database of FIG. 16 identifies the recipe segments 64 available within the process cell 14, the unit 88 in which they are available, the process actions 62 which they perform within that unit, and, if they are an input material addition, the input material 74 which they provide to the unit.

In the example provided in FIG. 16, unit U1 of the process cell 14 has process actions 1 through 5 available within the unit. Action 1 is available through recipe segment SEG U1-1-7 and is associated with the material addition of input material M7. Action 2 is available through recipe segment SEG U1-2. SEG U1-2 does not have any associated input material. Action 3 is available through recipe segment U1-3-8 and is associated with the material addition of input material M8. Action 4 is available through recipe segment SEG U1-6 and is not associated with a material addition. Action 5 is available through recipe segment SEG U1-5 and is not associated with a material addition.

For the purposes of this example, the nomenclature used to identify recipe segments 64 consists of the following (1) a prefix "SEG" identifying that the tag is a recipe segment, (2) the "SEG" prefix is followed by the unit number in which the recipe segment is available, for example "U1" or "U2," (3) the unit number is followed by the process action number the recipe segment performs, for example "1" for "Action 1, " "3" for "Action 3, " etc., and (4), if applicable, the material number of the input material associated with the recipe segment, for example, "4" if the recipe segment is for the addition of input material "M4," "7" if the recipe segment is for the addition of input material "M7," etc. Thus, SEG U1-1-7 is for a recipe segment performing Action 1 on U1, which is a material addition of M7 to U1. Each recipe segment identification is unique, therefore, if there are two different recipe segments available on the same unit, performing the same process action, and associated with the same input material (if applicable), the recipe segment identifiers must include additional characters to make each identifier unique. In FIG. 16, this situation occurs in unit 2, where Action 1 is available to add input material M7 via two different recipe segments. In this case, the first recipe segment is identified as SEG U2-1-7 and the second recipe segment is identified as SEG U2-1-7B. The addition of the character "B" allows both recipe segment identifiers to be unique. This identification scheme is used herein for this example and is intended for the purpose of improving the readers understanding of the preferred methods of the invention described in the following paragraphs. The preferred methods of identification and representation of the general 44 and master recipes 46, the site information 40, and other data associated with the conversion process are described in detail later.

The column labeled "Class" in the database represented in FIG. 16 identifies if the recipe segment 64 identified in the row is intended for a class of equipment instead of a specific unit 88. This provides for the option of creating master recipes 46 which are intended to be performed on a specific class of equipment, for example, in process cells 14 with the same basic type of equipment and equipment layout. If a cell in this column is labeled "No", this means that the recipe segment 64 identified in the row containing that cell is for use with a specific unit and a specific piece or pieces of equipment. If the cell is labeled "Yes", the recipe segment is for use with a specific class of equipment and may be performed on any piece of equipment, which is of the required class. A benefit of allowing for classes of equipment is that a master recipe 46 or a portion of a master recipe that is created for a class of equipment may be performed on a multitude of pieces of equipment provided multiple pieces of equipment are available in that class. This, of course, is only true if the company using the master recipe designs their process cells in a manner providing equipment classes.

Other types of information that may be included as flow information 82 might include maximum flow capacities, flow resistances, and materials of construction for the flow connections. For example, the line connecting unit 1 to unit 2 in the process cell 14 might be a type 304 stainless steel line with a maximum capacity of 100 gallons per minute (GPM) and a flow resistance of 0.5 psi differential pressure per GPM. This information could be included as part of the flow information.

The recipe segment information 84 preferably identifies all of the recipe segments 64 which are available for performing process actions 62 in the process cell 14 and what process action each recipe segment performs. The recipe segment information also identifies what equipment each recipe segment 64 runs on, the information required by the recipe segment to operate, for example, mixer speed or control temperature, as well as any operational limits associated with the recipe segment, for example, temperature ranges for heaters and chillers, speed ranges for blenders, flow rate ranges for pumps, etc. In the preferred embodiments, recipe segment information 84 other than that which is shown in the tables of FIGS. 16 and 17 is contained in each recipe segment 64 itself, for example, under the equipment requirements section for the recipe segment, as described previously. An example of the database structure for the recipe segment information 84 is provided in FIG. 16 and 17.

The database depicted in FIG. 16 includes all the recipe segments available in the process cell for performing process actions, as described previously. FIG. 17 depicts the database for any unit start or unit end recipe segments required for the units in the process cell 14. The start and end segments correspond to the recipe segments 64 necessary to prepare a unit 88 for use, or to clean up the unit after its use is completed. Examples of operations which may be required at the start or end of the use of a unit in a process may be unit cleaning procedures, unit checkout procedures, unit temperature conditioning procedures (such as warm up), unit purging procedures, and the like. Any unit may require a start recipe segment, an end recipe segment, or both. Alternatively, a unit may not require either a start or an end recipe segment. The database depicted in FIG. 17 identifies any start recipe segment required by a unit in the column labeled "Start Recipe Segment," any end recipe segment required by a unit in the column labeled "End Recipe Segment," and the corresponding unit number with which the respective segments are associated in the column labeled "Unit." If the start or end recipe segment cell in FIG. 17 is identified as <null>, then there is no corresponding start or end recipe segment for that unit. For example, unit U1 has a start recipe segment identified as SEG U1-S and does not have any end recipe segment, unit U4 has a start recipe segment identified as SEG U4-S and an end recipe segment identified as SEG U4-E, Unit U6 does not have a start or an end recipe segment.

The equipment information 86 preferably identifies the characteristics associated with each piece of equipment in the set of equipment 16 in the process cell 14. The equipment information preferably includes equipment limits such as equipment capacities (for example, 5000 gallons) and other equipment limits (for example, 200 psig maximum pressure capability). In addition, the equipment information preferably includes equipment materials such as stainless steel or glass lined, and any other equipment characteristics associated with each piece of equipment that may be required to determine if a specific operation can be performed on that piece of equipment. An example of a database structure for the equipment information 86 is provided in FIG. 18.

In the preferred embodiments, the site information 40 is stored in relational databases. As a result, data files do not follow the simple tabular structure presented in FIGS. 15 through 18 of the example. These tabular structures are used to describe the preferred embodiments because they are easier to read and visualize. The preferred data structures and methods of describing the representing the recipes and the site information will be described later. In the preferred embodiments, the equipment information 86 is distributed between an equipment information database and the recipe segments 64 themselves. As described previously, each recipe segment is a recipe unto itself. It is composed of a header, a formula, a procedure, equipment requirements, and other information. The equipment requirements section of each recipe segment 64 will typically contain equipment information associated with that recipe segment (for example, minimum and maximum flow rates for material charge recipe segments). Since the recipe segment is generally for a specific unit 88 and a specific equipment module 36 or control module 38 (unless the recipe segment is class based, in which case it is for a specific class of units), it has very specific equipment limits, capabilities, and requirements associated with it. Where the equipment information 86 is stored, in the recipe segments 64 or in a separate data file, is a matter of the programmer's preference. The selection is generally determined based on which location of storage provides the best balance of computational speed, memory requirements, and other requirements such as ease of revision, etc. Generally, if the equipment information 86 is associated with a specific unit, but is not associated with a specific recipe segment, then the equipment information 86 is located in a separate data file specifically for the equipment information. For example, unit capacity, unit materials of construction, unit operating limits such as temperature or pressure, etc. are associated with the specific units but are not specific to any one recipe segment 64 associated with that unit (these types of equipment information are independent of recipe segments, the units capacity or its materials of construction do not change from one recipe segment to another).

FIG. 18 provides an example of a data file for unit specific equipment information. In the example data structure the unit specific equipment information consists of the unit identification, the material of construction, the unit type, the volume of the unit, the minimum and maximum agitation speed for the unit, the minimum and maximum operating temperature for the unit, and the minimum and maximum operating pressure for the unit. The unit identification, U1 through U8, is provided in the first, or left most column of the table, labeled "Unit." The material of construction for the units is provided in the second column, labeled "Material of Construction." The abbreviations "SS" and "SS/GL" stand for stainless steel and stainless steel, glass lined. The unit type is provided in the third column of the table, labeled "Unit Type." In this case the units in the process cell of FIG. 13 are designated as either mixers, chillers, reactors, or separators. The next adjacent column, labeled "Volume," provides the volume of each unit. In this case the each unit volumes vary from 2,000 to 10,000 gallons.

The mixing capabilities of each unit is provided in the two columns of FIG. 18 labeled "Agitation Speed." The column sub-labeled "Max." provides the maximum agitation speed for each unit. The column sub-labeled "Min." provides the minimum agitation speed for each unit. Agitators for units may be variable and capable of operation at a multitude of speeds, or the agitators may only be capable of operation at a fixed speed.

In FIG. 18, if the minimum agitation speed is "0" then the agitation speed may be varied between "0" and the maximum agitation speed. If the minimum speed is the same as the maximum speed then the agitation speed is a fixed speed and may only be operated at that fixed speed or shut off. The table could also include a column that identifies the variety of agitator, fixed speed or variable. The units for agitation speed could be impeller speed, such as RPM, or the units could be in the form of volume of fluid mixed per unit time (gallons mixed per minute) or number of times the entire unit's volume is mixed per minute (turnovers per minute).

The two columns of FIG. 18 labeled "Temperature" provide the 45 minimum and maximum operating temperature for each unit. The minimum operating temperature is given in the column sub-labeled "Min." and the maximum in the column sub-labeled "Max." If the table cell in the column contains "<NULL>" then the unit does not have temperature conditioning control module, such as a cooler or a heater, and the unit is only capable of ambient operation for that respective temperature capability. For example, unit U1 indicates <NULL> for both the minimum and maximum temperature capabilities of the unit. This means unit U1 does not have a heater or a cooler, and is only capable of ambient operation. Unit U2 has <NULL> in the "Max." temperature column and –50 in the "Min." column. In this case unit U2 has a cooler and is capable of operation down to –50 degrees centigrade, but the unit has no heater. Its maximum operation temperature is ambient. Unit U5 has <NULL> in the "Min." temperature column and 250 in the "Max." column. In this case, unit U5 has no cooler, but it does have a heater. Unit U5 has a minimum operation temperature of ambient and a maximum operating temperature of 250 degrees centigrade. Unit U4 has –50 in the "Min." temperature column and 300 in the "Max." column. In this case, unit U4 has both a cooler and a heater and is capable of operating at down to –50 degrees centigrade and up to 300 degrees centigrade.

The two columns labeled "Pressure" in FIG. 18 provide the minimum and maximum operating pressures for each of the units. The minimum operating pressure is provided in the column sub-labeled "Min." and the maximum operating pressure is provided in the column sub-labeled "Max." Similar to the temperature columns discussed previously, the cells filled in with "<NULL>" indicate that the unit does not have a pressure conditioning control module, such as a pressurizing pump or a vacuum pump, and the unit is only capable of ambient operation for that respective pressure capability. The pressure values provided in FIG. 18 are in atmospheres gauge, so a "–1" means a vacuum of one atmosphere and a 30 means a pressure of 30 atmospheres gauge. Based on FIG. 18 units U1 and U2 are only capable of operating at ambient pressure, unit U5 is capable of an upper operating pressure of 50 atmospheres gauge and is not capable of operating at vacuum, and the remaining units are capable of both vacuum and pressurized operation.

FIG. 18 provides a possible data structure for the unit specific equipment information of the process cell provided in FIG. 12 for the example. The actual data structure, the units of measure used for the various pieces of data (such as pressures, temperatures, volumes, etc.), the information selected to be in the database, etc. are all matters of choice. In the preferred embodiments, the users select the units of measure to be used for each data type. The users preferably also select what information is included in the unit specific equipment information database and in the equipment requirements section of each recipe segment.

FIG. 19 through 34 are block flow diagrams depicting the algorithms for performing the conversion of a general recipe 44 to a set of master recipes 42 in accordance with the preferred embodiment of the invention. The following paragraphs will explain in detail the method of the preferred embodiment using the example process cell of FIG. 12, the general recipe of FIG. 13, and the site information provided in the databases depicted in FIG. 15 through 18.

Figure 19:
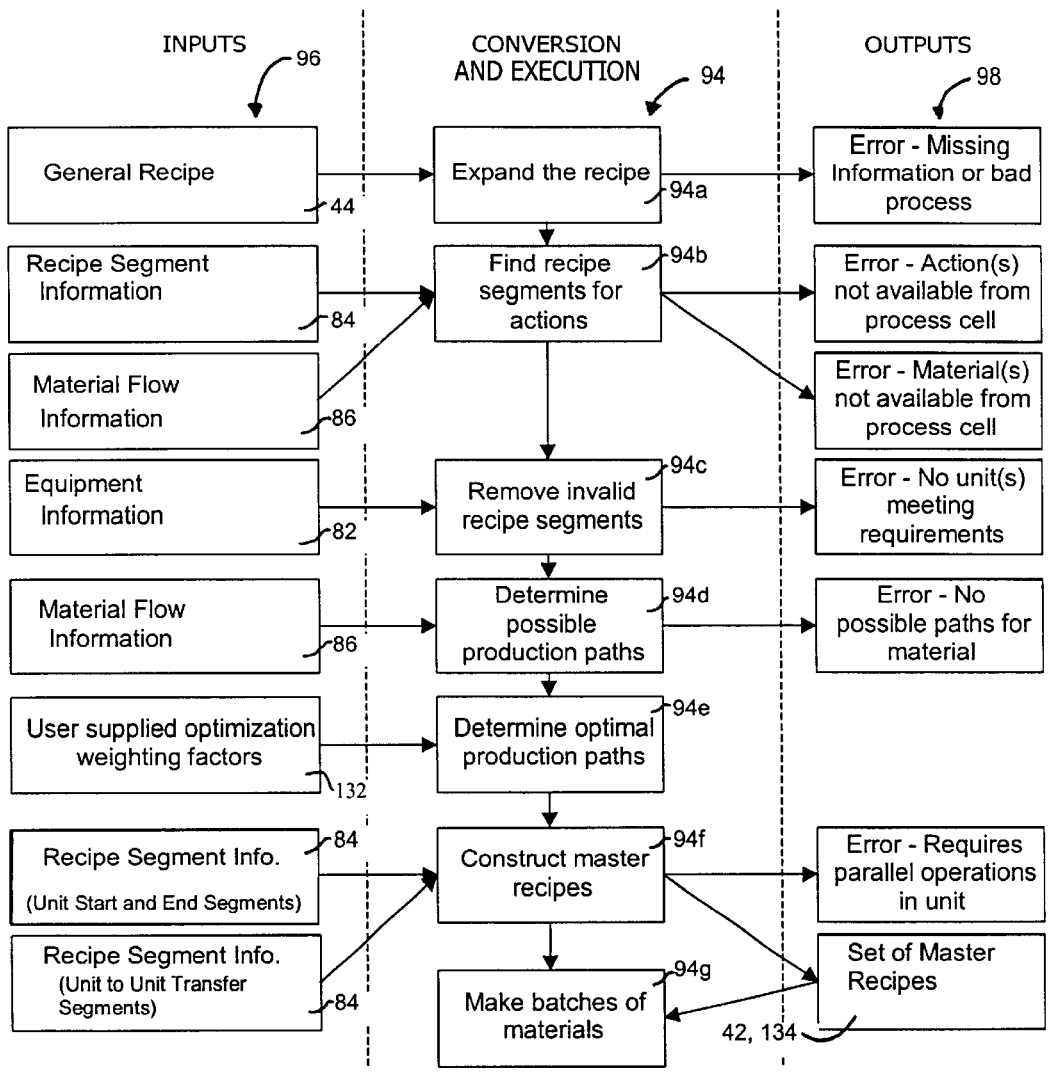
FIG. 19 is another block diagram for the preferred embodiments of the invention.
Figure 20:
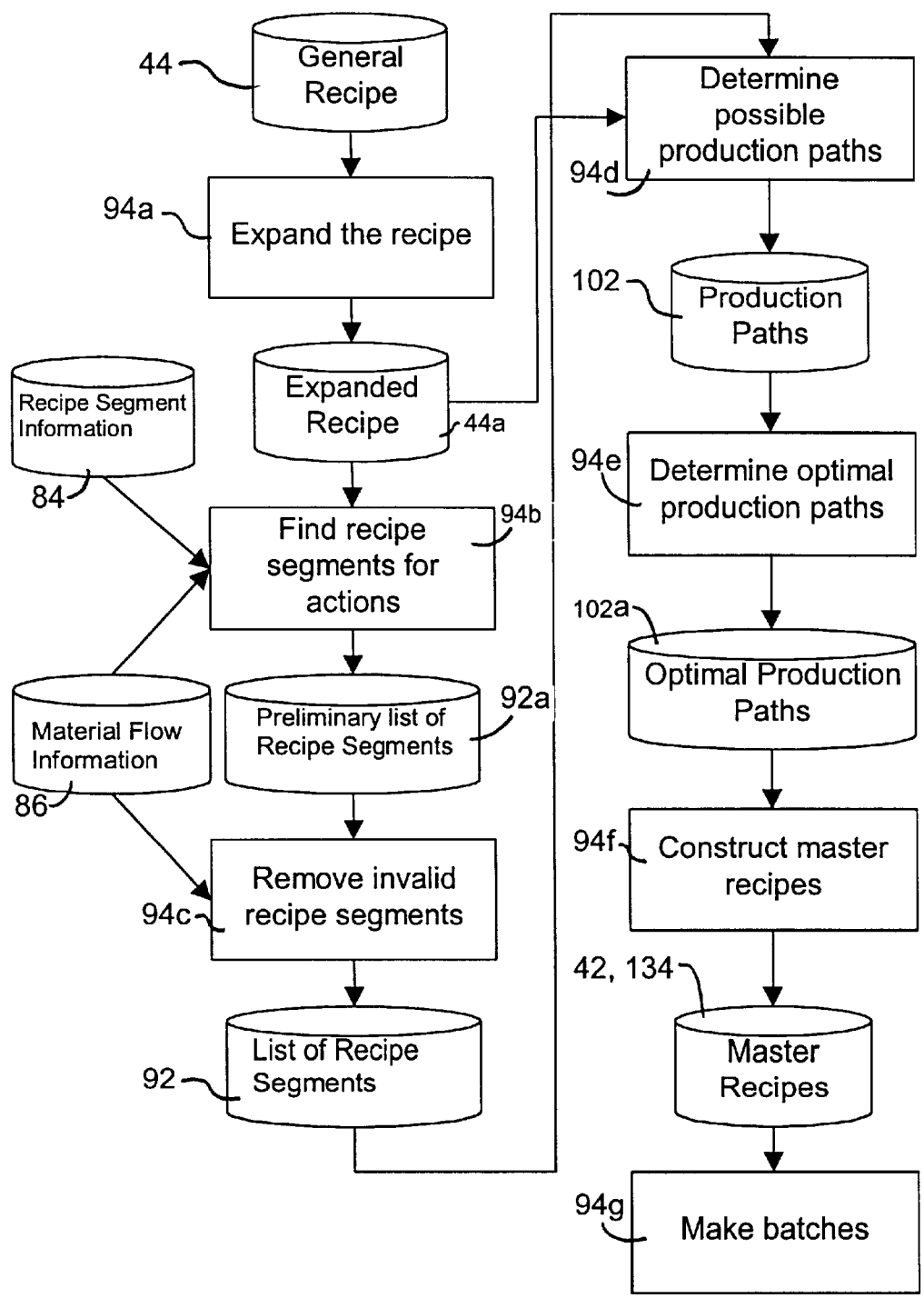
FIG. 20 is another block diagram for the preferred embodiments of the invention.

Further in accordance with this aspect of the invention, the method includes a first step of creating a list of recipe segments. The list of recipe segments includes each process action in the general recipe and a listing of all the corresponding recipe segments for that process action which can perform that process action in the process cell. In the preferred embodiments according to this aspect of the invention, the method includes a first step of creating a list of recipe segments 92. The list of recipe segments includes each process action 62 in the general recipe 44 and a listing of all the corresponding recipe segments 64 (constructed from the recipe phases 54 available in the process cell 14) for that process action which can perform that process action. FIGS. 4 and 11 provide general flow diagrams for the preferred method of the invention. FIGS. 19 and 20 depict the general flow diagram for the preferred embodiments of the conversion process providing additional detail. FIG. 19 depicts the conversion process in the form of conversion execution steps 94 with conversion inputs 96 fed into the conversion algorithms from the right and the resulting conversion outputs 98 from the conversion execution steps provided to the left. FIG. 20 depicts the same conversion process in a more traditional sequential flow diagram. The conversion inputs consist of the general recipe 44 and the site information 40. Referring to FIG. 19, the top input block is the general recipe 44. The balance of the input blocks below the general recipe are the various types of site information 40. The output blocks 98 consist of the set of master recipes 42 and any corresponding errors or reports that may be generated by the conversion algorithm of the preferred embodiments.

To assist in the understanding of the method in accordance with the preferred embodiments of the invention, the following is a description of the figures depicting the algorithms used in the preferred embodiments. FIG. 4 depicts the most general flow diagram of the preferred methods of the conversion process. FIG. 11 provides a more detailed depiction of the presently preferred methods of the invention. FIGS. 19 and 20 provide an additional level of detail explaining the preferred embodiments of the invention. FIG. 21 through 34 provide the detailed algorithms for performing each of the conversion execution steps shown in FIGS. 19 and 20.

In accordance with the preferred embodiments of the invention, the first step of the conversion process is to create a list of recipe segments 92, as described previously, and as shown in generalized form in FIGS. 4 and 11. The conversion inputs required to perform this step are the general recipe 44, the recipe segment information 84, as shown in FIG. 19. The conversion execution steps that create the list of recipe segments 92 are steps 94a through 94c of FIGS. 19 and 20. The resulting intermediate data structure is the list of recipe segments as shown in FIG. 20.

Figure 35:
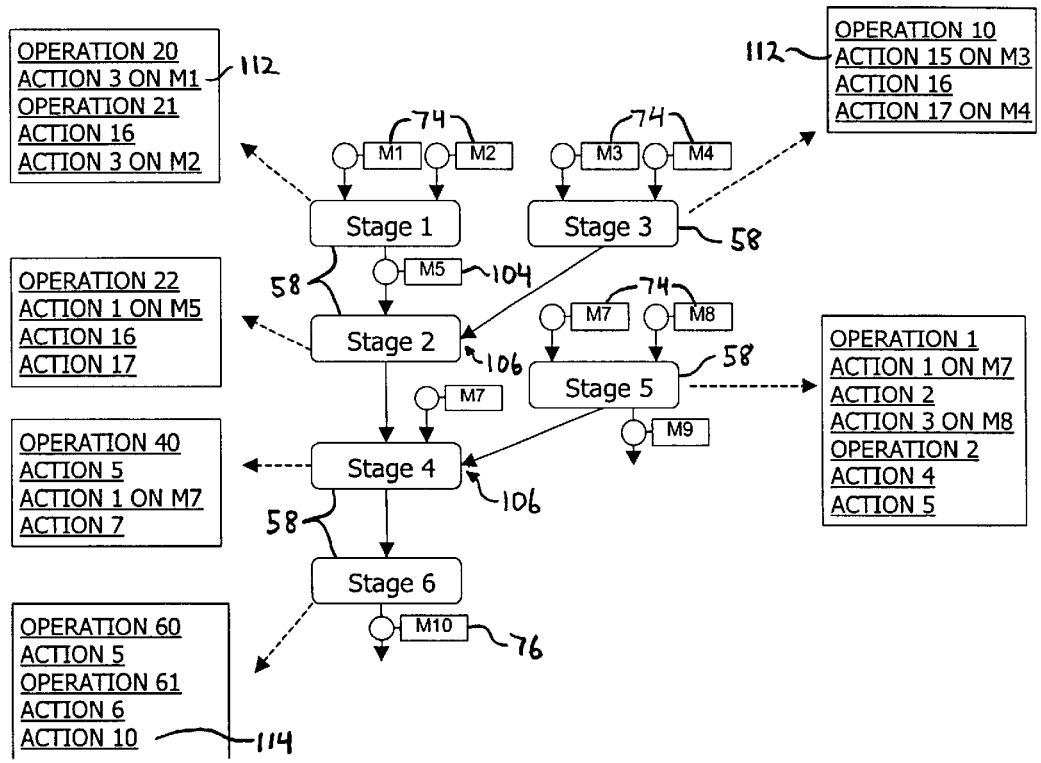
FIG. 35 shows the general recipe of the first example including the underlying process actions and process operations.

Referring to FIGS. 19 and 20, the first conversion execution step required to create the list of recipe segments 92 is step 94a which expands the general recipe. This results in the expanded general recipe 44a. Referring to FIG. 35, the general recipe of FIG. 13 is shown including the details of the process broken down into process operations 60 and process actions 62. As described previously, each process stage 58 is made up of process operations, which are further composed of process actions. The conversion execution step 94a expands the general recipe 44 from the form of process stages 58 to the detailed process operations 60 and process actions 62 required to perform the process 56 of the general recipe, as described more fully below.

Referring to FIG. 35, the process operations 60 are ordered groupings of process actions 62. The operation identifiers, for exampler ⁂ OPERATION 20⁂, ⁂ OPERATION 21⁂, etc. are labels identifying the starting point of each process operation. The steps associated with that process operation begin with the process action 62 following that process operation label and end at the last process action prior to the next process operation label encountered. For example, as shown in FIG. 35, Stage 1 consists of two process operations, OPERATION 20 and OPERATION 21. OPERATION 20 consists of one process action, ACTION 3 which is performed on material M1. OPERATION 21 consists of two process actions, ACTION 16 followed by ACTION 3 performed on material M3.

Figure 36:
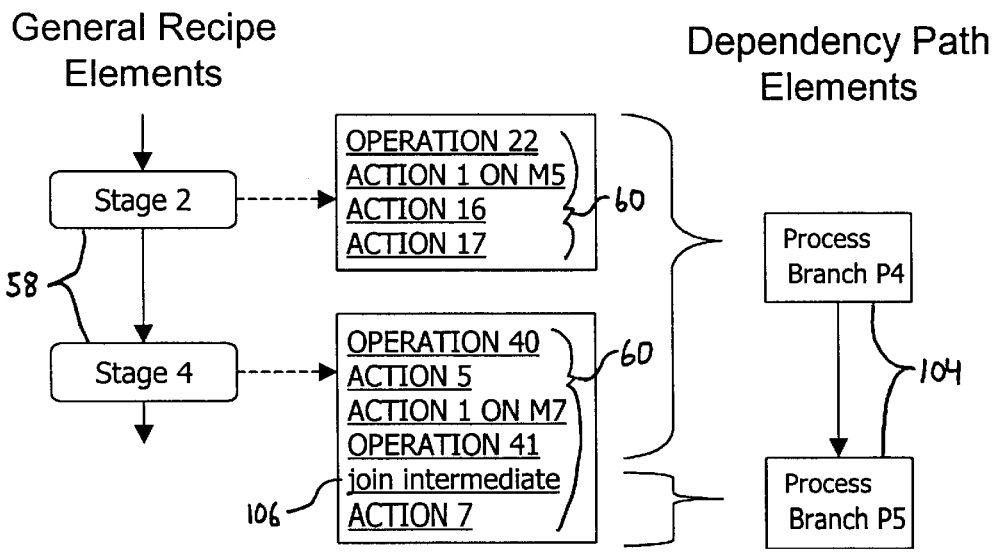
FIG. 36 shows process stages 2 and 4 of the general recipe of the first example including the material joins and process branches.

In the preferred embodiments, the process actions 62 of the general recipe 44 are organized into at least one process branch 100 and the process branches are interconnected in a dependency path 102 to form the general recipe. The process branches 100 are for describing how to process at least one material 104 (such as intermediate material M5 as shown in FIG. 35) separately without a material join 106 from another process branch. FIG. 36 depicts Stage 2 and Stage 4 expanded to show the underlying process operations 60 (OPERATION 22, OPERATION 40, and OPERATION 41), the underlying process actions 62 (ACTION 1 ON M5, ACTION 16, ACTION 17, ACTION 5, ACTION 1 ON M7, AND ACTION 7), and the process branches 100 (P4 and P5) of the dependency path 102. The process branches are the segments of the general recipe which process at least one material without joining material into the process from another process branch. A process branch 100 begins either at the point where input material 74 is first provided to the process branch to begin processing (i.e.: the beginning of the recipe) or at the end of two or more other process branches which have been joined. A process branch 100 ends either at the point another branch is joined to the branch or at the end of the process 56 where the all the material being processed in that AS branch is discharged out of the process as an output or product 72 (i.e.: the end of the recipe). Therefore, the process branches may be determined by identifying all the starting points of the general recipe 44, all the ending points of the general recipe, and all the points where material flow paths within the process join, or the material joins 106. The addition of an input material 74 to a process branch 100 does not constitute a material join 106, and the process branch continues on without starting a new branch; thus, the at least one material 104 being processed by a process branch may be one or more materials. This is because during the material addition of an input material 74 to a process branch 100 there are more that one materials being processed—the input material and the material already in the process stage. The at least one material 104 may be an input material 74 if no other transformations have been performed on the material by the process branch 100 yet. The at least one material 104 may be one of the products 72 if the process branch is one of the branches producing a product and if the transformation of the materials being processed to the product is complete. Alternatively, if the at least one material 104 is no longer an input material 74 and it has not yet been transformed to a product 72, then the at least one material is an intermediate material, such as intermediate material M5 in FIG. 35. An intermediate material is any material which has been transformed by the process from an input material 74 to another material, but is not yet transformed to the at least one product 72. Intermediate materials may, or may not require unique identification within the process. This depends upon whether information unique to that material needs to be tracked to that material for the purposes of the process. The need for identification of an intermediate material could arise, for example, if physical properties of the material such as viscosity, density, vapor pressure, or the like are required for control of the process. Other requirements, such as safety and hazards, may require unique identification of the intermediate material. Material M5 is the only intermediate material with an identification tag in the example.

Figure 37:
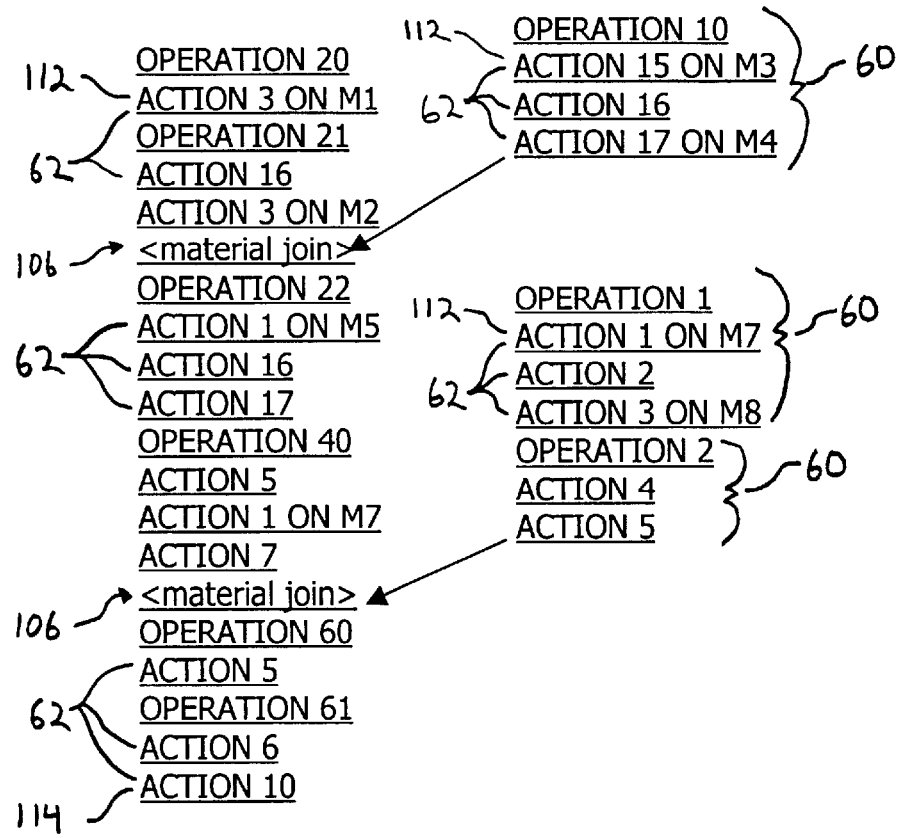
FIG. 37 shows the exploded general recipe for the general recipe of the first example.
Figure 38:
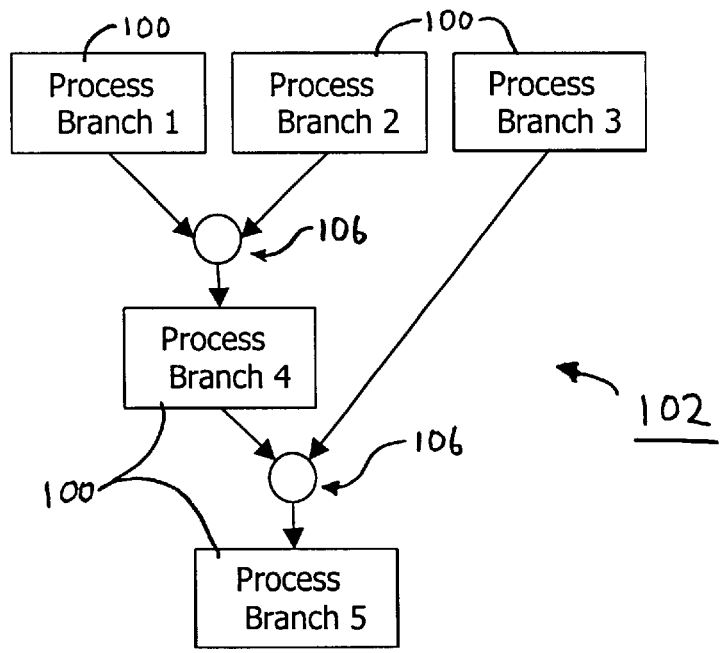
FIG. 38 shows the dependency path for the general recipe of the first example.

Referring to FIG. 36, process branch P4 terminates at the material join 106. This material join corresponds to the point in the general recipe 44 of FIG. 13 where Stage 5 is joined to Stage 4. Again referring to FIG. 36, at this point process branch P4 terminates and process branch P5 begins. The dependency path 102 corresponds to the interconnection path associated with the process branches 100, as shown in FIG. 38. In the method according to the preferred embodiments, the general recipe 44 is broken into its process branches 100 and the dependency path 102 as shown in FIG. 38 and it is expanded into its component process actions 62 and process operations 60 as shown in FIG. 37. FIGS. 37 and 38 define the expanded general recipe 44a.

The simplest representation of the preferred embodiment of 45 the invention and is shown in FIG. 4. As depicted in FIG. 4, the general recipe 44 is expanded into the process actions 62, a list of all the recipe segments which perform those process actions in the process cell 14 is created, and all the permutations of master recipes 46 which will perform the general recipe in the process cell are created. For process cells 14 and general recipes 44 of any complexity; however, this requires tremendous amounts of computation. The division of the general recipe 44 into process branches 100 allows the steps of the conversion process to be performed on separate process branches discretely, thus minimizing computational requirements and processing time. FIG. 11 depicts the method of the presently preferred embodiments including the steps of breaking down the general recipe 44 into the dependency path 102 and collection of process branches 108, which consists of all the process branches 100 contained in the general recipe.

Figure 21:
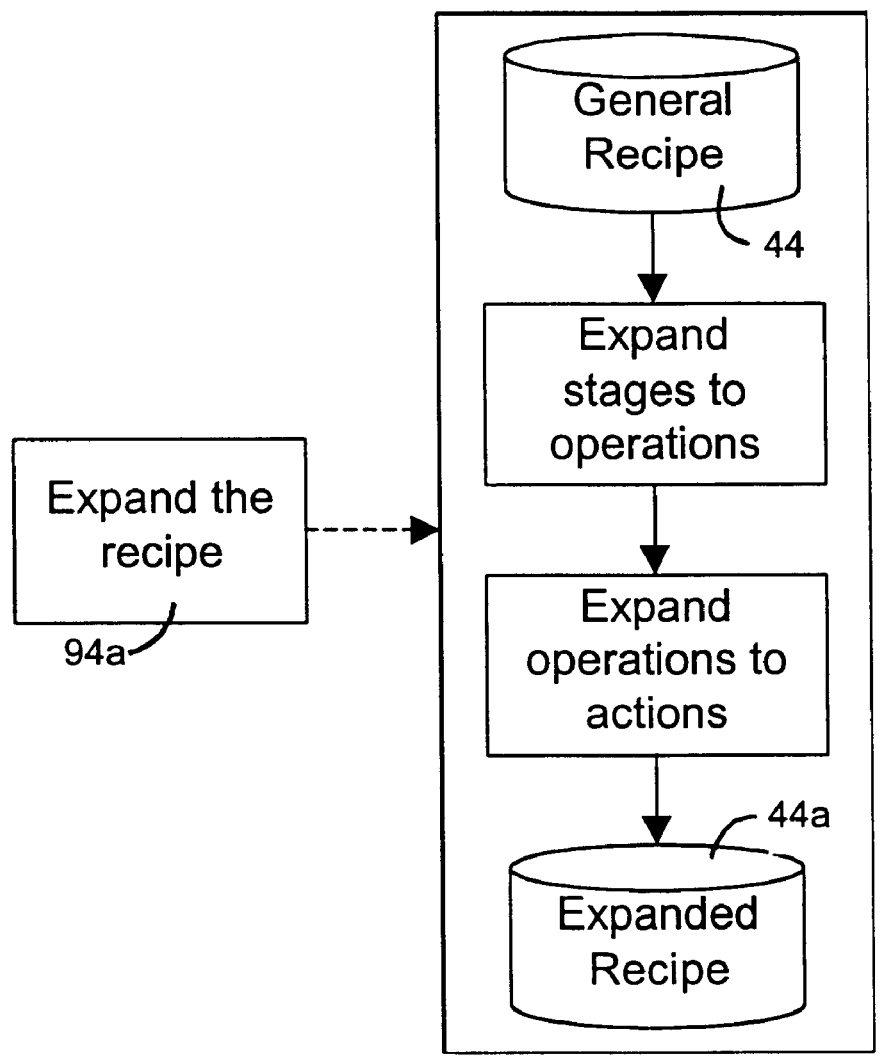
FIG. 21 is a block diagram in accordance with the preferred embodiments for expanding the general recipe.

FIG. 21 depicts the preferred algorithms to expand the general recipe 44. As shown in FIG. 21, the general recipe is first expanded from the process stages 58 into the process operations 60, and then it is further expanded into the process actions 62.

Figure 22:
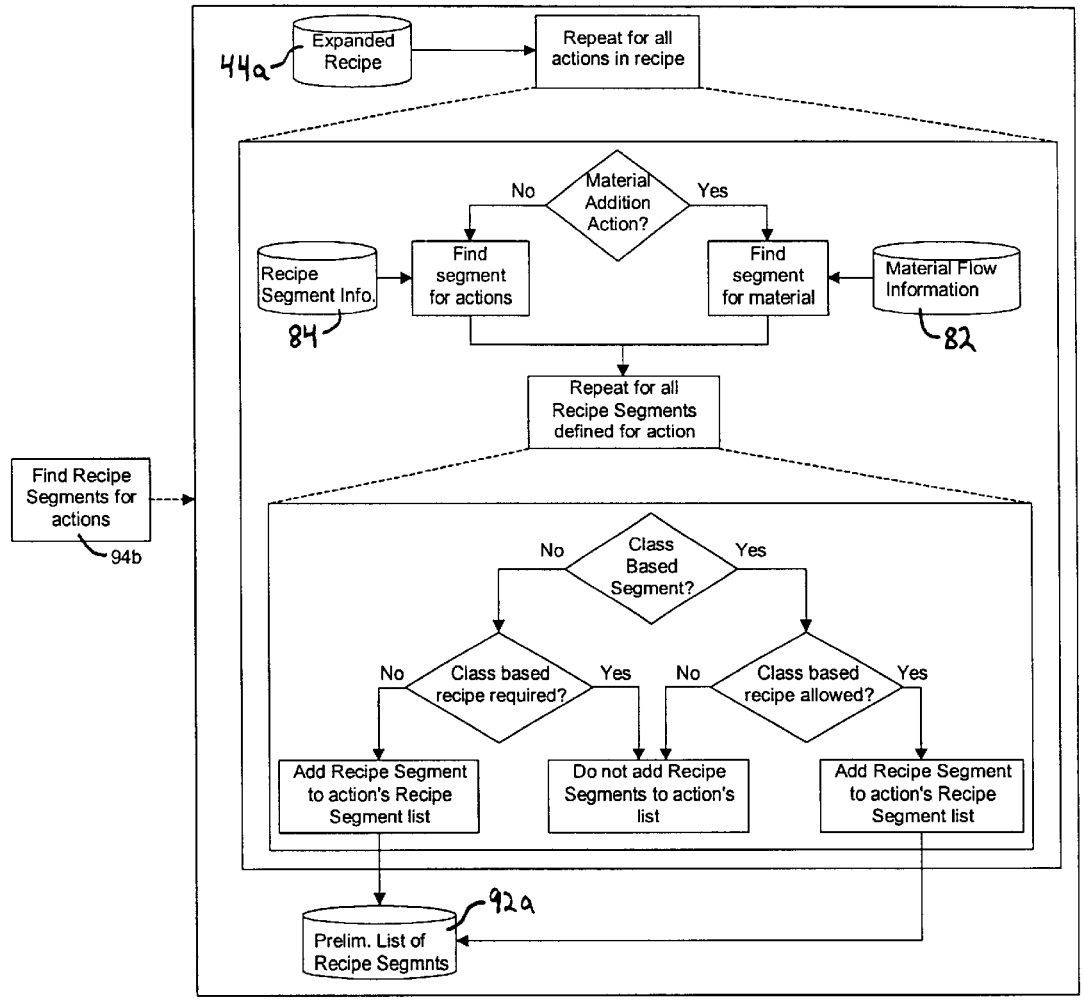
FIG. 22 is a block diagram in accordance with the preferred embodiments for creating the preliminary list of recipe segments.

FIG. 22 is the detailed flow diagram for the algorithms associated with conversion execution step 94b of FIGS. 19 and 20. Conversion execution step 94b creates the preliminary list of recipe segments 92a for the process actions 62 in the expanded general recipe 44a. The basic process depicted in FIG. 22 is to look up the recipe segments 64 available in the process cell 14 for performing each process action 62 of the expanded general recipe and create a listing for each process action of the recipe segments which perform that process action in the process cell. The algorithm first screens the process action 62 to determine if it is a material addition action. If it is not a material addition, then the algorithm fetches all the recipe segments which perform that process action and adds them to the preliminary list 92a. If the process action 62 is a material addition, then the algorithm additionally verifies that the addition process action is associated with the correct input aterial 74. Only addition process actions that are associated with the correct input material (as required by the general recipe) are added to the preliminary list of recipe segments 92a.

Figure 41:
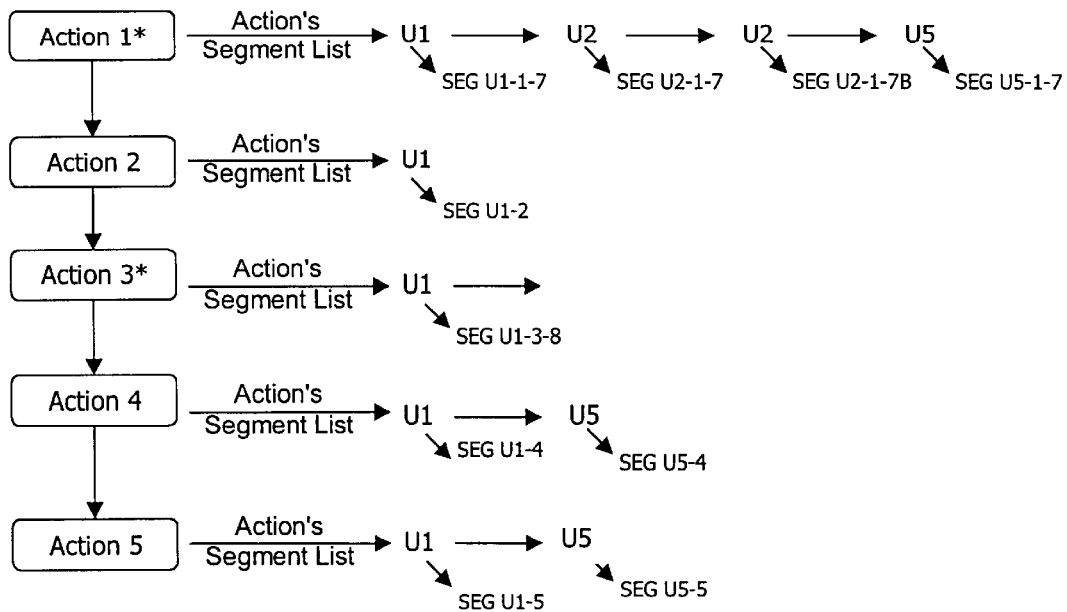
FIG. 41 shows the preliminary list of recipe segments for process branch 3 of the of the general recipe of the first example.

In addition, each recipe segment 64 is screened to determine if it is an equipment class based recipe segment or not. If the recipe segment is class based, the algorithm checks to see if a class based recipe is allowed. If it is, then the recipe segment is added to the preliminary list of recipe segments 92a. If not, then the segment is not added to the list. Alternatively, if a class based recipe is not allowed, then the recipe segment is checked to see if it is class based. If it is class based, then the recipe segment is not added to the list. If it is not class based, then the recipe segment is added to the preliminary list of recipe segments. The process depicted in FIG. 22 is performed on all the process actions 62 in the general recipe 44. as 45 FIG. 41 depicts the results of conversion execution step 94b (ref. FIGS. 19, 20, and 22) as it is applied to Stage 5 (ref. FIGS. 13 and 14), or Process Branch 3 (ref. FIG. 38), of the general recipe for this example. A similar preliminary list of recipe segments 92a is created for all the process branches 100 in the general recipe 44. The procedure is the same for all branches. The analysis provided in this example will only be performed in complete detail on Process Branch 3 (ref. FIG. 38) of the example. The method used for the other process branches is the same as described for process branch 3 of this example.

Figure 23:
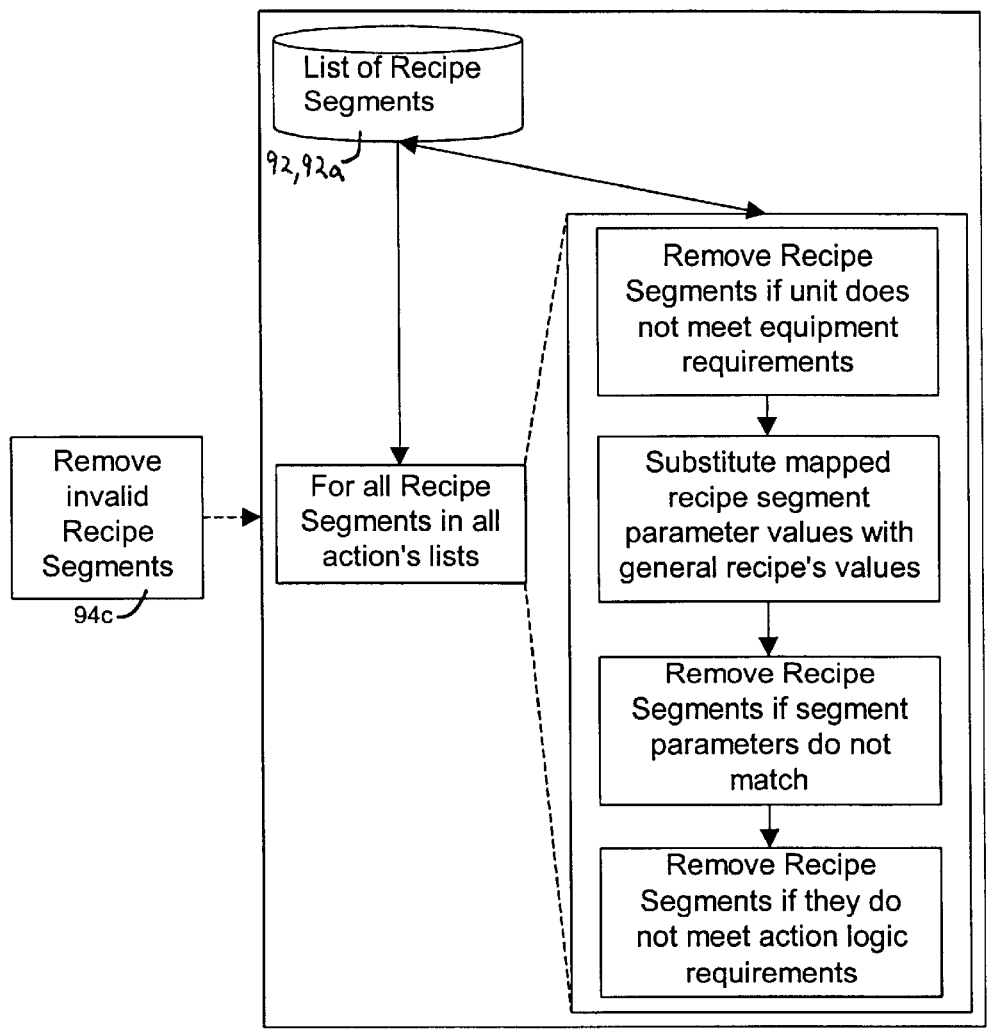
FIG. 23 is a block diagram in accordance with the preferred embodiments for creating the list of recipe segments.
Figure 42:
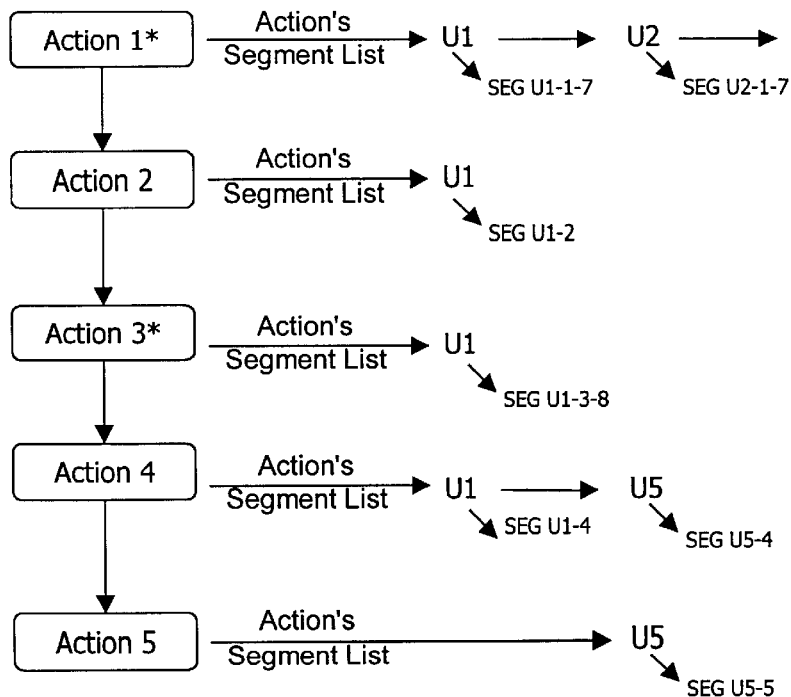
FIG. 42 shows the list of recipe segments for process branch 3 of the of the general recipe of the first example.

FIG. 23 depicts the preferred algorithms used to convert the preliminary list of recipe segments 92a to the final list of recipe segments 92. The list of recipe segments is screened against any equipment requirements defined in the general recipe 44. If the recipe segment 64 does not meet the equipment requirements for its corresponding process action 62, the recipe segment is removed from the list of recipe segments. If the recipe segment does meet the equipment requirements for the corresponding process action, the parameter values for the corresponding process action are copied to the recipe segment to define its parameter values. Each recipe segment in the preliminary list of recipe segments 92a is screened in this manner. The remaining list of recipe segments correspond to all the recipe segments which can perform the process actions of the general recipe 44 in the process cell 14. FIG. 42 corresponds to the resulting list of recipe segments 92 for Process Branch 3 of the example. In this case recipe segments SEG U2-1-7B, SEG U5-1-7, and SEG U1-5 were removed from the preliminary list of recipe segments provided in FIG. 41.

Figure 25:
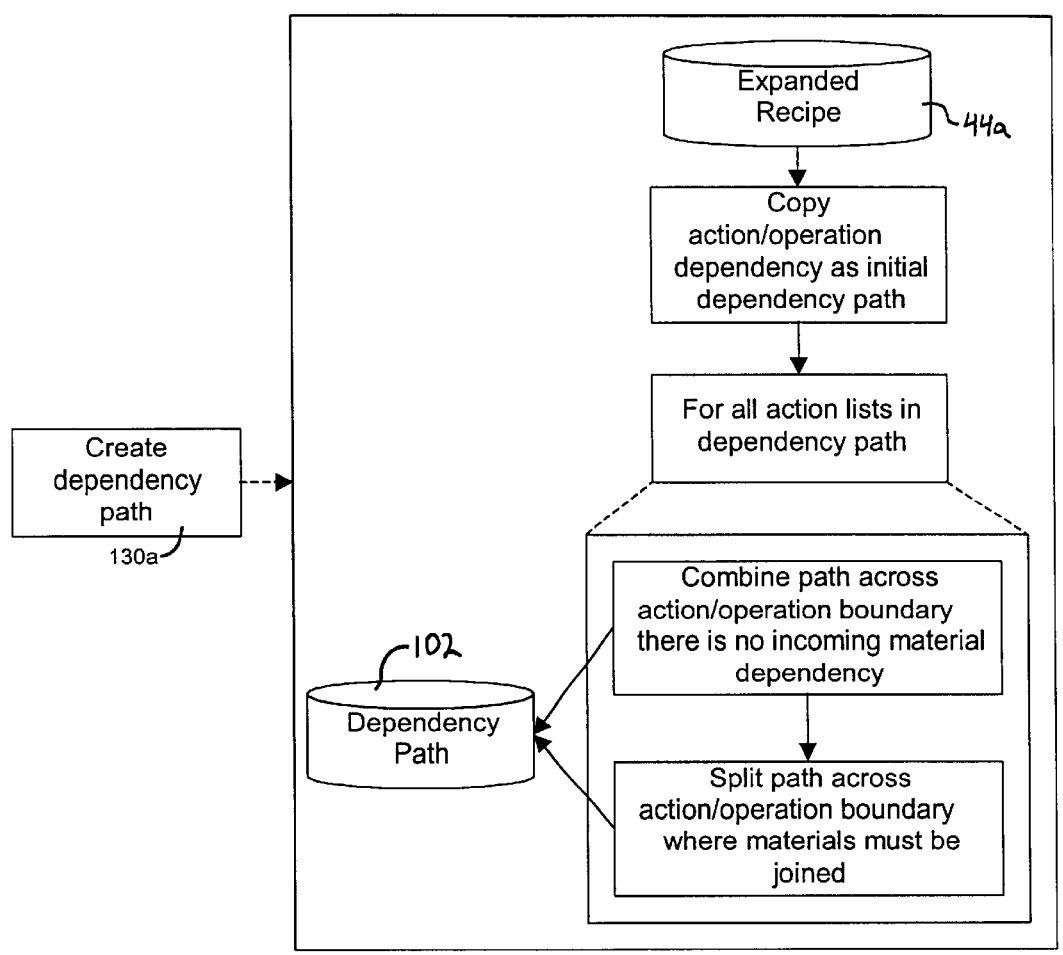
FIG. 25 is a block diagram in accordance with the preferred embodiments for creating the dependency path.

FIG. 25 illustrates the preferred method of determining the dependency path 102 for the general recipe 44. This process begins with the expanded general recipe 44a. The algorithm analyzes the expanded general recipe 44a beginning with starting process actions 112 and proceeds to remove all process actions 62 between the starting points and the first to be encountered of either a material join 106 as previously defined or the an ending process action 114 (See FIG. 37). When a process action is removed, the boundary between the previous process action and the next remaining process action is joined. At the end of this process all that remains are the general recipe starting points, ending points, and the material joins 106 which join the latter points in the form of a tree. Each resulting process branch 100 is uniquely identified, in this example as Process Branches 1 through 5. The resulting structure is depicted in FIG. 38. FIG. 39 is the same structure represented in tabular form. FIG. 40 shows the general recipe of the example in expanded form, but identifying all of the process branches 100, the material joins 106, and the general structure of the dependency path 102.

Further in accordance with this aspect of the invention, the method includes a second step of creating the set of master recipes from the list of recipe segments, the general recipe, and the site information. In the preferred embodiments, the second step includes creating the set of master recipes 42 from the list of recipe segments 92, the general recipe 44, and the site information 40 as illustrated in FIG. 4. As described previously, FIG. 4 represents the simplest, but most computationally cumbersome method of creating the set of master recipes. In the embodiment of the invention depicted in FIG. 4, the list of recipe segments 92, the expanded general recipe 44a, and the site information 40 are used to create all of the master recipes 46 which will perform the process 56 of the general recipe 44 in the process cell 14. This is done by replacing each process action 62 in the expanded general recipe 44a with one of the recipe segments 64 which performs that process action and meets the equipment requirements for the process action and the material flow constraints provided by the site information 40. The recipe segments are taken from the list of recipe segments 92. Each recipe segment is screened against the equipment requirements for the process action to verify that it meets the equipment constraints required by the general recipe, as described previously. If the recipe segment 64 meets the equipment constraints, it is checked against the material flow information 82 for the process cell and to verify material can flow from the prior recipe segments already inserted in the pending master recipe to the recipe segment being screened. If the recipe segment 64 meets the constraints provided by the material flow information for the process cell, it is inserted into the master recipe being constructed and the next process action 62 of the general recipe is analyzed. If the recipe segment does not meet these constraints the recipe segment is discarded and the next recipe segment in the list of recipe segments is analyzed in a like manner. This procedure is performed systematically, replacing all of the process actions in the general recipe to obtain a valid master recipe. This process is repeated until all of the unique permutations of valid master recipes that can be created from the general recipe, the site information, and the list of recipe segments are created.

FIG. 11 depicts a more preferable approach, where the general recipe 44 is first dissected into the list of recipe segments 92, the dependency path 102, and a collection of process branches 108. Each process branch 100 can be used in combination with the list of recipe segments to construct all of the possible segment paths 116 which can perform the process actions 62 of the process branch in the process cell 14 as shown in FIGS. 43–46. A segment path 116 is simply the name for a branch in the procedure of the master recipe 46, such as a branch of recipe segments 64 which corresponds to a process branch 100 in the general recipe 44. In this manner each process branch 100 can be analyzed separately to determine all of the segment paths 116 which correspond to that process branch as depicted for process branch 3 of the example in FIG. 44. In the preferred embodiment, each segment path 116 is analyzed, while it is being constructed from the list of recipe segments 92 and its corresponding process branch 100, to determine if the recipe segments 64 of the segment path can be performed given the material flow constraints for the process cell 14 (as defined by the material flow information 82). Each segment path 116 created is uniquely identified and cataloged by the process branch 100 to which it corresponds.

Figure 24:
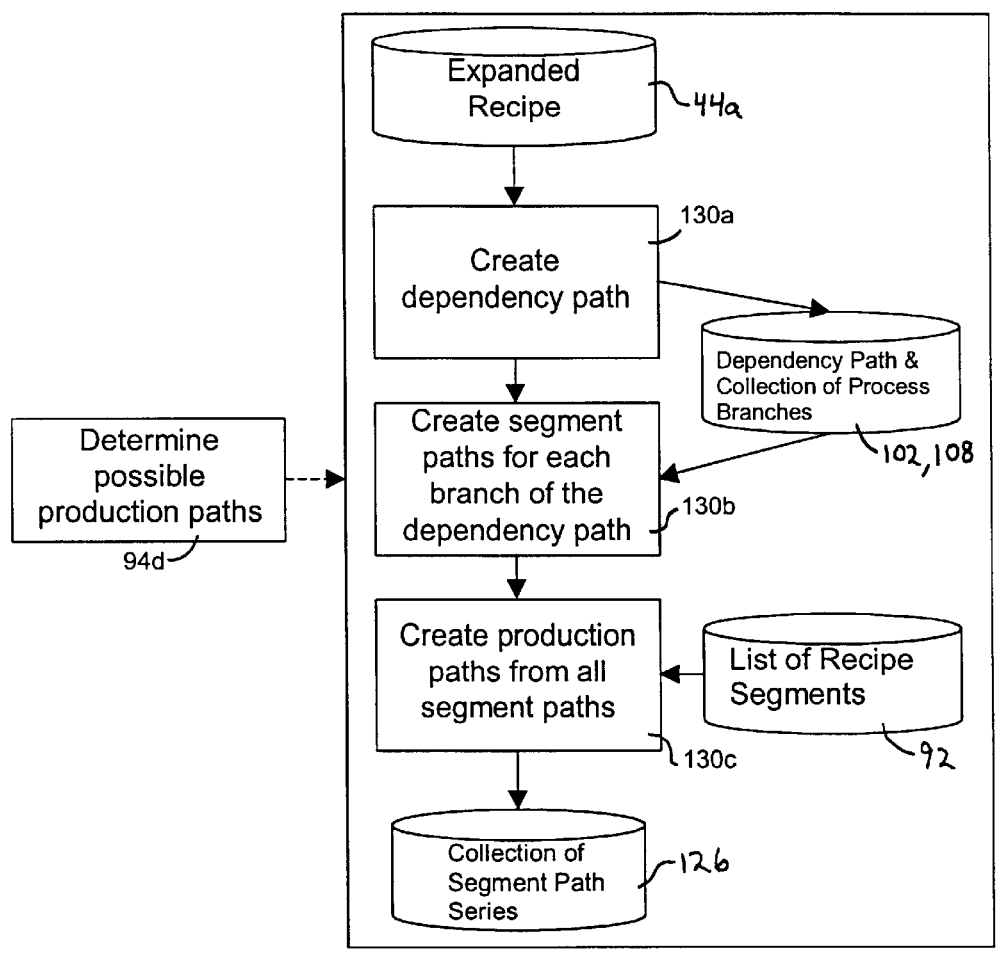
FIG. 24 is a block diagram in accordance with the preferred embodiments for creating the collection of segment path series.

In the preferred embodiment, FIG. 24 depicts the basic process used to reconstruct the general recipe 44 into the corresponding elements used to create the set of master recipes 46, namely the segment paths 116 as previously described and the productions paths 118. The production paths are the interconnection path for the segment paths 116 of the master recipe 46. Each production path 118 corresponds to the dependency path 102 of the general recipe 44. The key difference between the production path 118 of the master recipe 46 and the dependency path 102 of the general recipe 44 is that the production path identifies which unique segment path 116 is used to perform each process branch 100 of the general recipe in the process cell with the respective master recipe 46. Since there is often more than one segment path 116 that can perform each process branch 100 of the general recipe, there are often multiple master recipes that are possible. Thus, there are as many production paths 118 as there are master recipes corresponding to the general recipe, even though there is only one dependency path 102 corresponding to the general recipe.

Figure 43:
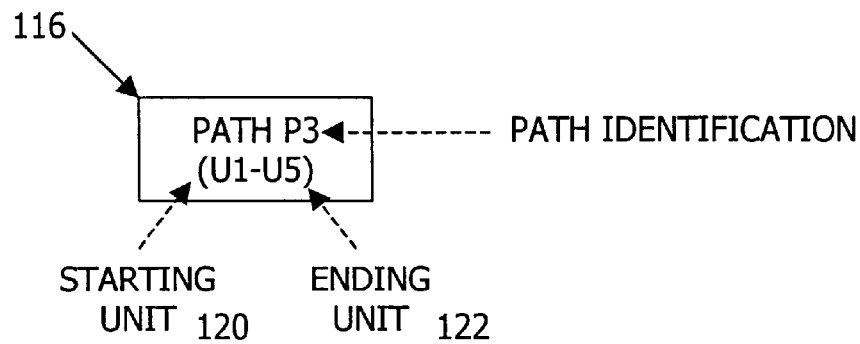
FIG. 43 shows the nomenclature and identification schemes used for the segment paths for the first example.

FIG. 43 provides an example of a segment path 116 including the identification scheme used in this example. As described previously, the path identification is unique. In this case, the identification scheme is the simple tag ※ PATH P3※, where the prefix ※ PATH※ identifies the label as a segment path and the alphanumeric suffixd ※ P3※ is the portion of the tag that is revised from path to path to make each label unique. In the example used here, the ※ P※ remains fixed and the numeric digit is incremented for each new path encountered. The first path is ※ PATH P1※, the second path is ※ PATH P2※, and so on. This scheme is selected to improve the reader's comprehension of the example. Any identification scheme that provides a unique identification for each segment path is acceptable.

In addition to the identification label for each segment path 116, the path starting unit 120 and the path ending unit 122 is identified. The path starting unit 120 is the unit 88 in which the first recipe segment 64 of the segment path 116 is performed. It corresponds to the unit in which that particular segment path must begin. The path ending unit 122 is the unit 88 in which the last recipe segment 64 of the segment path 116 is performed. It corresponds to the unit in which that particular segment path must end. The path starting unit and the path ending unit are required in the preferred embodiments so that possible production paths may be analyzed against the material flow information 82 for the process cell 14 to determine if the production path 118 can be performed in the process cell. The inclusion of the path starting unit 120 and the path ending unit 122 in the data for a segment path 116 allows for production paths 118 to be analyzed without the need to actually construct any master recipes 46, as will be discussed later. This significantly reduces computational requirements for the conversion process.

In the preferred embodiments in accordance with this aspect of the invention, the second step includes dividing the general recipe 44 into the dependency path 102 and a collection of the at least one process branches 108. The collection of process branches 108 could be as few as one process branch 100 for the simplest general recipes. The method used to divide the general recipe into the dependency path and the collection of process branches is depicted in FIG. 24, as described previously.

In the preferred embodiments, the second step further includes using the list of recipe segments 92 to analyze each process branch 100 in the collection of the process branches 108 and create a segment path series 124 for the process branch. The segment path series 124 includes all the segment paths 116 corresponding to the process branch 100. The analysis results in a collection of segment path series 126 corresponding to the collection of the at least one process branch 108 as shown in FIG. 11. Further in accordance with the preferred embodiments, the second step includes using the collection of segment path series 126, the dependency path 102, and the site information 40 to create a set of production paths 128. The collection of process branches 108, the list of recipe segments 92, and the site information 40 are used to create the collection of segment path series 126. The collection of segment path series 126 created, the dependency path 102, and the site information 40 are then used to create a set of all the production paths 128 which correspond to the dependency path 102 and can perform the process 56 of the general recipe in the process cell 14.

Figure 26:
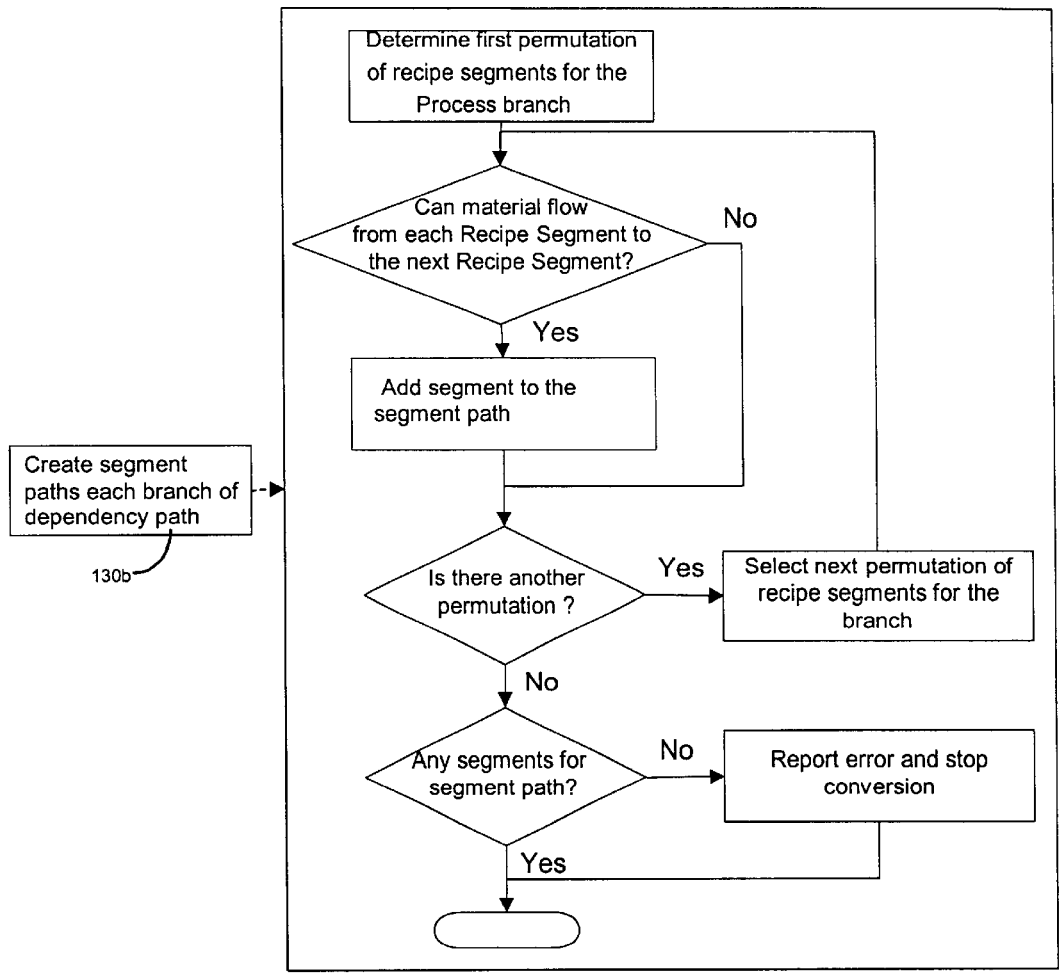
FIG. 26 is a block diagram in accordance with the preferred embodiments for creating the segment paths.
Figure 27:
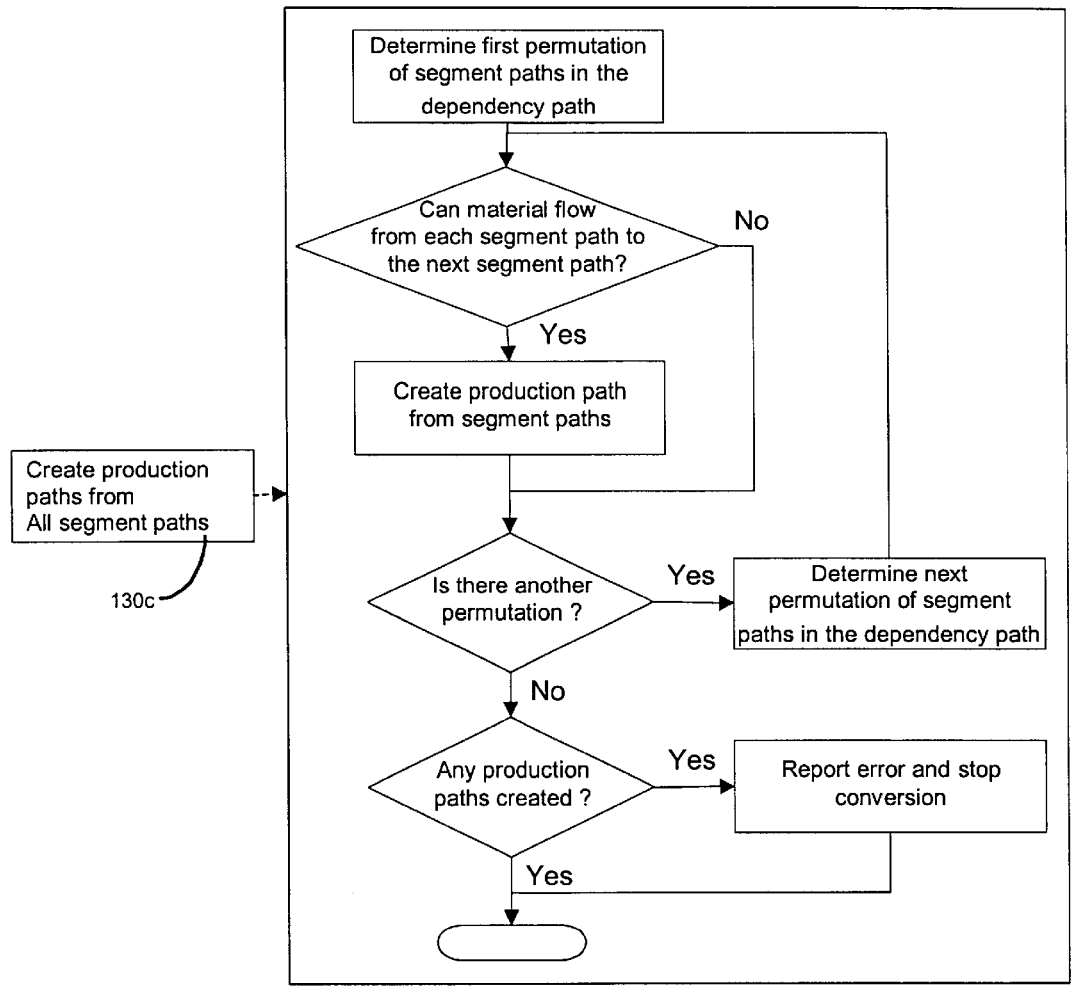
FIG. 27 is a block diagram in accordance with the preferred embodiments for creating the production paths.

Block 94d in FIGS. 19 and 20 represents the general process required to create the collection of segment path series 126 and the set of production paths 128. FIG. 24 breaks down block 94d into the component blocks 130a create dependency path, 130b create segment paths, and 130c create production paths. FIGS. 25 through 27 provide the detailed algorithms for performing each of the blocks 130a through 130c. The preferred method and corresponding algorithms of FIG. 25 for creating the dependency path 102 were described previously.

FIG. 26 illustrates the preferred method of creating the collection of segment path series 126. As shown in the figure, each process branch 100 is analyzed discretely using the list of recipe segments 92 and the material flow information 82 contained in the site information 40 to construct each segment path which can perform the process branch 100 in the process cell 14. This procedure is repeated for all combinations of recipe segments 64 which can perform the process actions 62 of the process branch 100 until the segment path series 124 for that process branch is complete. The segment path series 124 for a process branch 100 corresponds to all of the segment paths 116 that can perform that process branch in the process cell 14.

Each segment path 116 for a process branch 100 is constructed by using the list of recipe segments 92 to create each permutation of recipe segments 64 which correspond to the process actions 62 of the process branch 100, one at a time. The algorithm then analyzes the potential segment path against the material flow information 82 for the process cell to determine if material can flow between each recipe segment in the potential segment path. If material can flow between the recipe segments in the segment path under scrutiny, then the segment path is added to the segment path series 124 for that process branch 100. If material can not flow between the recipe segments in the potential segment path, then the segment path is discarded and the next possible permutation of recipe segments corresponding to the process actions of the process branch is analyzed. When all of the permutations have been analyzed for a process branch 100, the segment path series 124 is added to the collection of segment path series 126 corresponding to the collection of process branches 108 and the next process branch in the collection of process branches is analyzed in the same manner.

If any of the process branches 100 in the collection of process branches 108 does not have any segment path 116 which can perform the process branch in the process cell 14, the analysis is halted and an error is reported. This is because there must be at least one segment path which can perform each process branch in the process cell or the general recipe 44 cannot be performed in the cell. The procedure depicted in FIG. 26 is repeated until all of the process branches 100 in the collection of process branches 108 have been analyzed. The resulting data structure is the collection of segment path series 126 corresponding to the collection of process branches 108 for the general recipe.

Figure 44:
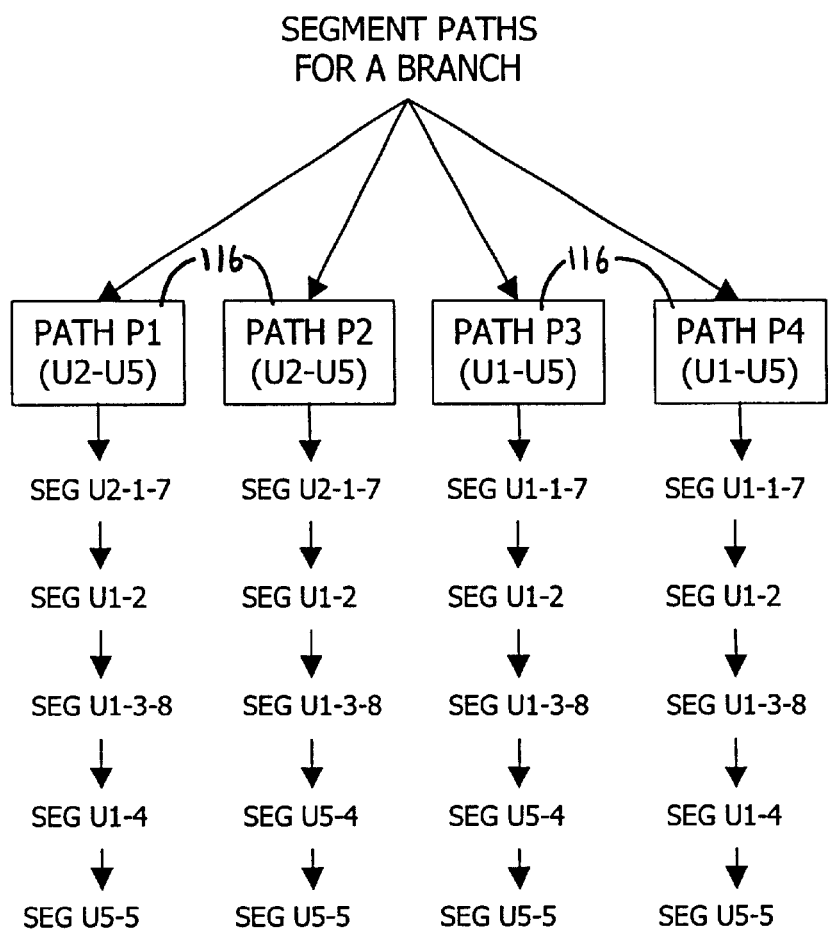
FIG. 44 shows the segment paths for process branch 3 of the general recipe of the first example.

FIG. 44 provides a depiction of the segment path series 124 corresponding to process branch P3 of the general recipe of the example. In this case there are four possible segment paths 116, PATH P1 through PATH P4, for process branch 3 of the example.

Once the collection of segment path series 126 is completed, all of the possible production paths 118 may be analyzed to determine the production paths that can perform the general recipe 44 in the process cell 14. This process is depicted by block 130*c* of FIG. 24. The detailed algorithms associated with the preferred procedure of block 130*c* are depicted in FIG. 27. Similar to the procedure FIG. 26, each permutation of possible segment paths 116 is analyzed. The procedure consists of using the dependency path 102 created previously and the collection of segment path series 126 to create each possible production path 118 which might perform the dependency path 102 of the general recipe in the process cell 14. This is done by replacing each process branch 100 in the dependency path with a segment path 116 from the collection of segment path series 126 corresponding to the process branch. Each possible production path 118 is then analyzed against the material flow information 82 for the process cell to determine if material can flow between the segment paths 116 in the production path under investigation. If material can flow between the segment paths of the possible production path, then the production path 118 is added to the set of production paths 128. If material cannot flow between any of the segment paths in the production path being analyzed, then the production path is discarded and the next permutation of possible production paths is analyzed in the same manner. If no production paths are found after all of the permutations of segment paths have been analyzed, then an error is reported.

Figure 45:
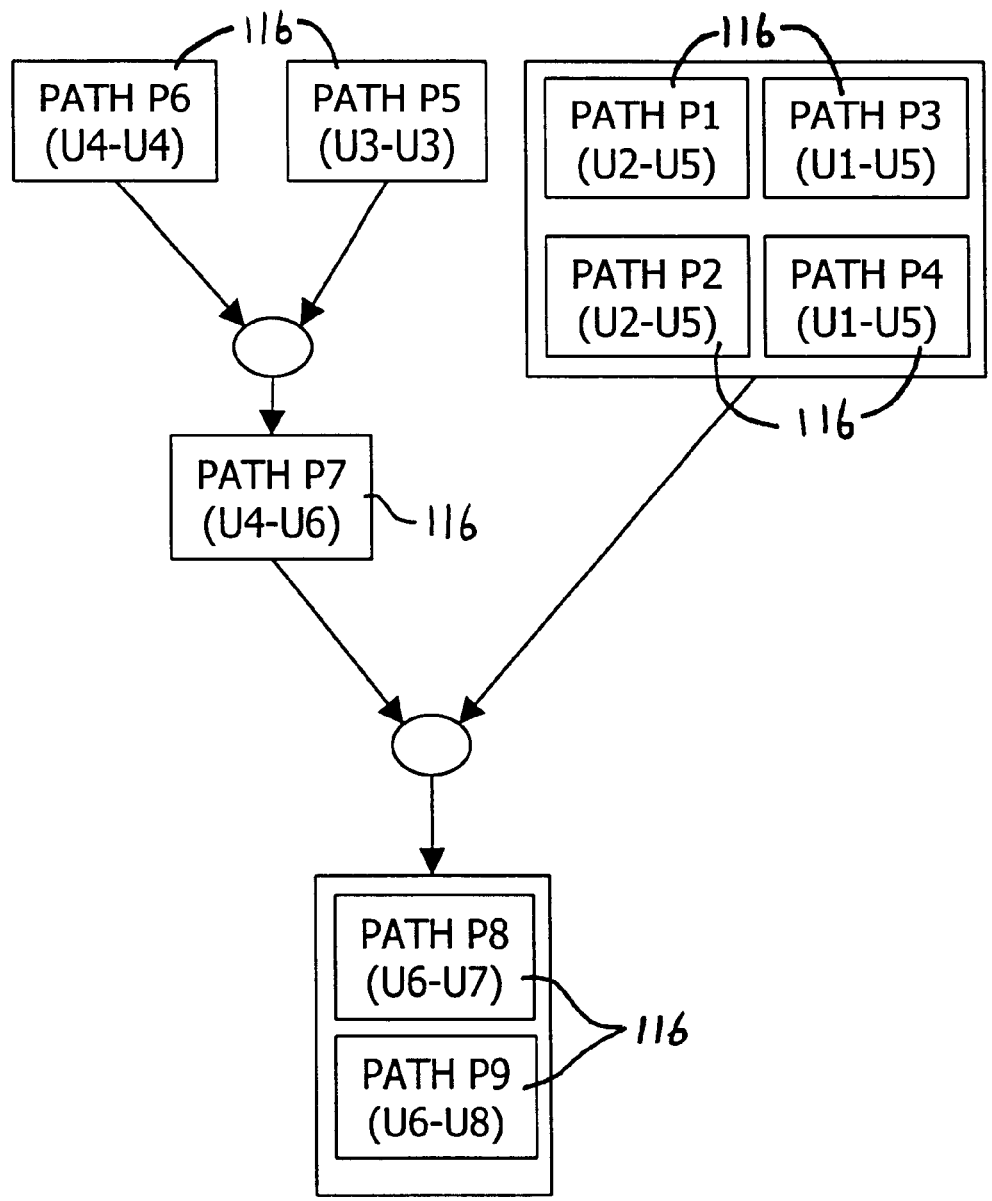
FIG. 45 shows all the possible segment paths corresponding to the process branches of the general recipe of the first example arranged in the structure of the dependency path.
Figure 46:
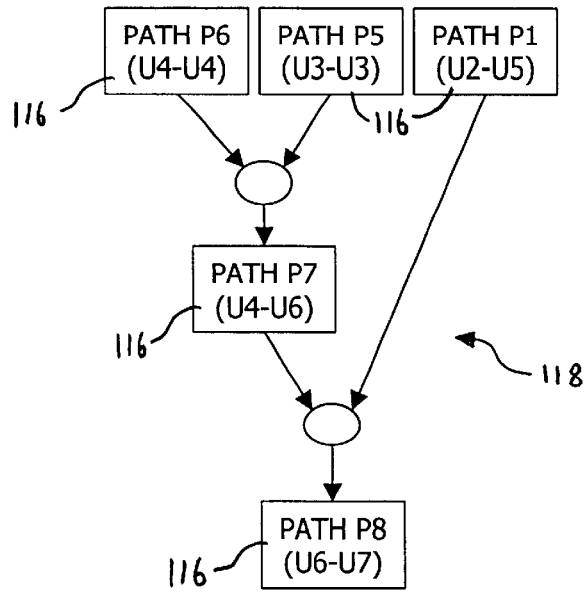
FIG. 46 shows one of the possible production paths corresponding to the dependency path of the general recipe of the first example.
Figure 47:
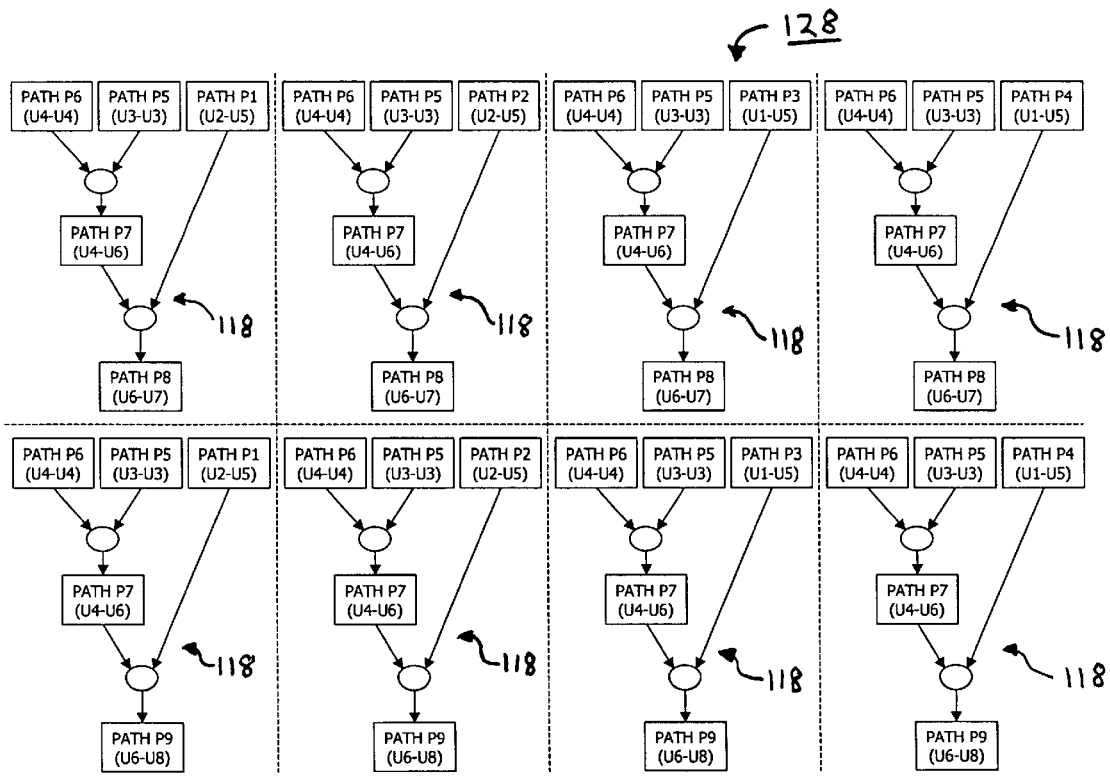
FIG. 47 shows all of the possible production paths corresponding to the dependency path of the general recipe of the first example.

FIG. 45 depicts all of the possible segment paths 116 of the example organized into the general structure of the dependency path 102. FIG. 46 provides one of the possible production paths 118 for the example. FIG. 47 provides the resulting set of production paths 128 for the example after the performing the analysis outlined above.

Optionally, but preferably, the site information 40 includes optimization information 132 and the method includes a step of determining at least one optimum master recipe 134. The optimum master recipes 134 may be selected directly form the set of master recipes 42 after they are generated or the optimization information 132 may be used during the general recipe 44 to master recipe 46 conversion process to eliminate non-optimum master recipes before they are created. The latter scenario is preferable since it eliminates possible master recipes before they are reconstructed from the general recipe. This reduces processing time. The preferred optimization process is depicted in FIGS. 19 and 20. The optimization step is performed on the set of production paths 128 and the segment paths 116 prior to reconstruction into the master recipe 46. Block 94*f* ※ Determine the Optimal Production Paths※ as shown in FIGS. 19 and 20 corresponds to this step. In block 94*f* the set of production paths 128 created in step 94*e* are analyzed to determine the optimal production path or set of production paths based on optimization information 132.

The optimization information 132 may be user defined or it may be predefined, such as minimum number of material movements, minimum number of units used to perform the general recipe 44 in the process cell 14, or minimum cost of running a recipe segment 64. The optimization information 132 might be cycle time information which identifies the cycle time associated with each associated unit procedure 50 or unit operation 52 and the optimal master recipes are the master recipes 46 which produce the products 72 in the least time. The optimization information might be equipment path information and the optimal master recipes are the master recipes that will produce the products using the least number of units 88 in the process cell 14. The optimization information might be material transfer cost information and the optimal master recipes are the master recipes that will produce the products with the least material transfer costs. The optimization information 132 could be any type of information the user desires to utilize to optimize the master recipes 46 created by the invention.

Figure 28:
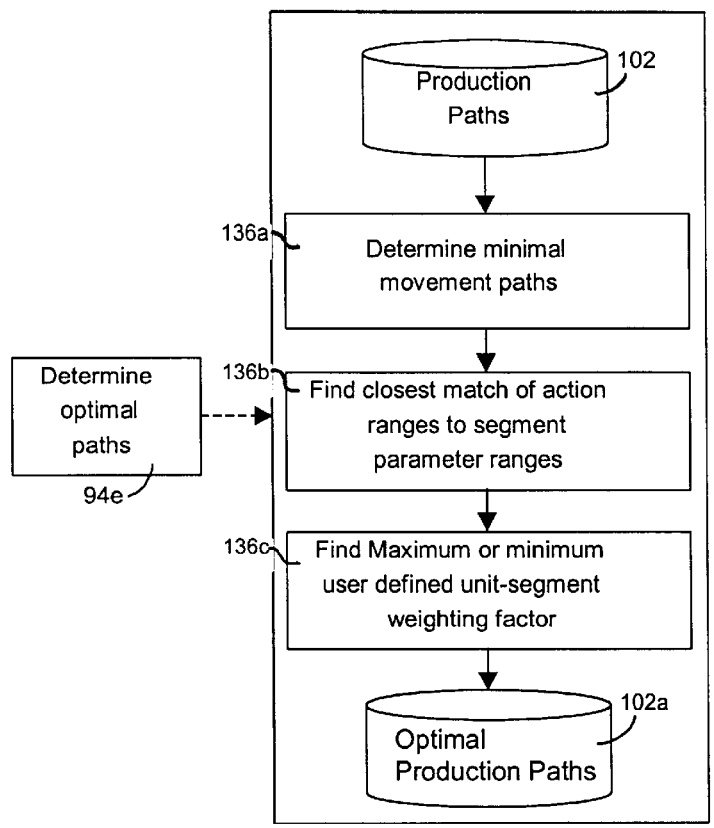
FIG. 28 is a block diagram in accordance with the preferred embodiments for determining the optimal production paths.

The preferred methods for selecting the optimal production paths are depicted in FIGS. 28 though 31. FIG. 28 is the block diagram for the basic procedure to optimize the production paths 118. The procedure is broken into three major process blocks, 136*a* through 136*c*. These blocks correspond to three separate varieties of optimization that may be performed. Each of these blocks preferably allows the user to select whether the optimization algorithms associated with the block are activated or not.

Figure 29:
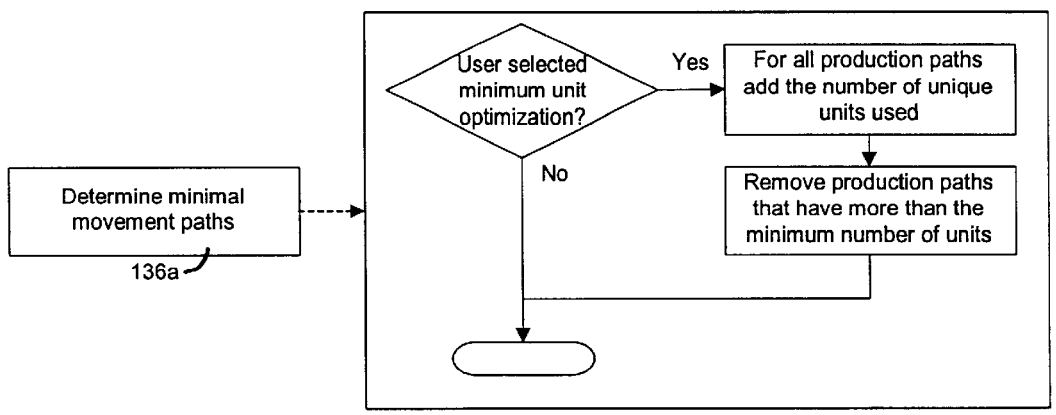
FIG. 29 is a block diagram in accordance with the preferred embodiments for determining the production path with the minimum number of material movements.

The first block 136*a* is the optimization procedure to minimize material movements and the number of units 88 required to perform the master recipe 46. Since the only information required to optimize this parameter is the material flow information 82, this optimization routine does not require any additional information above and beyond the material flow information included in the site information 40. FIG. 29 depicts the detailed algorithms associated with block 136*a* of FIG. 28. If the optimization procedure has been selected by the user, the algorithm counts the number of unique units utilized by each production path 118. The production paths with the minimum number of units are identified and all the paths with more than the minimum number of units are removed.

Figure 30:
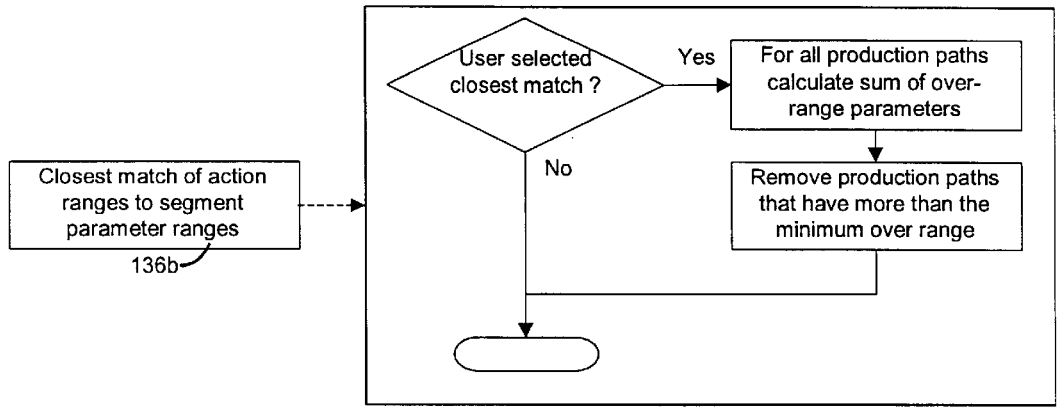
FIG. 30 is a block diagram in accordance with the preferred embodiments for determining the production path with the closest match of process action and recipe segment parameter ranges.

FIG. 30 depicts the detailed algorithms for the optimization procedure of block 136*b*, the optimization procedure to select the production paths 118 with recipe segments 64 which provide the closest match between the parameter ranges for the process actions 62 that they perform. Again, the user is provided the option of selecting the optimization procedure. If the procedure has been selected, the algorithm calculates the sum of all of the parameters over range or parameters out of range associated with each recipe segment 64 of each production path 118. For example, if the range for a process action 62 is 100 to 150 gallons and the corresponding recipe segment 64 has a range of 50 to 400 gallons, the out of range or over range parameter for this recipe segment might be [100 gallons–50 gallons]+[400 gallons–150 gallons]=300 gallons. Each recipe segment 64 in the production path 118 has the over range parameter calculated in this manner.

The over range parameter for each recipe segment 64 is a measure of how closely the operating range for the recipe segment matches that required by its corresponding process action 62. The lower the over range parameter is, the better the recipe segment matches the process action it is intended to perform. The algorithm for this procedure calculates the sum of the over range parameters for all of the recipe segments in the production path. The production paths 118 with the minimum sum of the over range parameters are identified and the production paths that have a sum of the over range parameter greater than the minimum are removed from the set of production paths 128.

Figure 31:
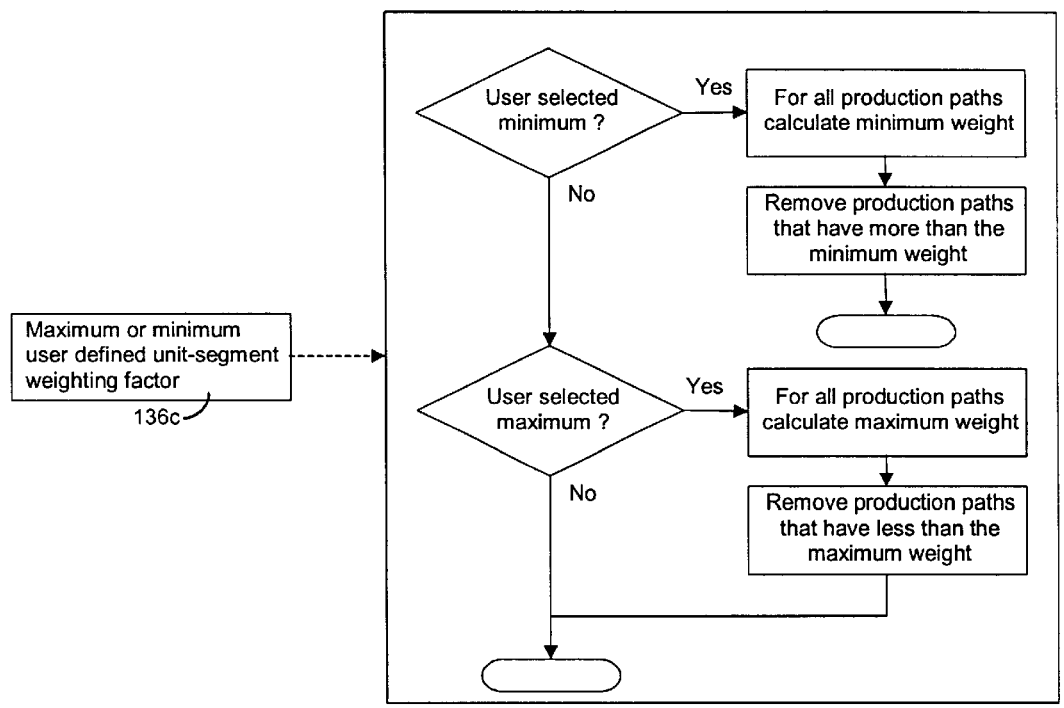
FIG. 31 is a block diagram in accordance with the preferred embodiments for determining the production path with the minimum or maximum user defined weighting factor.

FIG. 31 depicts the detailed algorithms for the optimization procedure of block 136c of FIG. 28, the maximum or minimum user defined unit-segment weighting factor. As with the other optimization procedures, the user is provided the option of selecting either a user defined minimum or a user defined maximum weighting factor. If either one of these options is selected, the user must provide the weighting factor so that the weighting value can be calculated for each production path 118. Material transfer costs or unit efficiencies are examples of optimization information 132 that would require the user to provide such information. This information could be provided as part of the site information 40 associated with the process cell 14. If the user selected minimum is activated, the algorithm calculates the weighting value associated with each production path 118. The production paths with the minimum weighting factor are identified and all production paths with a weighting factor above the minimum value are removed. If the user selected maximum is activated, the algorithm calculates the weighting factor associated with each production path. The production paths with the maximum weighting factor are identified and all the production paths with weighting factors below the maximum value are removed.

Figure 32:
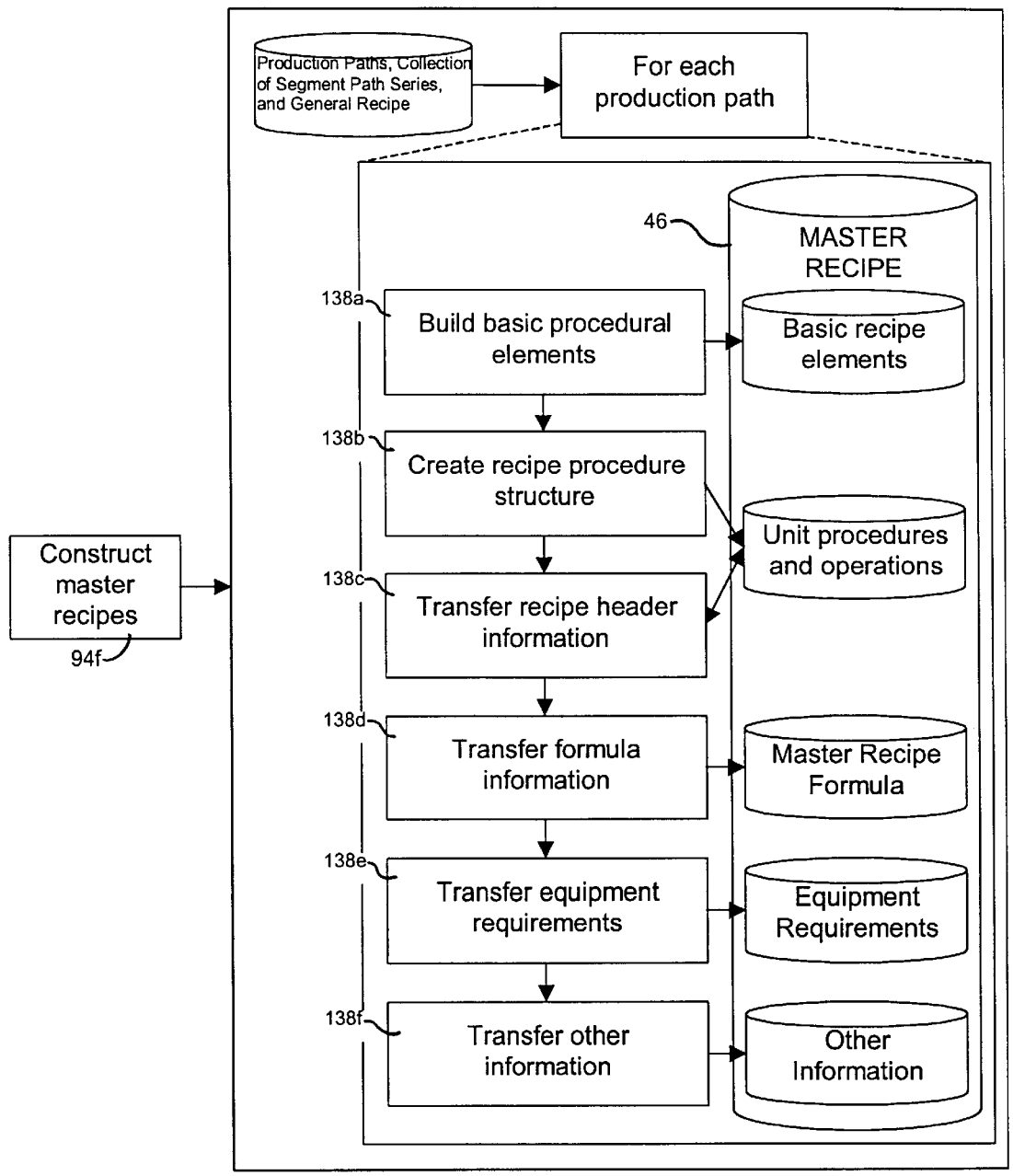
FIG. 32 is a block diagram in accordance with the preferred embodiments for constructing the master recipes.

Further in accordance with the preferred embodiments of this aspect of the invention, the second step includes using the set of production paths 128, the collection of segments path series 126, and the site information 40 to create a set of master recipes 42, as shown in FIGS. 11, 19, and 20. Preferably, the optimization procedure, block 94e shown in FIGS. 19 and 20 described previously, are performed on the production paths 118 to eliminate non-optimum production paths. This minimizes the number of master recipes 46 that require reconstruction, thus saving processing time. Block 94f or FIGS. 19 and 20 represent the reconstruction process. FIG. 32 provides a more detailed depiction of the reconstruction process associated with block 94f. The basic steps of the reconstruction procedure are to build the basic procedural elements as depicted by block 138a, create the recipe procedure structure as depicted by block 138b, transfer the recipe header information as depicted by block 138c, transfer the formula information as depicted by block 138d, transfer the equipment requirements as depicted by block 138e, and transfer the other information as depicted by block 138f. This procedure is performed for each production path 118 remaining in the set of production paths 128, one at a time, until all the master recipes 46 in the set of master recipes 42 have been constructed. The first step of the process, building the basic procedural elements, consists of inserting the recipe segments 64 for each segment path 116 of the production path 118 into the master recipe being constructed. This results in the basic building blocks of the master recipe. All of the recipe segments 64 that correspond to the process actions 62 of the general recipe 44 are in place in the master recipe under construction.

The next step in the process, creating the recipe procedure structure as depicted by block 138b, includes the main procedural elements of the reconstruction process. In the preferred embodiments, this step performs the following functions:

1. Defines the starting and ending points of the master recipe,
2. Inserts all the material transfers between the different units used by the master recipe in the process cell,
3. Inserts all the unit start recipe segments and the unit end recipe segments for each unit requiring such segments,
4. Transfers all the process operation identifiers from the general recipe to the master recipe as unit operation identifiers, and
5. Identifies all the unit procedures in the master recipe.

Figure 33:
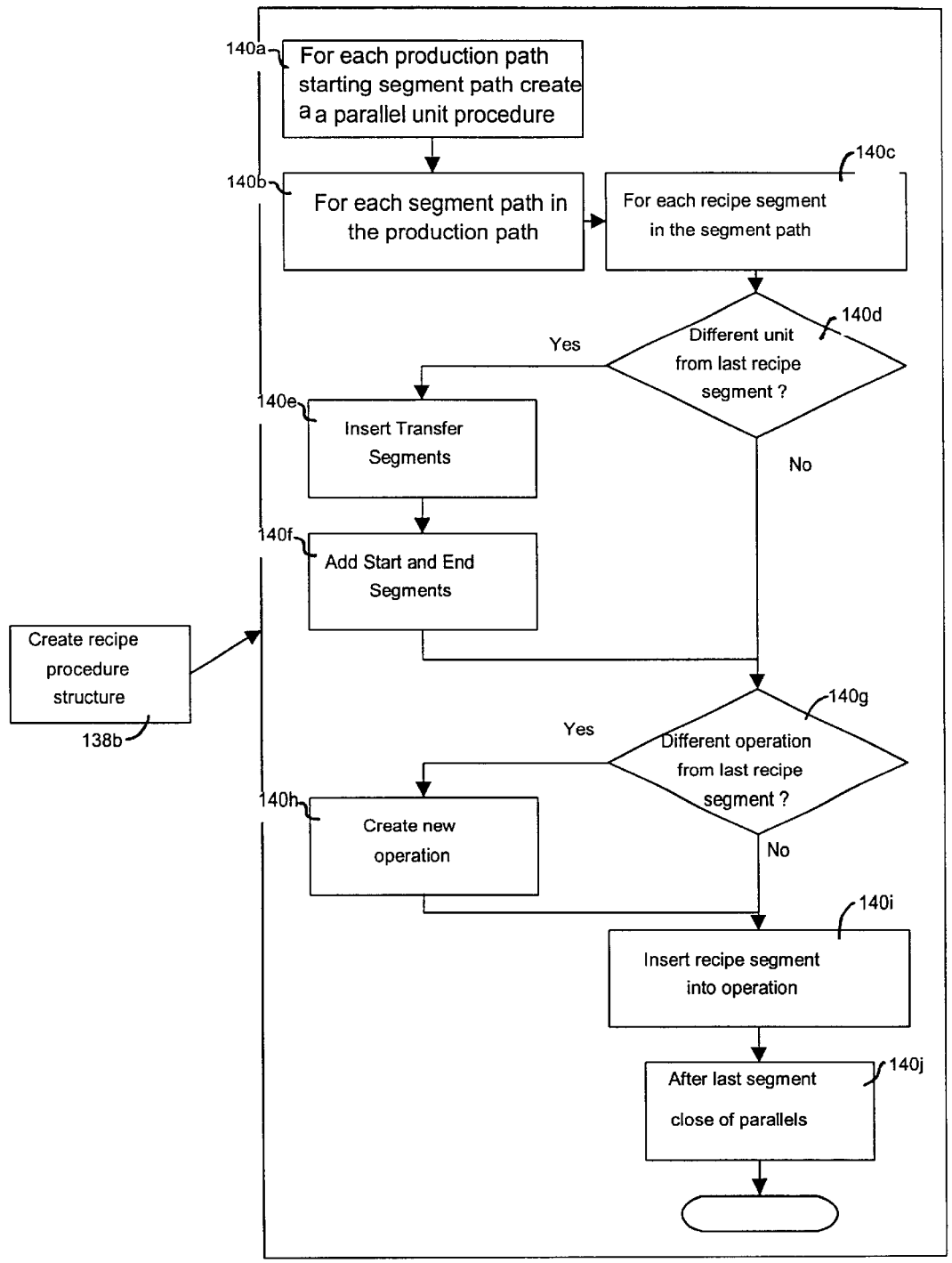
FIG. 33 is a block diagram in accordance with the preferred embodiments for creating the recipe procedure structure.
Figure 34:
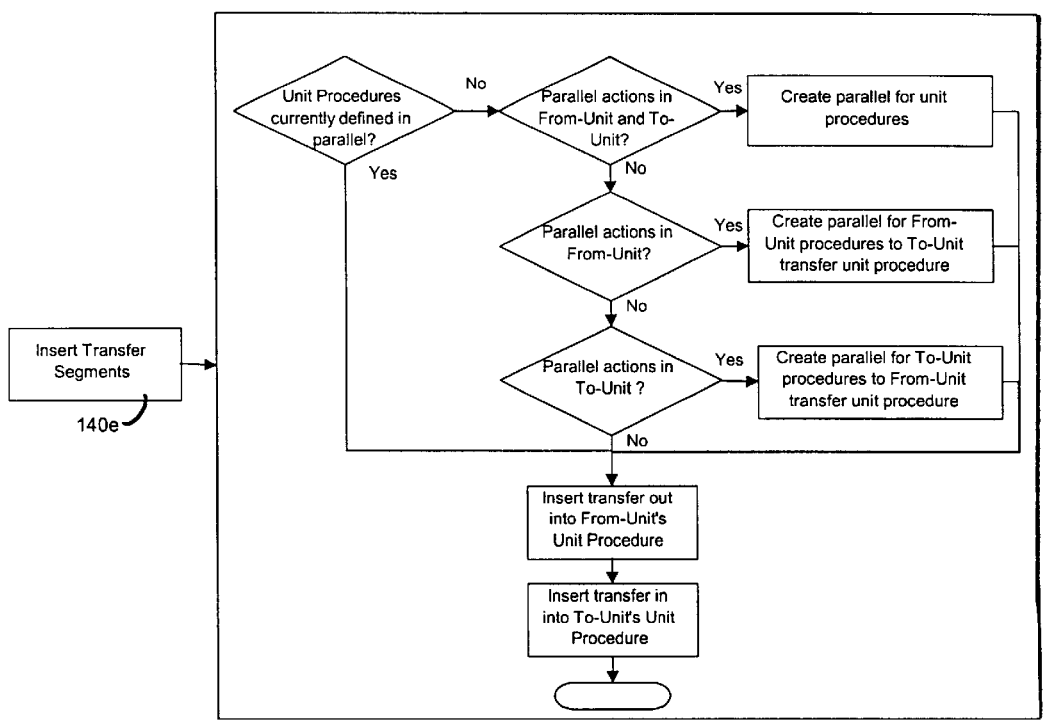
FIG. 34 is a block diagram in accordance with the preferred embodiments for inserting the transfer recipe segments.

The algorithms associated with block 138b are depicted in FIG. 33 and FIG. 34. The first step is to find each starting segment path and to open parallel unit procedures 50 for the starting unit of each of the starting segment paths. As described earlier, the unit procedures 50 and the unit operations 52 are simply sections of the master recipe 46 that are smaller master recipes unto themselves. Essentially, they can be thought of as subroutines, or subcomponents. They contain all of the necessary structure to operate alone. They correspond to convenient modules of the master recipe which allow the recipe to be divided in a modular structure which is sensible for both the users and for the structure of the process cell 14. For example, if one unit in a cell is not operational, the unit procedure for that unit may be replaced with an equivalent unit procedure for another unit which can perform that procedure, provided that the material flow paths in the cell allow its use in that master recipe. The unit procedures and the unit operations include the same categories of information as the master recipe, as was described previously. They contain a header, a formula, a procedure, equipment requirements, and other information.

Figure 48:
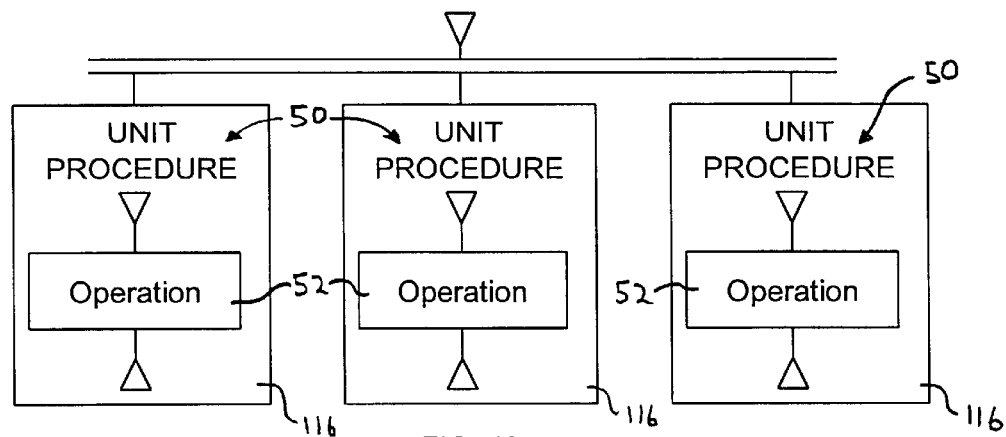
FIG. 48 illustrates the opening of parallel unit procedures during the initial phases of master recipe construction.

Blocks 140a through 140j depict the steps of the reconstruction process. The procedure begins at the starting segment paths. Parallel unit procedures are created for each starting unit in the starting segment paths as depicted by block 140a. FIG. 48 depicts the first step of the procedure applied to the production path 118 of FIG. 46 for the example. In this case, there are three starting segment paths, paths P4, P5, and P1 of FIG. 46. All three paths are opened in parallel as shown in FIG. 48. As described previously, the unit procedures 50 are divided into their corresponding unit operations 52 as shown in FIG. 48.

Figure 49:
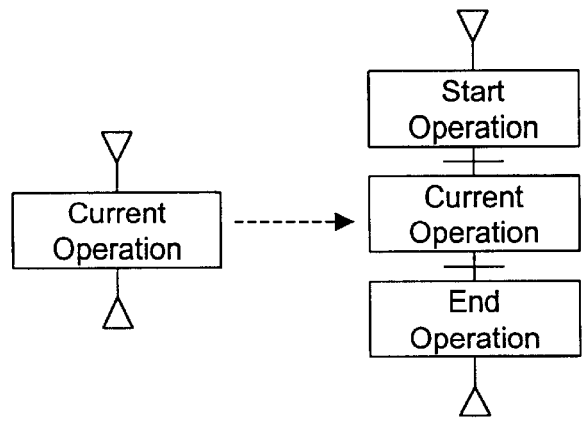
FIG. 49 illustrates a unit procedure including unit start and end recipe segments.
Figure 50:
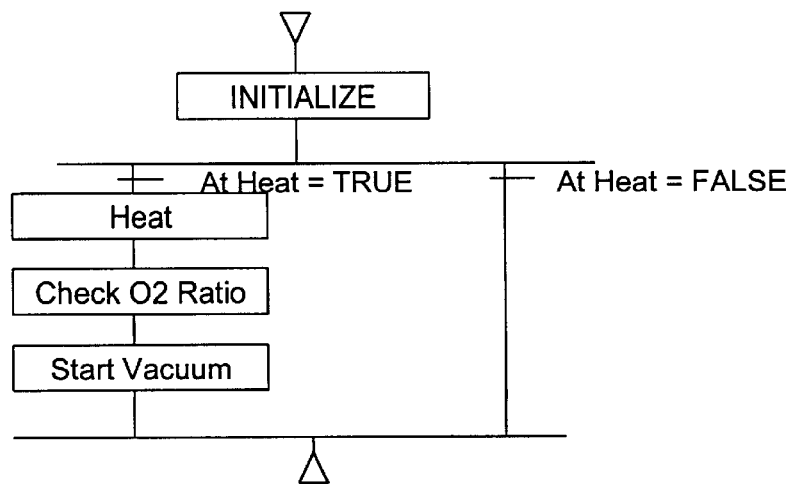
FIG. 50 is an example of a unit start recipe segment.

Each segment path 116 is analyzed one at a time, starting with the segment path corresponding to the first starting process branch. Upon completion of the previous segment path, the next segment path is selected and analyzed, as depicted by block 140b. The segment paths 116 are analyzed one recipe segment 64 at a time, as depicted by block 140c. The first step of the analysis of a recipe segment is to determine if the recipe segment corresponds to a different unit than the previous recipe segment, as depicted by block 140d. The starting recipe segment of a starting segment path (corresponding to the beginning of the master recipe) is a new unit by virtue of the fact that it is the beginning of the recipe. This also starts a new unit procedure. When a new unit is encountered, the transfer recipe segments for the transfer between the previous unit and the new unit are inserted, as depicted by block 140e. A new unit procedure identifier is inserted at the start of the new unit procedure. Unit Start and End Segments are added if required, as depicted by block 140f. FIG. 49 provides the basic structure of a unit procedure 50 with a start recipe segment, an end recipe segment, and one unit operation 52. If the previous unit requires a unit end recipe segment, it is inserted. If the new unit requires a unit start recipe segment, it is inserted. FIG. 50 provides an example of a unit start recipe segment. In this example, if the unit is to operate at temperature (at heat=true), then the start recipe segment requires that the unit be heated, the O2 ratio be checked, and a vacuum be initiate. If the unit is not to operate at temperature (at heat=false), then no start recipe phases are performed. An example of the data structure defining the start and end recipe segment requirements for the units in the process cell of the example is provided in FIG. 17.

Figure 51:
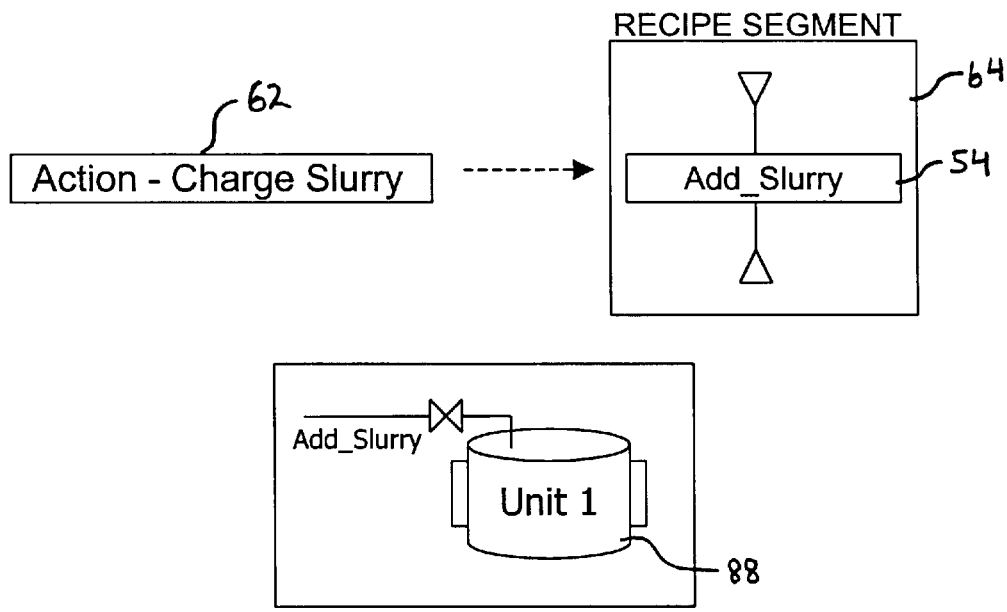
FIG. 51 is an example of a recipe segment, its corresponding process action, and the unit in process cell associated with the process action.
Figure 52:
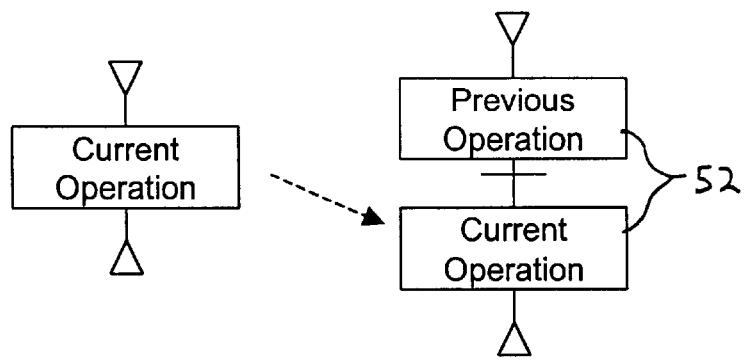
FIG. 52 depicts the creation of new unit operations during master recipe construction.

As previously described, the segment paths 116 are divided into their corresponding operations, which are referred to as process operations 60 in the general recipe 44 and unit operations 52 in the master recipe 46. During the creation of the master recipe structure, the unit operations must be inserted in their correct location. Each recipe segment 64 is analyzed against its corresponding process action 62 in the general recipe to determine if it is part of a new operation, as depicted by block 140*g*. FIG. 51 provides an example of a recipe segment and its corresponding process action. In this example, the recipe segment 64 includes a single recipe phase 54, ※ Add-Slurry※. If its corresponding process action 62 is the start of a new process operation 60, a new unit operation 52 is created, as depicted by block 140*h*, and the recipe segment is inserted into the new operation as depicted by block 140*i*, as shown in the example of FIG. 52. If the segment 64 corresponds to the closing of parallel process operation, then the parallels are closed as depicted by block 140*j*. The required parallel operations are defined by the general recipe 44. Parallel process branches generally close when process branches 100 join at a material join 106 as described previously.

Figure 53:
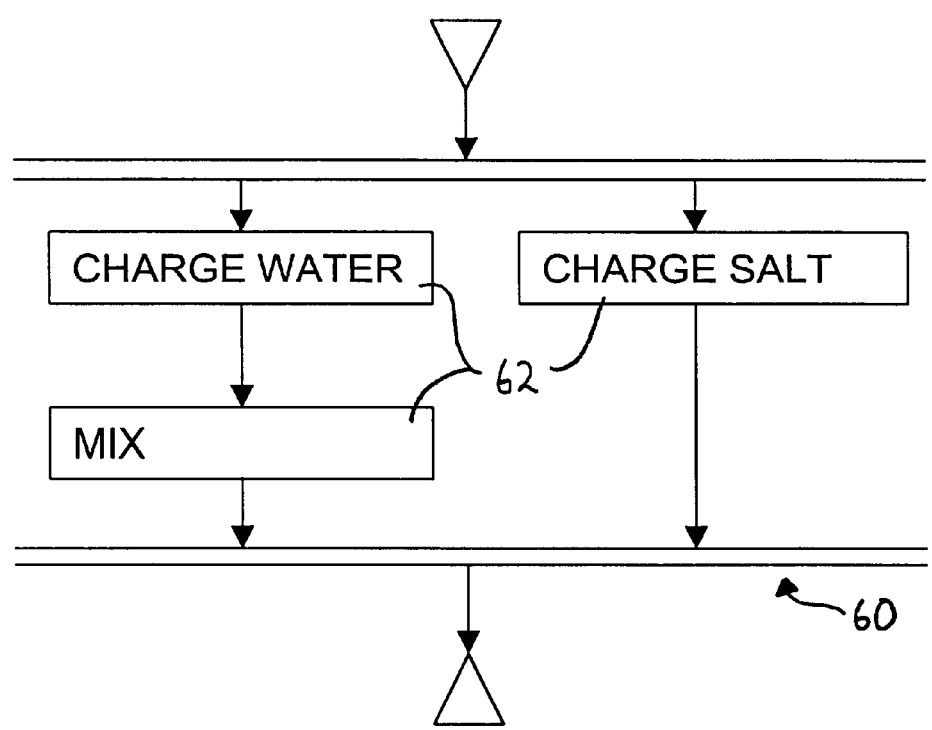
FIG. 53 is an example of a process operation of a general recipe.
Figure 55:
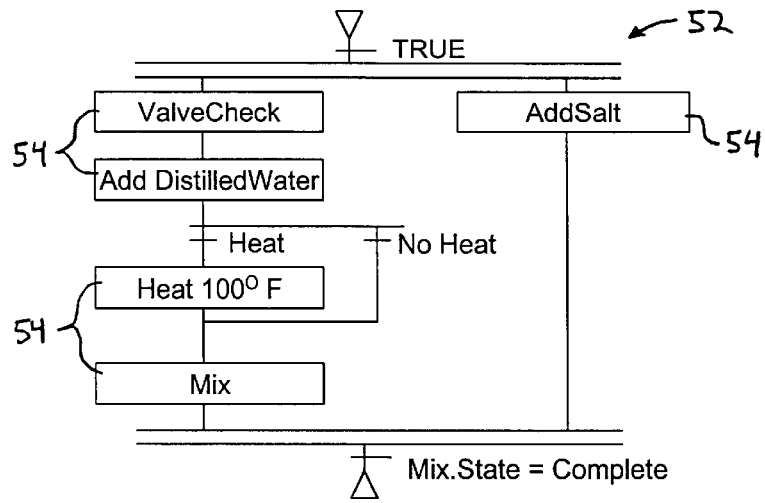
FIG. 55 is a unit operation corresponding to the process operation of FIG. 53.
Figure 56:
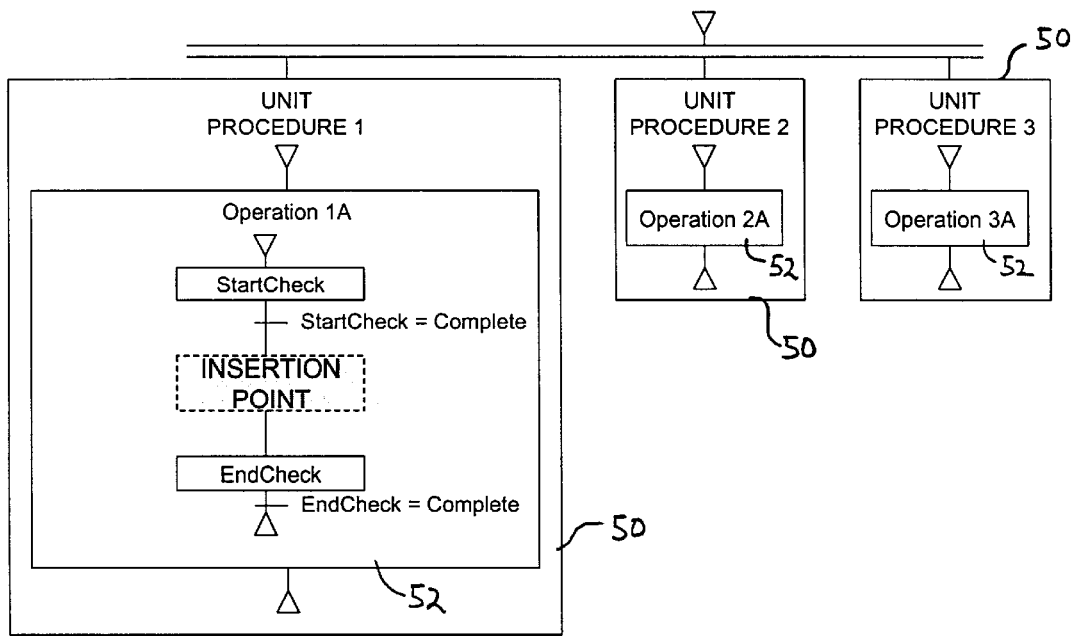
FIG. 56 shows a master recipe under construction with a unit procedure being created prior to the insertion of the unit operation of FIG. 55.
Figure 57:
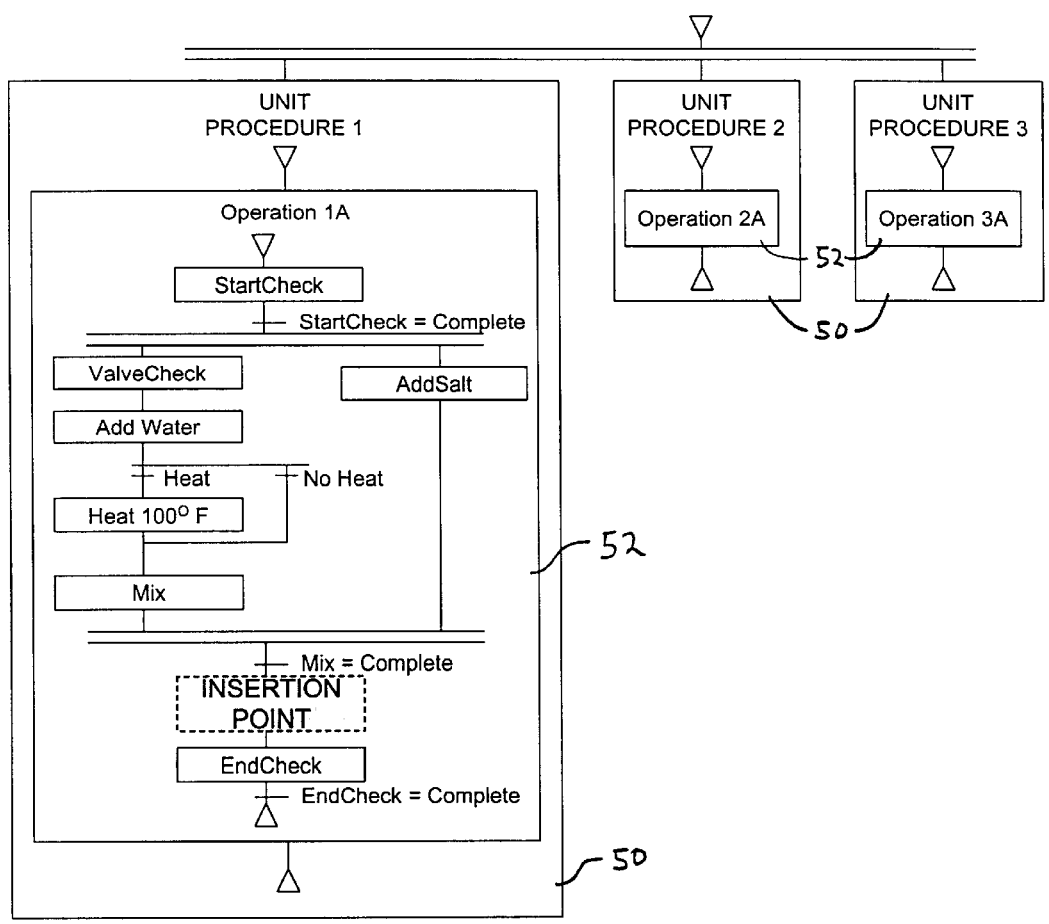
FIG. 57 shows the master recipe of FIG. 56 after the insertion of the unit operation of FIG. 55.

FIGS. 53 through 57 depict the resulting data structures from the steps associated with the creation of unit operations 52 and their insertion into the unit procedures 50 during the reconstruction of a master recipe 46. FIG. 53 provides an example of a process operation 60 from a general recipe 44 consisting of two parallel branches and three process actions 62. FIG. 54 provides the recipe segments 64 corresponding to the process actions 62 from FIG. 53 including the details of the recipe phases 54 associated with each of the recipe segments. FIG. 55 shows the resulting unit operation 52 constructed from the process operation 60 of FIG. 53. FIG. 56 depicts the three parallel starting unit procedures from FIG. 48 with UNIT PROCEDURE 1 having an insertion point for receiving the unit operation of FIG. 55. FIG. 57 shows the resulting UNIT PROCEDURE 1 with the unit operation of FIG. 55 inserted and identified as unit Operation 1A.

FIG. 34 is a detailed depiction of the process for inserting transfer recipe segments. There are three basic scenarios in which a unit transfer can be involved. Transfers in which there are no parallel processing operations occurring during the transfer in any of the units involved, transfers in which one or more of the ※ transfer from※ units requires operations to continue to be performed in parallel during and/or after the transfer operation, and transfers in which the ※ transfer to※ unit requires operations to continue to be performed in parallel during and/or before the transfer operation. There generally are separate recipe segments for each of the two units involved in a transfer, a ※ transfer from※ recipe segment and a ※ transfer to※ recipe segment, as shown for the example in FIG. 15.

Figure 58:
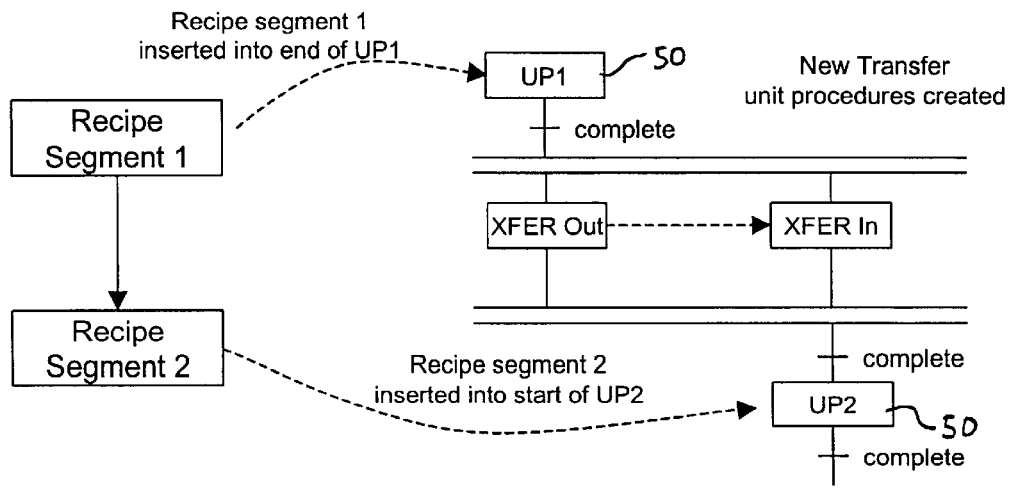
FIG. 58 is an example of a unit transfer between two units with no parallel unit operations.

FIGS. 58 through 61 are examples of the transfer from one unit to another involving situations with and without parallel processing during the transfer operation. FIG. 58 depicts the situation where there is no parallel processing during the transfer operation. UP1 is the unit procedure for the ※ transfer from※ unit and UP2 is the unit procedure for the ※ transfer※ unit. In this case, UP1 processes the materials until the procedure of UP1 is complete. UP2 processes the materials after the transfer process is complete. Neither UP1 nor UP2 operate in parallel with each other or with the transfer in this scenario. As shown in FIG. 58, in this case the transfer from recipe segment (depicted as ※ XFER OUT※) is added to the end of unit procedure UP1. The transfer to recipe segment is added to the beginning of unit procedure UP2. A parallel is opened at the beginning of the transfer and the parallel is closed at the end of the transfer. Thus, the unit procedure UP1 is completed. The transfer recipe segments are then performed in parallel. The parallel is closed and the unit procedure UP2 starts.

Figure 59:
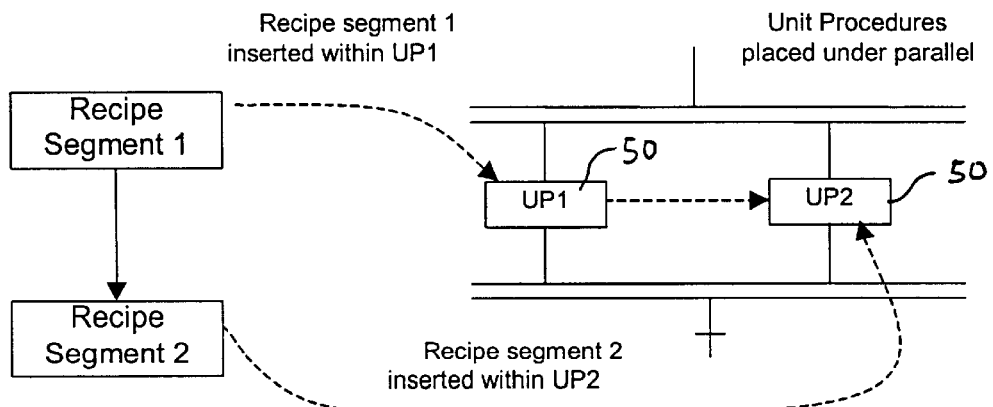
FIG. 59 is an example of a unit transfer between two units with parallel unit operations in both units.

FIG. 59 depicts the scenario where both the unit procedures are operated in parallel and the transfer occurs while the procedures operate in parallel. In this case a parallel is started at the beginning and both of the unit procedures are initiated in parallel. The transfer from and transfer to recipe segments are inserted within the unit procedures at the appropriate point in the respective unit procedures. The unit procedures start together, the material transfer occurs while both unit procedures are being performed, and the unit procedures continue to operate in parallel until they are both complete.

Figure 60:
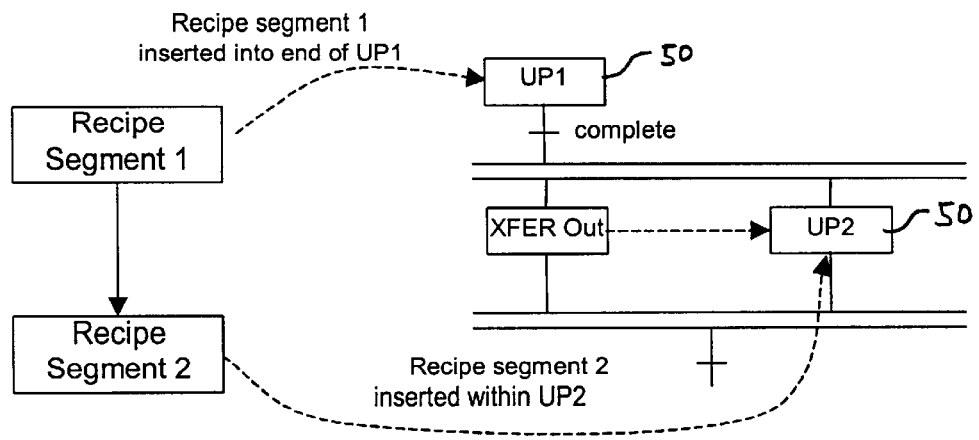
FIG. 60 is an example of a unit transfer between two units with parallel unit operations in the receiving unit.
Figure 61:
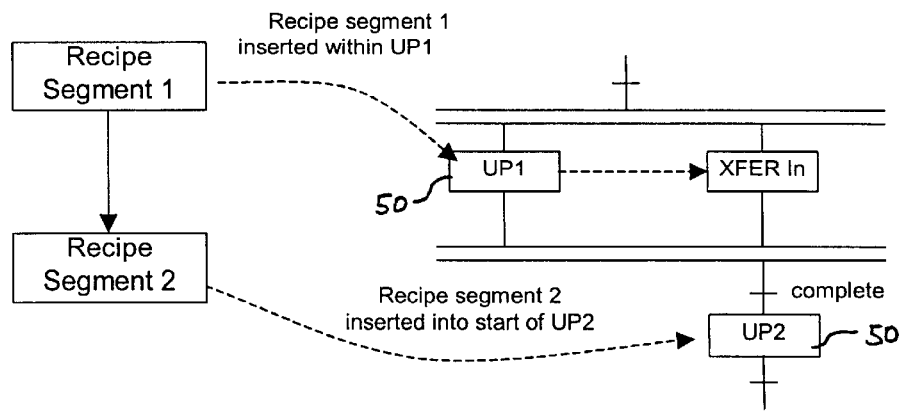
FIG. 61 is an example of a unit transfer between two units with parallel unit operations in the transfer from unit.

FIGS. 60 and 61 depict the remaining two possibilities for a material transfer between two units. FIG. 60 depicts the situation where unit procedure UP1 does not have any parallel operations being performed during the transfer, but unit procedure UP2 does have parallel operations being performed during the transfer. Such might be the case if unit procedure UP2 required activities such as mixing or heating to be performed during the transfer. The transfer might be a controlled transfer, where the material being transferred into unit 2 is being reacted, for example, with a material already in unit 2 prior to the transfer. Such a situation often requires a controlled transfer so that the temperatures can be maintained within a specified range during the transfer process. The transfer rate may actually be controlled to maintain the temperature in unit 2, as might be the case in a highly exothermic or endothermic reaction. In this case, the transfer from recipe segment is added to the end of unit procedure UP1 and the transfer to recipe segment is added within the recipe of unit procedure UP2. A parallel is opened after UP1 is complete and UP2 is started. The transfer is performed at the appropriate time during the operation of unit procedure UP2. FIG. 61 depicts the transfer occurring with operations being performed in unit procedure UP1 in parallel to the transfer. The transfer to unit does not have any parallel operations being performed during the transfer. In this case, unit procedure UP1 is started at the beginning of the parallel. The transfer from recipe segment is inserted within the procedure of UP1. The transfer is performed at the appropriate time during the performance of unit procedure UP1. The transfer to recipe segment is inserted at the beginning of unit procedure UP2. The transfer is performed in parallel with UP1, the parallel is closed, and then the unit procedure of UP2 begins, not in parallel to the transfer.

Figure 62:
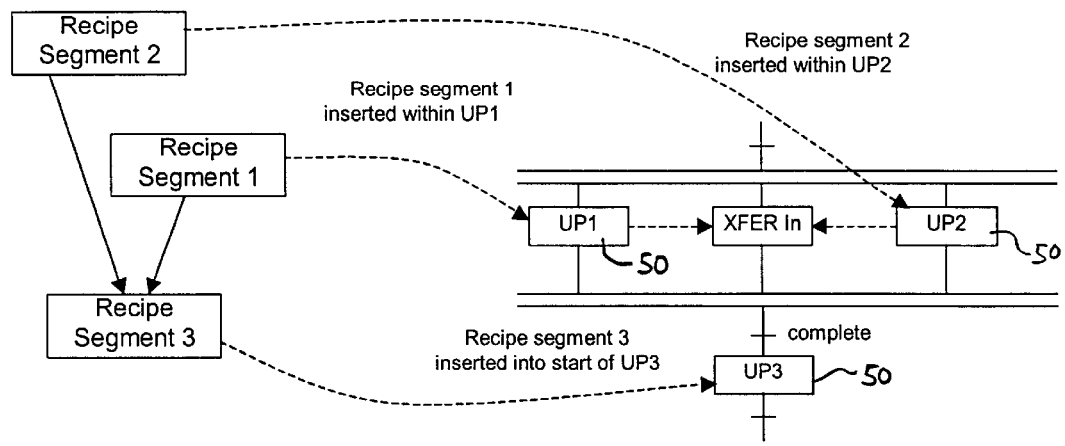
FIG. 62 is an example of a material join involving three units with parallel unit operations in the two transfer from units.
Figure 63:
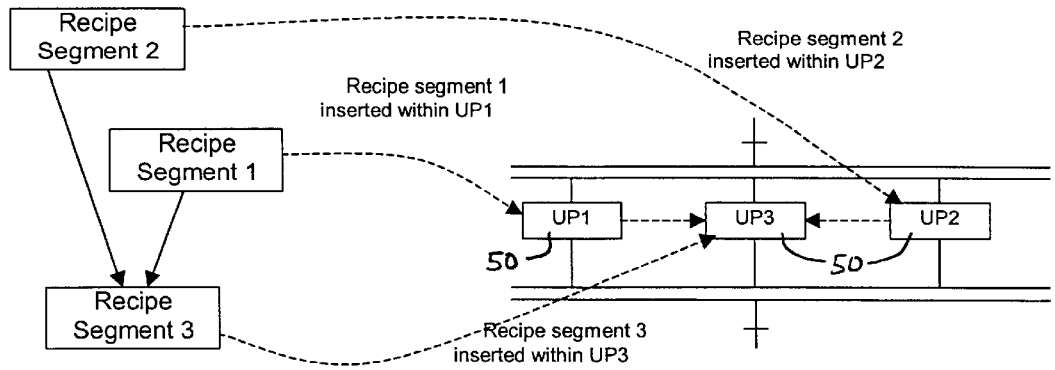
FIG. 63 is an example of a material join involving three units with parallel unit operations in all three units.
Figure 64:
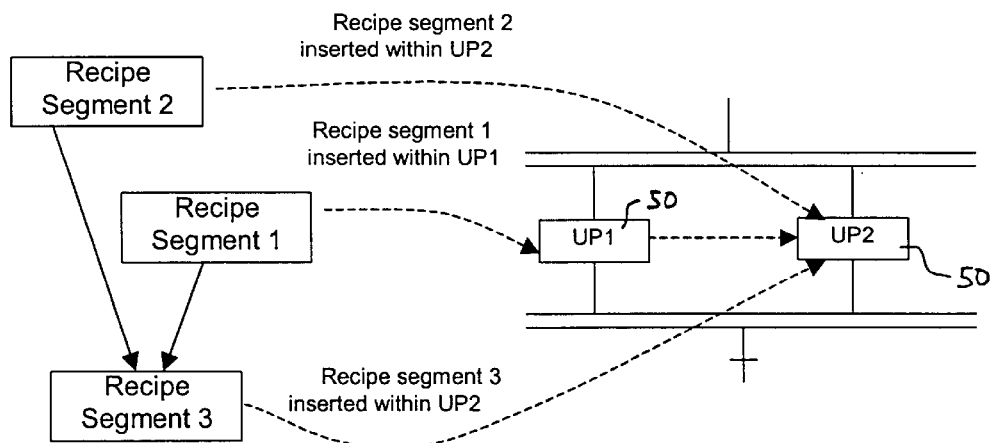
FIG. 64 is an example of a material join involving two units with parallel unit operations both units.

Material transfers such as a material join 106 involving three process branches 100 of the general recipe 44, corresponding to three segment paths 116 of the master recipe 46, are handled similarly to the two unit material transfers discussed previously. The key difference is that two transfers may be involved instead of one. This does not have to be the case, however, if the end of one of the transfer from segment paths is in the same unit as the beginning of the transfer to segment path. This scenario is depicted in FIG. 64. FIGS. 62 and 63 correspond to examples where the transfers involve three nits 88. FIG. 62 depicts a material join involving three units, unit 1 through 3, with three respective unit procedures, UP1 through UP3. In FIG. 62 the two transfer from unit procedures, UP1 and UP2, have parallel processing being performed during the transfer. The transfer to unit procedure UP3 does not have any processing being performed in parallel during the transfer. In this case, the transfer from recipe segments are added within the unit procedures of UP1 and UP2 and the transfer to recipe segment is added to the beginning of unit procedure UP3. UP1 and UP2 begin in parallel and the transfer is performed at the appropriate time during the operation of UP1 and UP2. The parallel operations are closed after the transfer and the procedure of UP3 is performed, not in parallel with the transfer operation. It should be noted that the transfers depicted in FIG. 62 from unit 1 and unit 2 into unit 3 are depicted to occur simultaneously. Each of the transfers to unit 3, from unit 1 and unit 2 respectively, could occur at different times during the procedures of UP1 and UP2. In this case, two transfer to recipe segments would be added at the start of UP3, one for the transfer from UP1 and one for the transfer from UP2. FIG. 63 depicts the same transfer process where there are parallel operations being performed in all three units procedures, UPI, UP2, and UP3. In this case the transfer from and transfer to recipe segments are inserted within each of the unit procedures. All three unit procedures are operated in parallel and the transfer is accomplished at the appropriate time during the performance of the three unit procedures.

Figure 65:
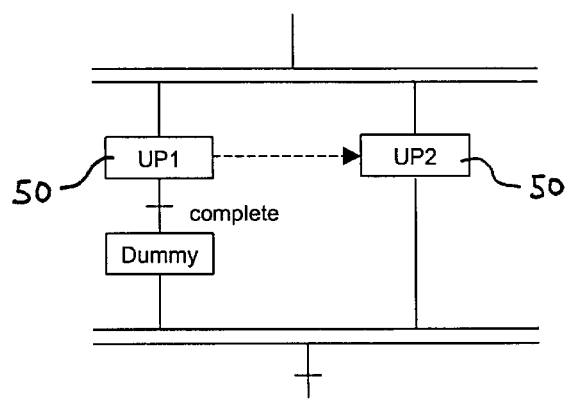
FIG. 65 shows a unit transfer with parallel operations in both unit and a dummy unit procedure inserted allowing deallocation of one of the units before the parallels complete.

It should be noted that during any of the transfers with parallel unit operations being performed in one or more units 88 involved in the transfer, the parallel operations may only be active during a portion of each of the unit procedures 50 involved. The actual start and end of the unit procedures may be at a different time from one another. In this case, only the portion of the unit procedures that are required to be in parallel should be represented in parallel. A dummy unit procedure may be added for the time periods when the unit procedures are not in parallel. This allows a unit which is not being used during a portion of the procedure to be de-allocated in a timely fashion. This situation is depicted in FIG. 65.

As discussed previously, FIG. 34 depicts the algorithms for inserting the material transfer recipe segments associated with block 140e of FIG. 33. When an insertion point has been identified by the process of FIG. 33, first it is determined if the transfer from and transfer to unit procedures are currently operating in parallel. If not, then the algorithms determine if there are suppose to be any parallel operations in the from unit, the to unit, or both. If parallels are required they are created in the appropriate unit procedure for the from or the to unit or both. After the appropriate parallel operations have been created, the transfer from recipe segment is inserted into the unit procedure of the unit discharging the material and the transfer to recipe segment is inserted into the unit procedure for the unit receiving the material.

FIGS. 66 through 96 provide an example of the preferred data structure and methods of representing a general recipe 44, a master recipe 46, and site information 40 for use with the preferred embodiments of the invention. Much like the example provided by FIGS. 12 through 18 and 35 through 44 described previously, FIGS. 66 through 96 provide an example of a specific general recipe 44, a specific set of site information 40 defining a specific process cell 14, and a master recipe 46 created from the general recipe of the example and the specific set of site information. FIGS. 66 through 96 represent the general recipe, the master recipe, and the site information using the data structure and methods of representing the data for use in the preferred embodiments of the invention. In the preferred embodiments, the data associated with the general recipe, the master recipe, and the site information is stored in relational databases that support object embedding and linking (OLE). The methods of inputting, viewing, and editing the data associated with the general and master recipes and the site information are preferably as OLE objects. The OLE objects preferably have underlying tables and data entry screens which are used to create, edit, and display the information in the database by accessing these tables or data entry screens through the OLE objects. The objects used to link to the database preferably conform to the standards defined by the OPC Foundation of Boca Raton, Florida. The Object Linking and Embedding used to create, edit, and display the various recipes and elements (general recipe, master recipe, process stages, unit procedures, process operations, unit operations, process actions, recipe segments, recipe phases, site information, etc.) are preferably compatible with the WINDOWS® operating systems (WINDOWS® 3.x, WINDOWS® 95, WINDOWS® 98, WINDOWS® NT, etc.) by Microsoft Corporation of Redmond, Wash. As described earlier, the batch server 20 preferably has a WINDOWS® NT operating system and includes the WINDOWS® DDE software package, both by Microsoft Corporation, operating on the server. These software packages support the OLE object creation and editing. In addition, the batch server preferably has a relational database software package which supports OLE, such as SQL-Server by Microsoft Corporation, operating on the Server 20. Thus, the server configuration allows for the recipes and their elements to be created, edited, and viewed using OLE objects and OLE software tools.

Figure 66:
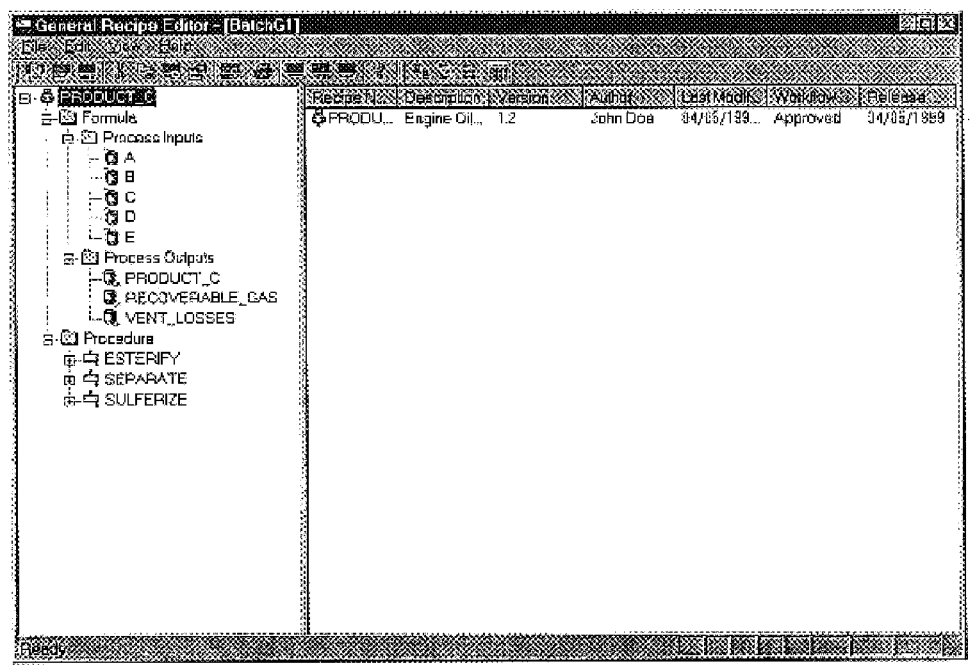
FIG. 66 shows a view from the general recipe editor in accordance with the preferred embodiments of the invention for a summary of header information for the general recipe of the second example.

FIGS. 66 through 81 depict the various screens associated with the preferred recipe authoring application. The recipe authoring application is for creating, editing, and viewing general 44 and master recipes 46 and converting general recipes to master recipes. As was described in detail previously, the general recipe 44 preferably is composed of a variety of elements (the header, the formula, the process or procedure, the equipment requirements, and the other information), which are further divided into various subcomponents (process stages, process operations, and process actions). FIG. 66 shows the screen view for the header information of the example general recipe 44. The screen of FIG. 66 provides a brief summary of the name of the general recipe, in this case PRODUCT_C, the description of the recipe, the version or revision control number for the recipe, the author, the date the recipe was last modified, the workflow status of the recipe, and the release date for the recipe.

Figure 67:
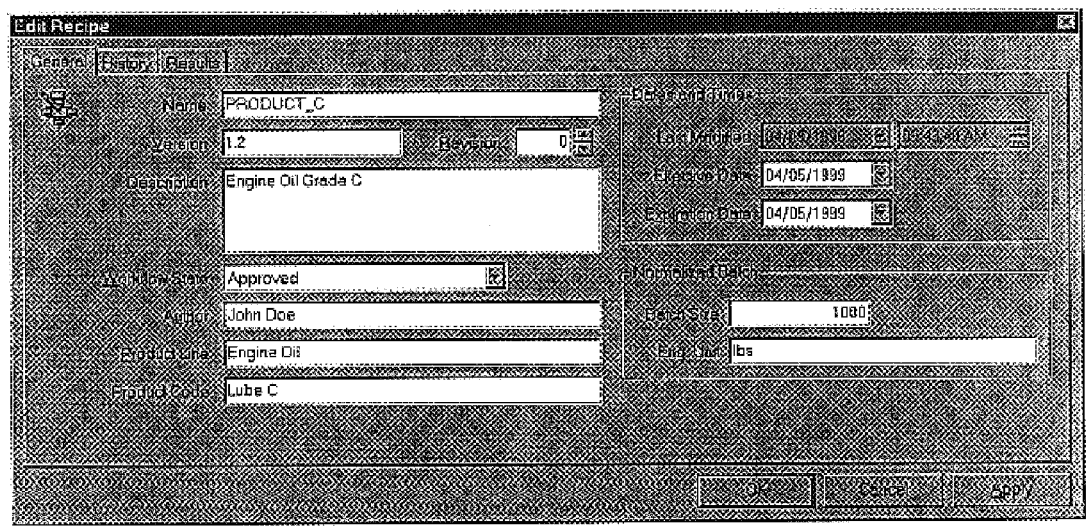
FIG. 67 shows a view from the general recipe editor in accordance with the preferred embodiments of the invention for header information for the general recipe of the second example.
Figure 68:
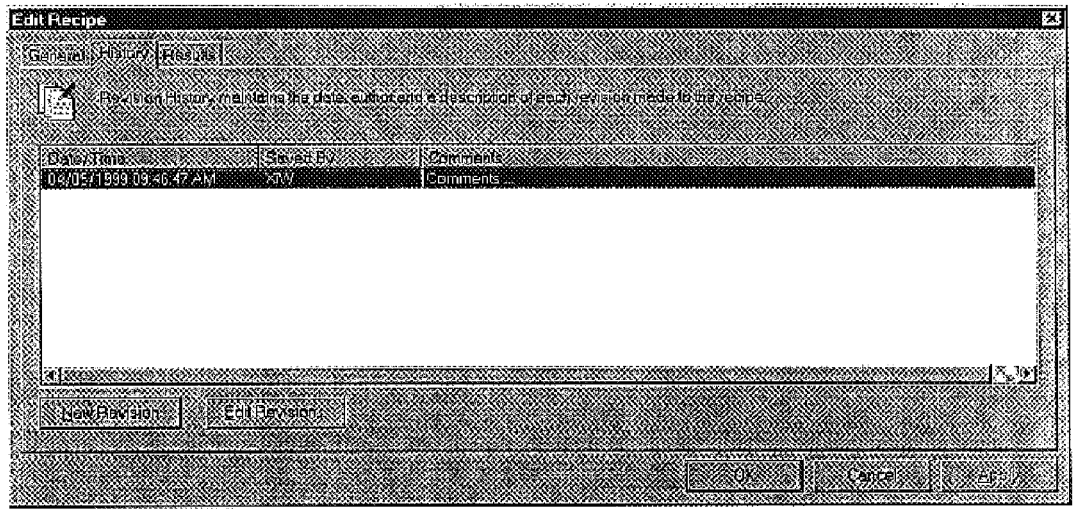
FIG. 68 shows another view from the general recipe editor in accordance with the preferred embodiments of the invention for header information for the general recipe of the second example.
Figure 69:
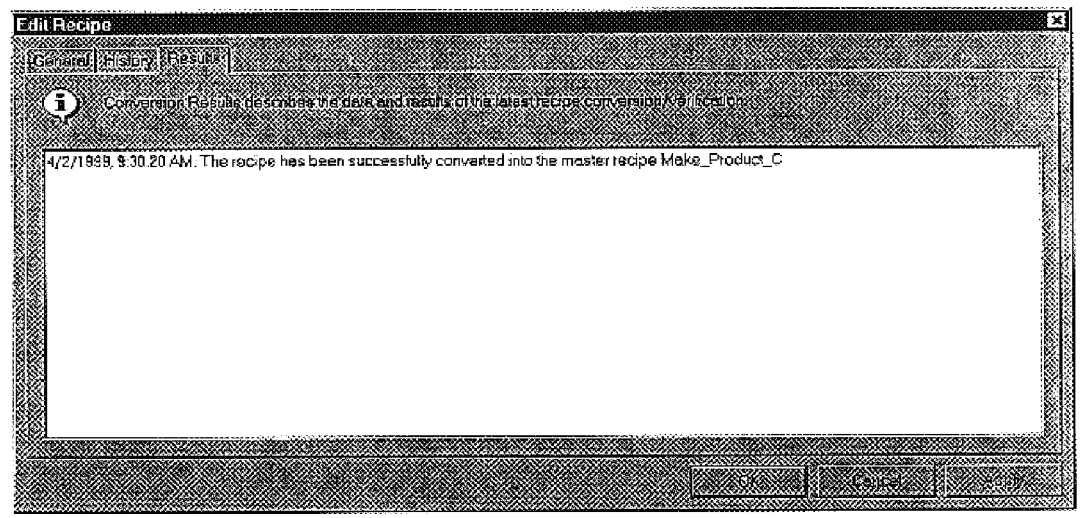
FIG. 69 shows still another view from the general recipe editor in accordance with the preferred embodiments of the invention for header information for the general recipe of the second example.

There are several underlying pages or sheets associated with the header information. These underlying sheets are identified as ▩ General▩, ▩History▩, and ▩ Results▩. FIG. 67 shows the sheet underlying the general tab. A more detailed summary of the information provided in the view of FIG. 66 is provided in the view of FIG. 67. FIG. 68 shows the view associated with the ▩ History▩ tab. This view provides a summary of all the revision history associated with the general recipe. FIG. 69 shows the view associated with the ▩ Results▩ tab. This view provides a summary of the history of the recipe conversion process from general to master recipes, including date and time of conversion.

Figure 70:
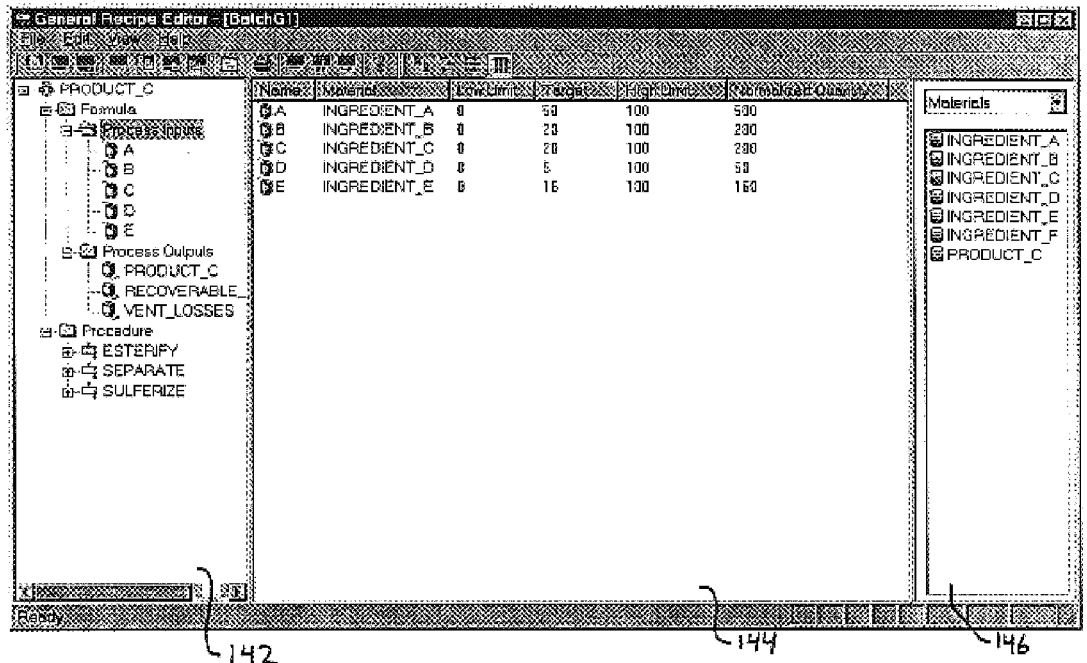
FIG. 70 shows a view from the general recipe editor in accordance with the preferred embodiments of the invention for the process inputs for the general recipe of the second example.

FIG. 70 shows the general recipe editor function of the preferred methods of the invention. The view provided in FIG. 70 is divided into three sections. The left side, or the file folders pane 142, of the view depicts the structure of the recipe in an indented file format. The file folders pane allows the user to select the elements of the recipe he wishes to view. The middle pane, or the view pane 144, shows the recipe view elements that are selected in the file folders pane 142. In the case of FIG. 70, the ▩ Process Input▩ file folder underlying the ▩ Formula▩ file folder in the recipe is selected in the file folders pane. The view displayed in the view pane 144 of FIG. 70 is a summary of the process inputs for the formula. The process inputs include the input materials 74 for the general recipe. The summary includes a list of all the process inputs for the recipe and a summary of the properties associated with the process inputs. The right side of the view, or the tool pane 146, provides a user selectable list of tools associated with the selected view pane 144. The tools are used to create and edit the selected view pane. The list of tools preferably includes Flow Diagrams, Materials, Process Inputs, Process Outputs, and Equipment Properties. Any tool which is useful for creating and editing recipes in the view pane could be included in the list of tools. In the case of FIG. 70, the tools provided are a list of materials available to edit the process inputs for the formula.

Figure 71:
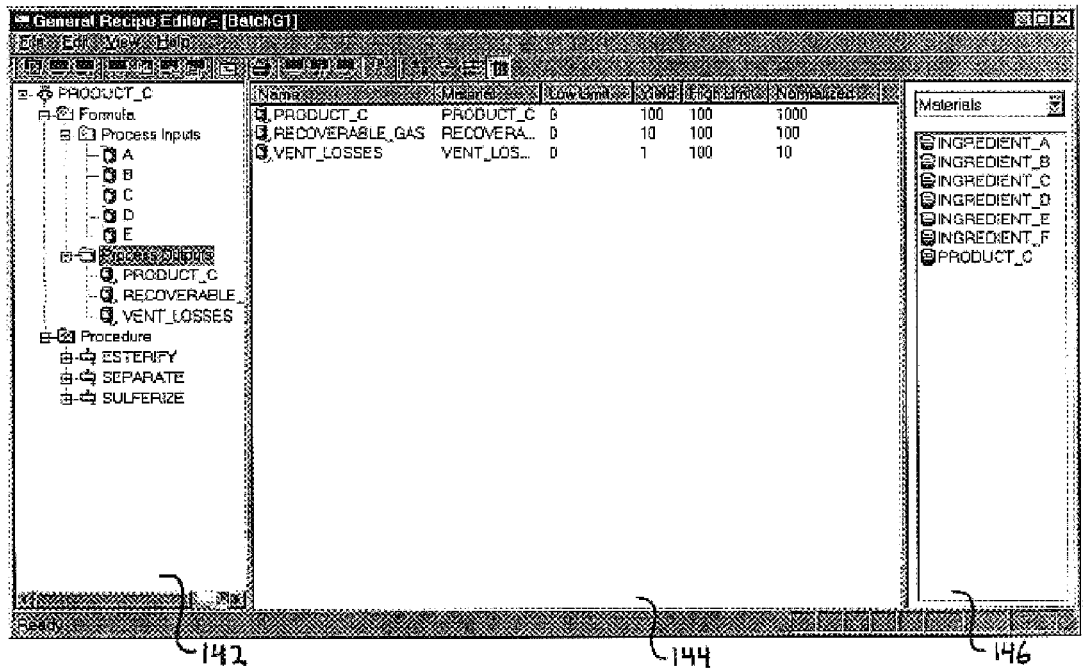
FIG. 71 shows a view from the general recipe editor in accordance with the preferred embodiments of the invention for the products for the general recipe of the second example.

FIG. 71 shows the recipe editor with the ※ Process Outputs※ file of the formula selected in the file folders pane 142 of the editor. The view pane 144 shows a summary of the products 72 created by the recipe. The tools provided in the tool pane 146 are a list of the materials available to edit the process outputs file of the formula.

Figure 72:
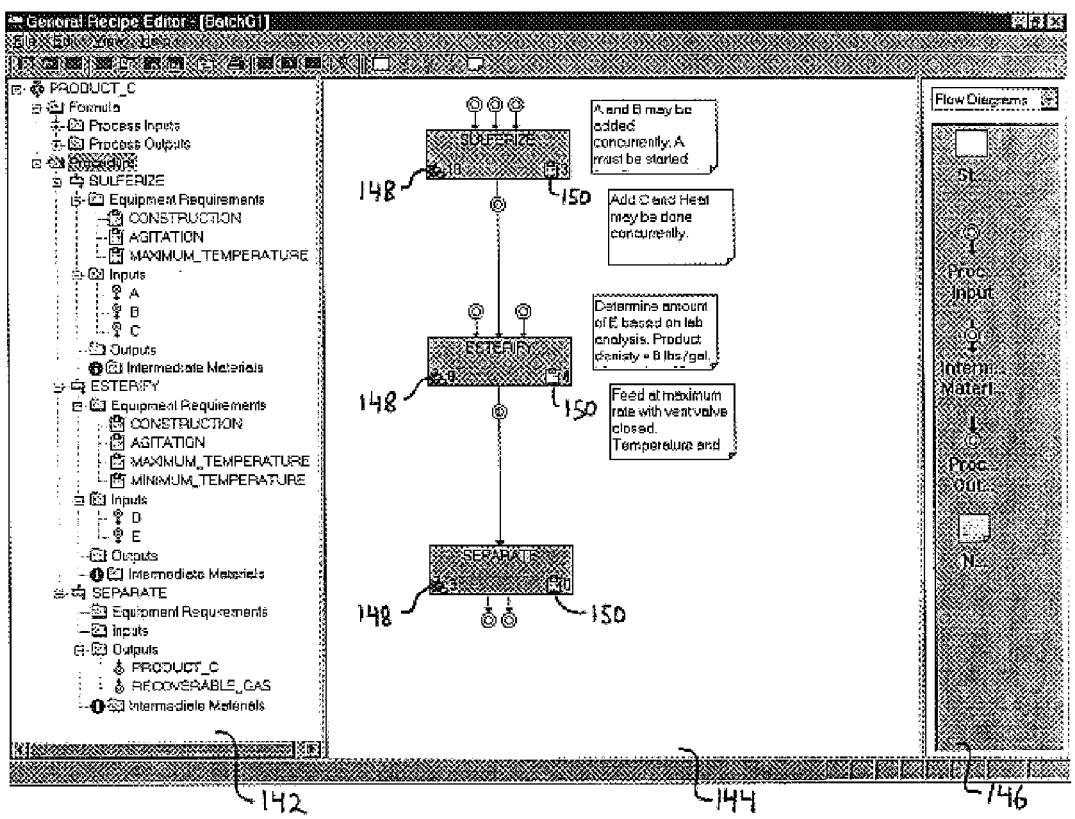
FIG. 72 shows a view from the general recipe editor in accordance with the preferred embodiments of the invention for the process dependency chart for the general recipe of the second example.

FIG. 72 shows the recipe editor with the ※ Procedure※ file folder of the general recipe selected in the file folders pane 142 of the editor. The view pane 144 depicts the general recipe 44 depicted as a process dependency chart at the highest level, the process stage level. Again, refer to Appendix 2 for a detailed description of how to read a process dependency chart.

In this case, the process stages 58 are depicted as blocks in the chart. The tools provided in the tool pane 146 are the symbols for the various types of elements of the process dependency chart, namely the process stages 58, the process input materials 74, the process intermediate materials, the process outputs or products 72, and user defined text notes for documenting additional information associated with the general recipe 44.

Figure 73:
FIG. 73 shows the flow symbols for the flow diagram of the general recipe view of FIG. 72.

FIG. 73 provides a clear view of the tools from the tool pane 146 of FIG. 72. These tools are provided to assist the user in creating and editing the general recipe 44 in the view pane 144.

The user may select these tools to add their corresponding features to the recipe in the view pane 144.

In the case of this example, the general recipe 44 depicted in FIG. 72 includes three process stages 58, ※ Sulferize," ※ Esterify," and ※ Separate." The block depictions of the process stages include a step icon 148 located in the lower left hand corner of each process stage block. The step icon identifies the number of steps, including the process actions 62, that are in the process stage underlying the process stage block.

As can be seen in FIG. 72, the Sulferize stage includes 10 steps, the Esterify stage includes 8 steps, and the Separate stage includes 3 steps. The icon in the lower right hand corner of each process stage is the equipment requirements icon 150. This icon displays the number of equipment requirements that are associated with the process stage underlying the process stage block.

Figure 74:
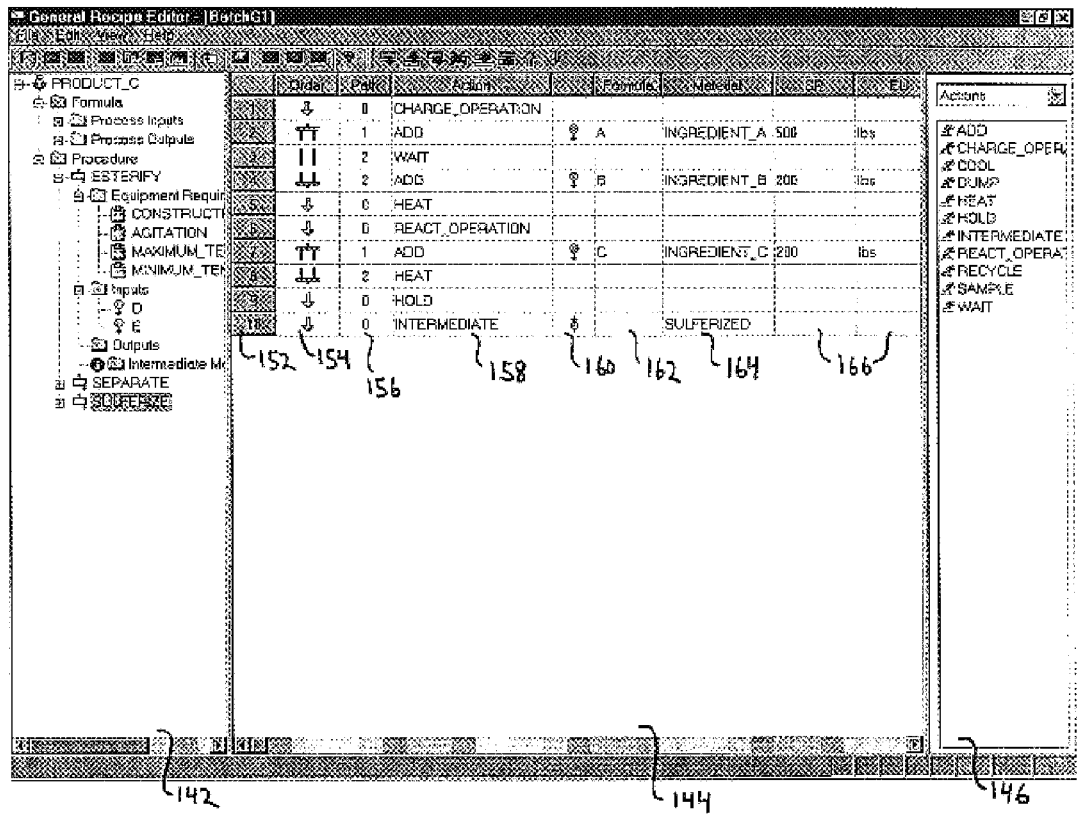
FIG. 74 shows a view from the general recipe editor in accordance with the preferred embodiments of the invention for the process details of the Sulferize process stage for the general recipe of the second example.

FIG. 74 shows the view with the ※ Sulferize※ file folder under the ※ Procedures※ file selected in the file folders pane 142. The view pane 144 depicts the process for the Sulferize stage. The view in the view pane 144 for the stage shows the procedure or process of the stage in a tabular format, called a Process Sequence Table, in accordance with Appendix 2. The table is broken up into a group of columns. The left most column is the index number associated 152 with steps and elements of the procedure. Not all of the index numbers are actual steps. They can be position holders for process tags such as the name of a process operation 60 beginning at that tag, or the identification of an intermediate material. Index numbers 1, 6, and 10 in FIG. 74 are index numbers that do not correspond with actual process steps or process actions for the Sulferize stage. The balance of the index numbers are associated with actual steps for the stage. The order symbols 154 provided in the column labeled ※ order※ identify what steps or index numbers are to be performed in parallel, when to start parallels, and when to finish parallels. The path number 156 identifies which path of a parallel a particular index number 152 is associated with. These columns taken together define the structure of parallels. They follow the process dependency chart guidelines provided in Appendix 2. The action name 158 is provided in the column labeled. ※ Action※. The action name may be the name of the process action 62 associated with an index number, or it may be another identifier such as the name of a process operation 60 beginning at that index number if the index number is not associated with an actual recipe step performing a process action.

The material type 160 of any materials associated with an index number 152 is provided. The type is represented by one of the symbols proved in FIG. 73 for input material 74, intermediate material, or output material (product) 72. The formula identifier 162 for materials associated with an index number is provided in the column labeled ※ Formula※. This identifier is typically a general or common identifier. The actual material identification 164 is provided in the column labeled ※ Material.※ This column is generally used to identify the input 74 and product 72 materials with the site specific identification for the material. This identifier is typically the material identifier used by the recipe conversion system. If the material is an intermediate, without a site specific identifier, then this column may be used to provide a description of the material that is useful to a person reviewing or using the recipe. An example of this situation is provided in index 10 of FIG. 74, where the intermediate material is identified as ※ Sulferized.※ Additional columns are provided to summarize index number information 166 associated with an index number, such as engineering units, set points, and the like. The tool pane 146 of the view of FIG. 74 provides the process actions 62 available for editing the procedure of the process stage 58. It should be noted that the tool pane of the recipe editor includes a drop down list of tool panes that may be changed by the user for convenience in creating and editing the recipes.

Figure 100:
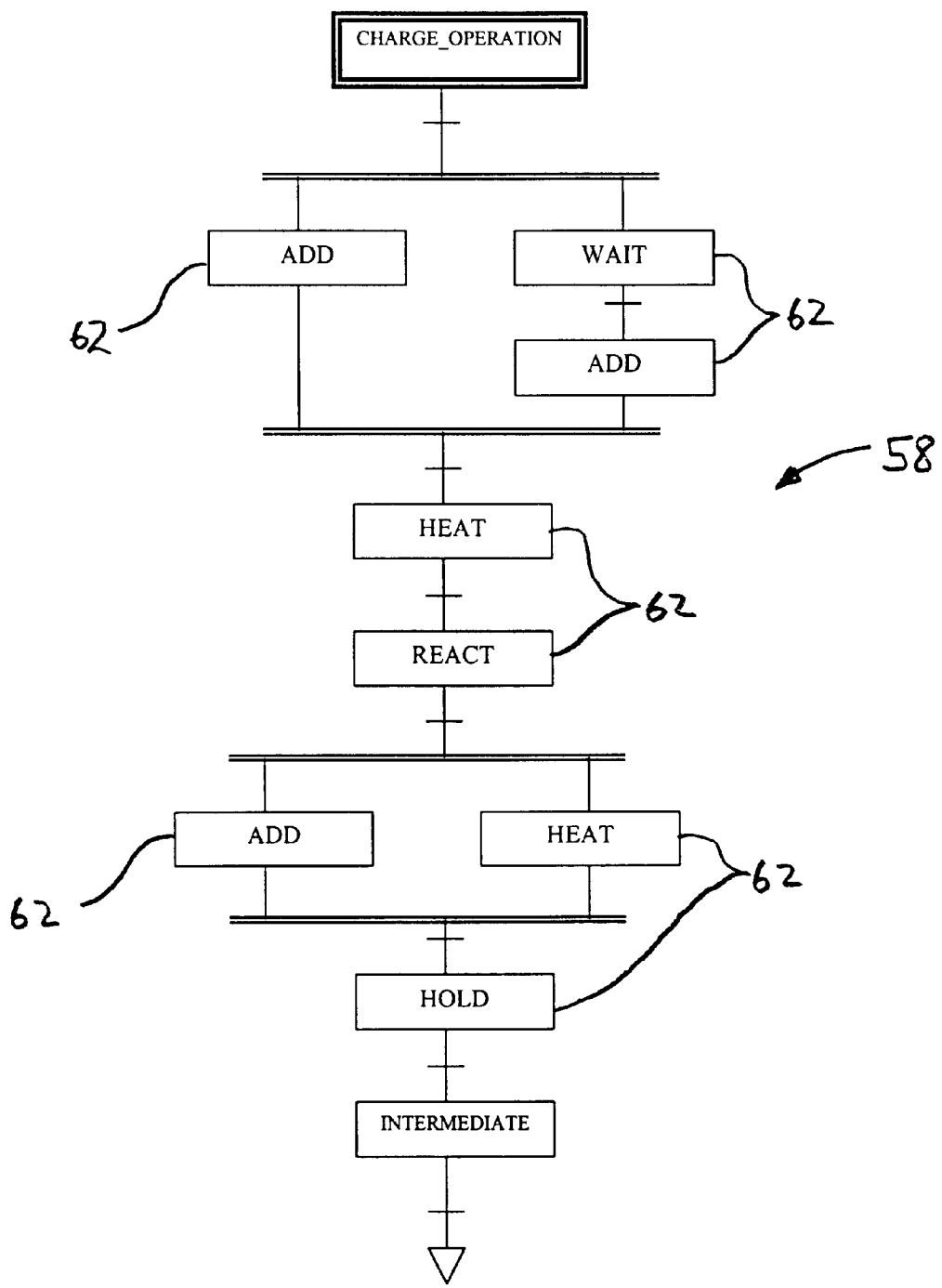
FIG. 100 is a representation of the Sulferize process stage from the general recipe of the second example using a sequence function chart.

An alternate preferred method of representing the details of the process stages 58 of the general recipe 44 is the use of a graphical format such as a Sequence Function Chart (SFC). The interpretation of an SFC is essentially the same as the interpretation of a PFC. See Appendix 1 for the interpretation of an SFC. When SFC format is used to depict the elements of a general recipe 44, the blocks or steps of the SFC represent the process actions 62 of the recipe. The lines indicate the flow (direction and order) or sequence of operations in the recipe. Users may also optionally configure transition or logic conditions for process actions. In this manner, the start or completion of a process action may be made conditional. The conditions must be met before a process action 62 is executed or before a process action is completed. Such transition conditions are similar in use and format to those depicted for the unit start recipe segment of FIG. 50, as described in detail previously. An example of the SFC representation for a process stage 58 is shown in FIG. 100. The process stage represented in FIG. 100 is the ※ Esterify※ process stage from the general recipe for this example as depicted in FIG. 72. The tabular representation, or process sequence table representation, for the ※ Esterify※ process stage for this example is shown in FIG. 80, as described later.

Figure 75:
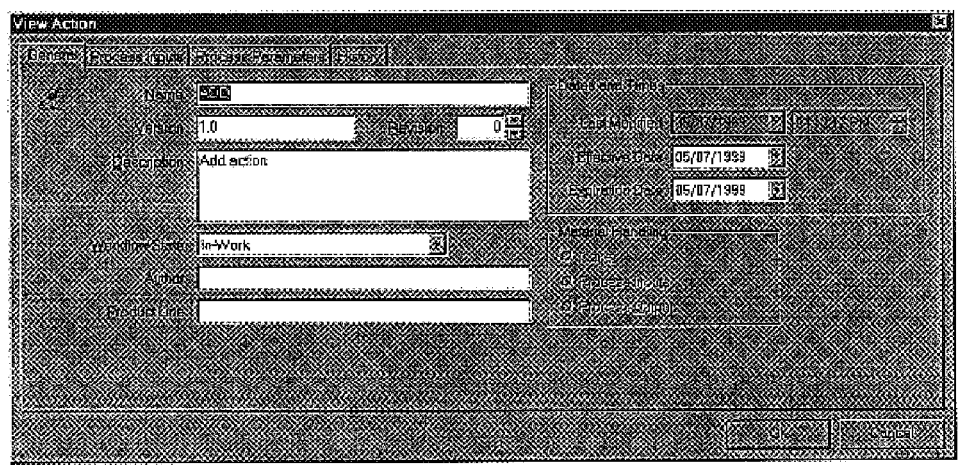
FIG. 75 shows a view from the general recipe editor in accordance with the preferred embodiments of the invention for general information associated with an "Add" process action for the general recipe of the second example.
Figure 76:
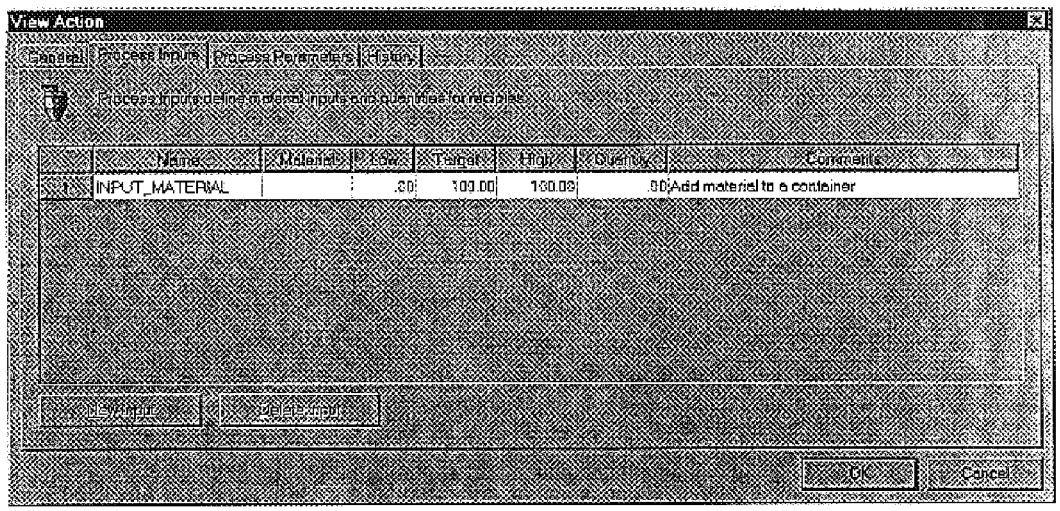
FIG. 76 shows a view from the general recipe editor in accordance with the preferred embodiments of the invention for process input information associated with an "Add" process action for the general recipe of the second example.
Figure 77:
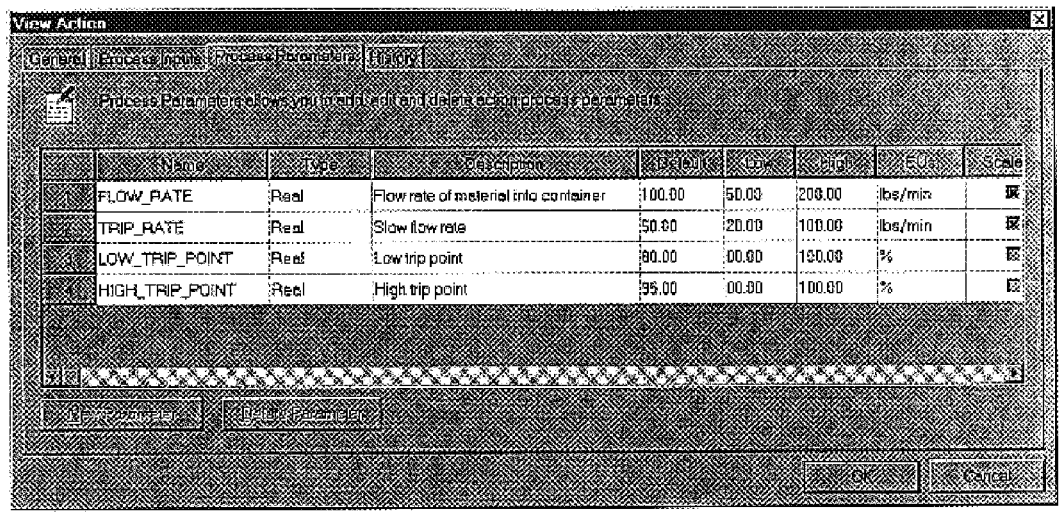
FIG. 77 shows a view from the general recipe editor in accordance with the preferred embodiments of the invention for the process parameters associated with an "Add" process action for the general recipe of the second example.
Figure 78:
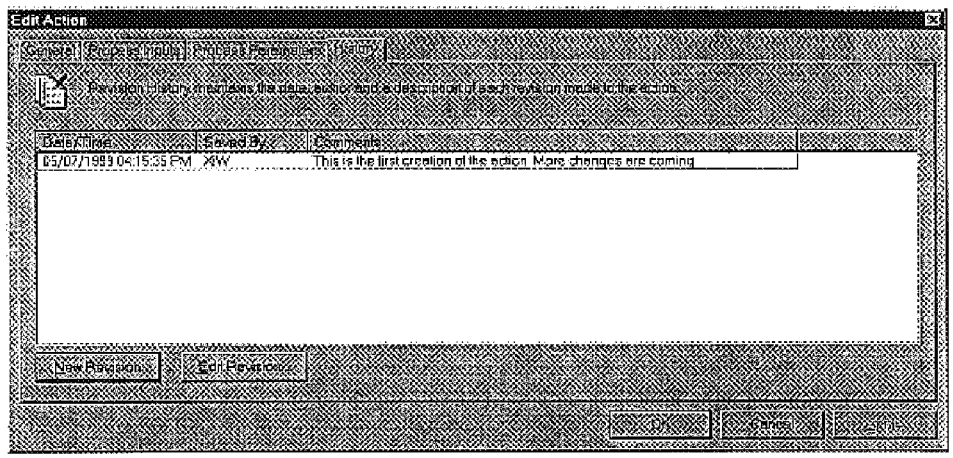
FIG. 78 shows a view from the general recipe editor in accordance with the preferred embodiments of the invention for history information associated with an "Add" process action for the general recipe of the second example.
Figure 79:
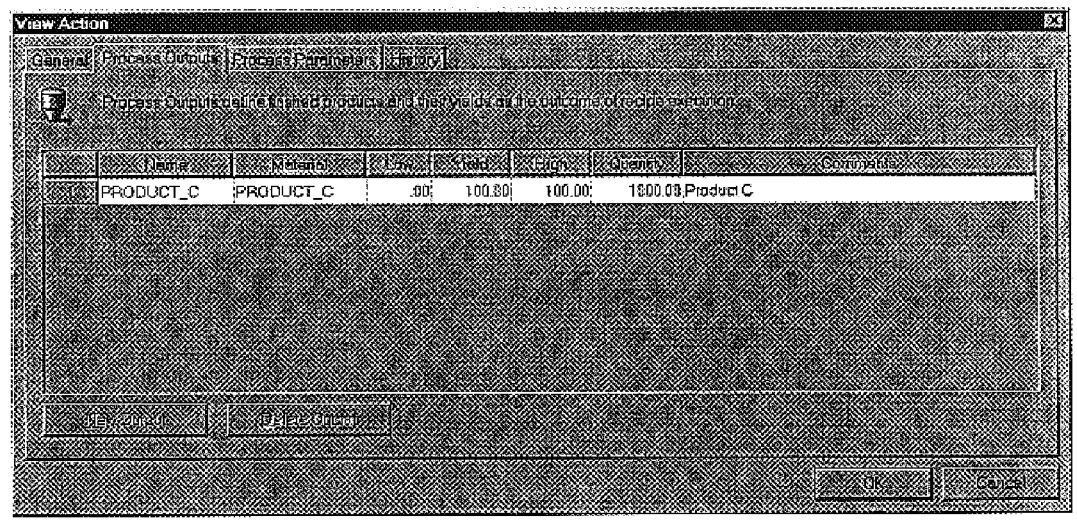
FIG. 79 shows a view from the general recipe editor in accordance with the preferred embodiments of the invention for process output information associated with a "Dump" process action for the general recipe of the second example.

FIGS. 75 through 78 provide the underlying properties pages or sheets associated with the process action ※ ADD※ from the process action list in the tool pane 146 of FIG. 74. The properties associated with the process action include a general sheet which has the name of the process action, its version, its description, and other general information associated with the process action. The sheet underlying the general tab is shown in FIG. 75. FIG. 76 shows the sheet underlying the process inputs tab for the same process action. This tab defines specific details associated with the input material. In the case it defines the material, the amount of material (high, low, and target), and scaling factors. FIG. 77 shows the sheet underlying the Process Parameters tab for the process action. This sheet defines the detailed parameters associated with the action. In this case, flow rates and alarm trip points. FIG. 78 shows the screen underlying the History tab for the process action. This screen provides the revision history for the process action. FIG. 78 shows the same process action properties sheets associated with a material discharge process action. In this case, the process inputs tab becomes a process outputs tab because the action is discharging one of the products from the process. The process outputs sheet underlying the process outputs tab for the discharge process action is shown in FIG. 79. The sheet is similar to the process inputs sheet shown in FIG. 76, except the information provided includes the product yield information for the process. The sheets underlying the other tabs for this process action are similar to those provided in FIGS. 75, 77, and 78.

Figure 80:
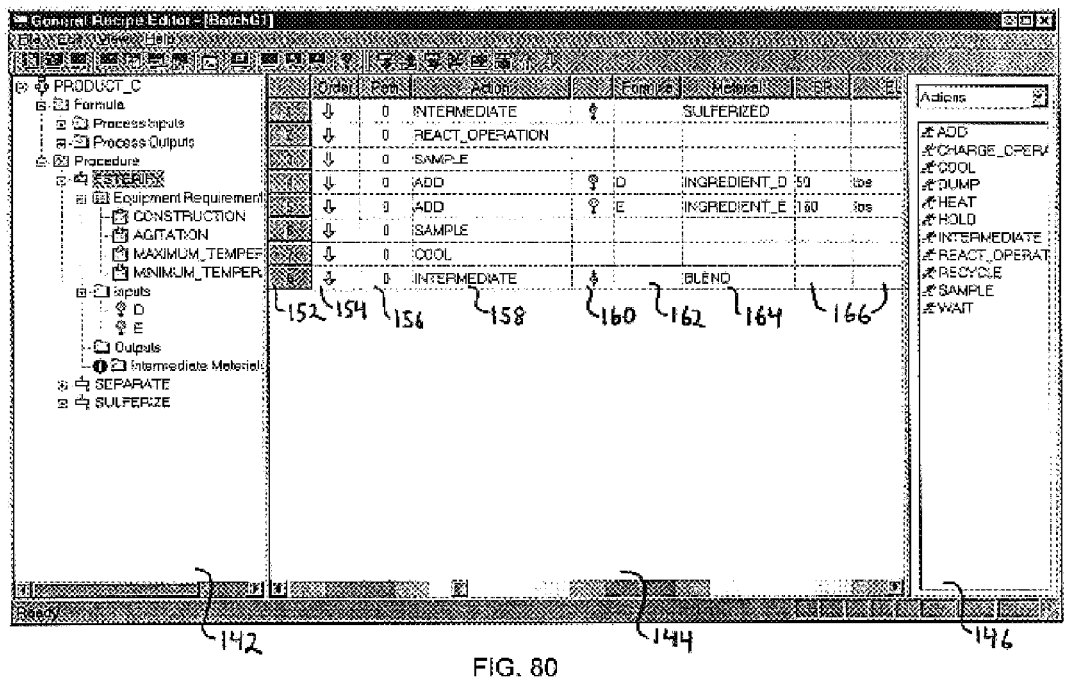
FIG. 80 shows a view from the general recipe editor in accordance with the preferred embodiments of the invention for the process details of the Esterify process stage for the general recipe of the second example.
Figure 81:
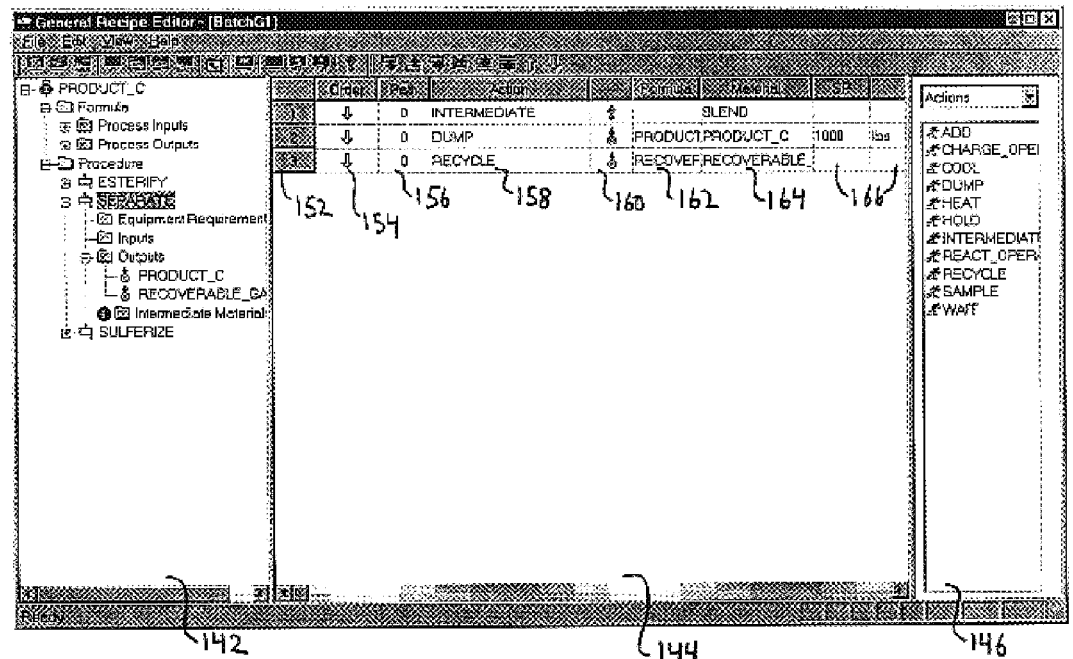
FIG. 81 shows a view from the general recipe editor in accordance with the preferred embodiments of the invention for the process details of the Separate process stage for the general recipe of the second example.

FIGS. 80 and 81 show the procedure associated with the ※ Esteri※ and the ※ Separate※ process stages respectively. These tabular procedures are displayed in the in the view pane of the recipe editor when the ※ Esterify※ or the ※ Separate※ files folders are selected in the file folders pane. These views have the same structure as the view of FIG. 75 discussed previously.

FIGS. 82 through 87 depict the master recipe 46 that was created from the general recipe 44 provided in FIGS. 66 through 81. The master recipe is shown in the preferred PFC format conforming to ISA S88.02 and Appendix 1. The views shown in these figures utilize the presently preferred process control application OPENBATCH※ by Sequencia Corporation of Phoenix, Ariz. to display the master recipe.

Figure 82:
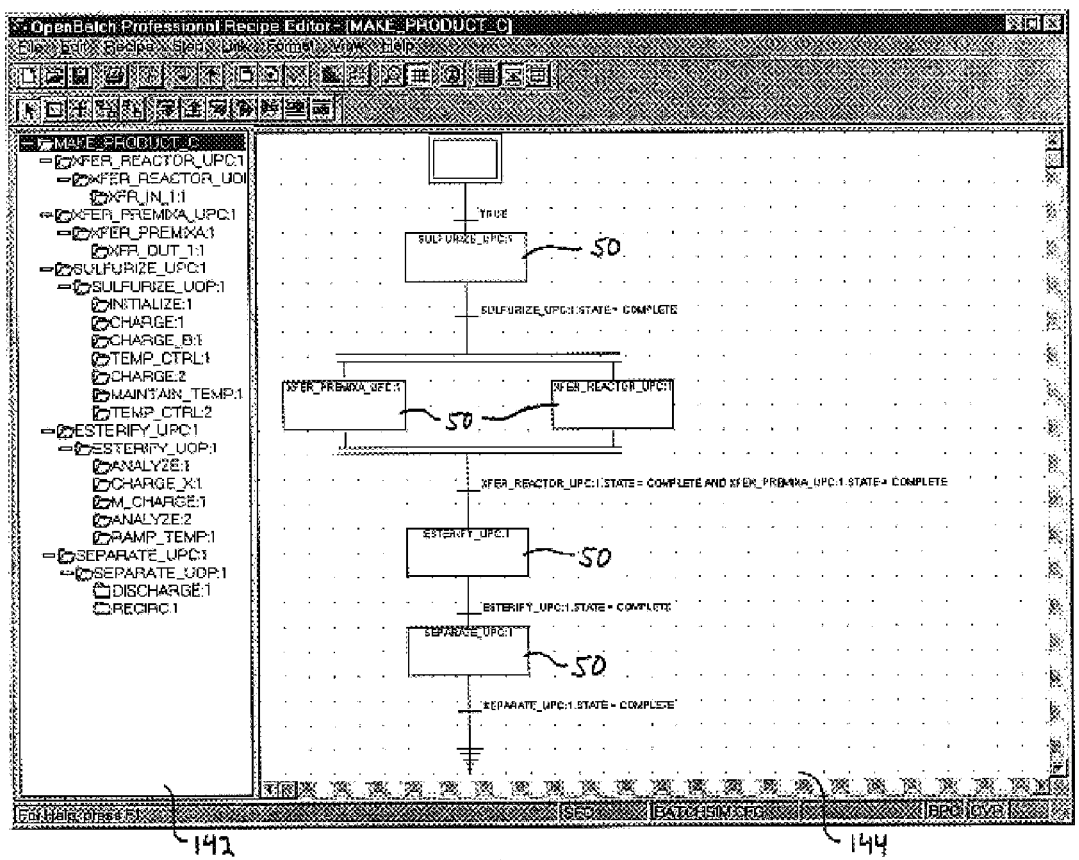
FIG. 82 shows a view from the OPENBATCH professional recipe editor in accordance with the preferred embodiments of the invention for the Procedure Flow Chart for the master recipe of the second example.
Figure 95:
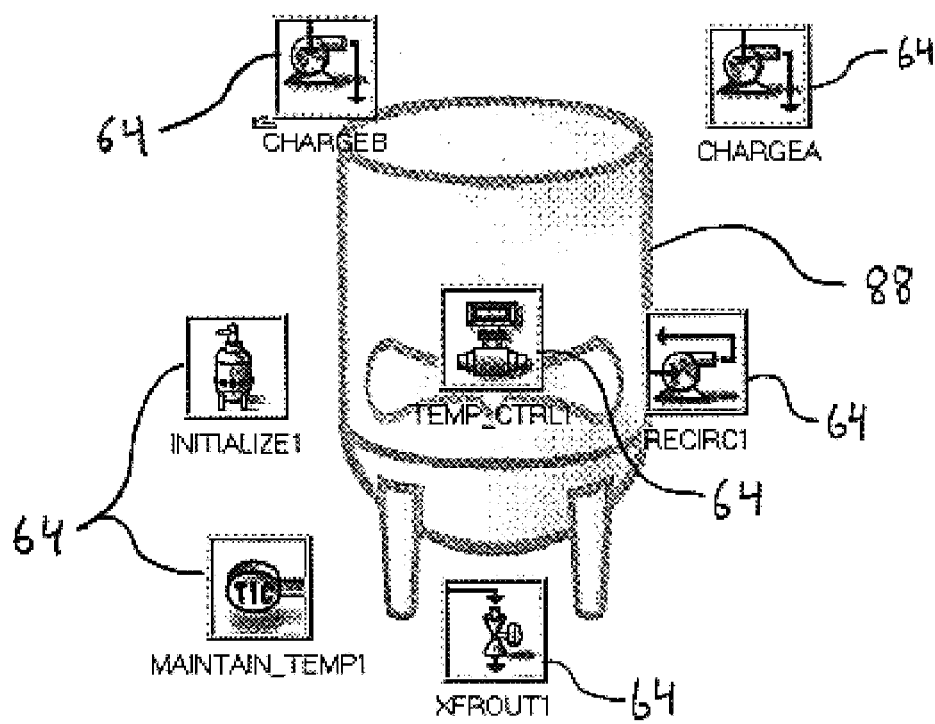
FIG. 95 shows the unit configuration for unit Premix_A from the process cell of the second example.
Figure 96:
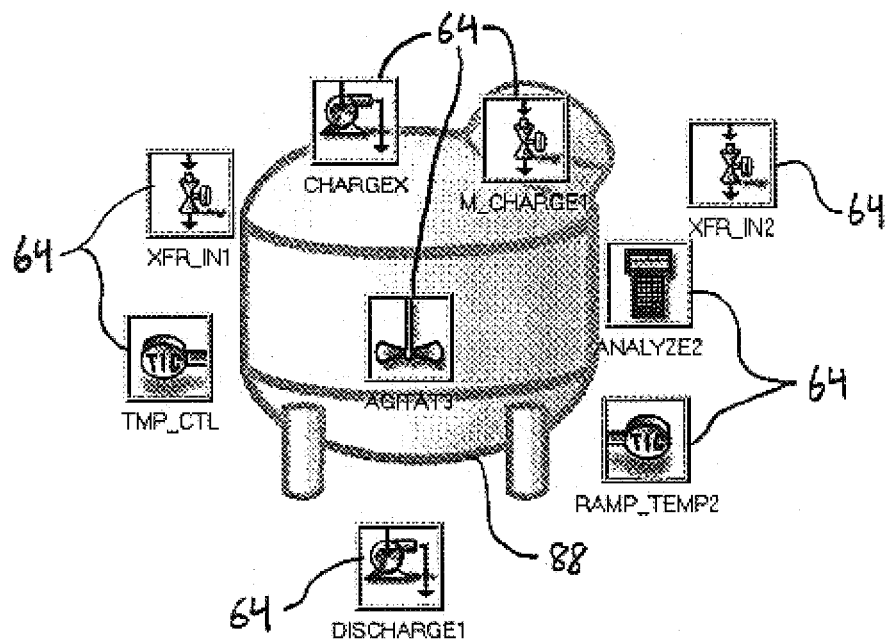
FIG. 96 shows the unit configuration for unit Reactor_1 from the process cell of the second example.

FIG. 82 depicts the master recipe 46 at its highest level displaying only the unit procedures 50 and the manufacturing sequence required to create the master recipe from the unit procedures. Similar to the view screens for the General Recipe Editor, the Professional Recipe Editor for OPENBATCH※ includes a file folders pane 142 for selecting the file folder to view and edit and a view pane 144 for viewing the selected file folder. In FIG. 82, the procedure file folder for the master recipe, ※ Make_Product_C※ is selected in the file folders pane. The master recipe associated with Make_Product_C is displayed in the view pane. The master recipe shown in FIG. 82 includes unit procedures 50 corresponding to the process stages 58 of the general recipe as shown in FIG. 72. The unit procedure ※ Sulferize_UPC:1※ corresponds to the process stage ※ Sulferize.※ The unit procedure ※ Esterify_UPC:1 corresponds to the process stage ※ Esterify※ and the unit procedure ※ Separate_UPC:1※ corresponds to the process stage ※ Separate.※ The process cell configuration for this example is provided in FIG. 94. The cell 14 includes three units, ※ Premix_A,※ Premix_B,※ and ※ Reactor_1.※ The master recipe of FIG. 82 uses the units Premix_A and Reactor_1 to perform the recipe. The recipe segments 64 available in the unit ※ Premix_A※ are shown in FIG. 95 and the recipe segments available in the unit ※ Reactor_1※ are shown in FIG. 96. The master recipe 46 depicted in FIG. 82 includes two material transfer procedures, one corresponding to the ※ transfer from※ recipe segment for unit ※ Premix_A※ and the other corresponding to the ※ transfer to※ recipe segment for unit ※ Reactor_1.※ As discussed previously, these recipe segments correspond to equipment specific recipe segments that do not have corresponding process actions 62 in the general recipe 44. In the case shown in FIG. 82, the transfer recipe segments occur in parallel with one another, but these recipe segments do not have corresponding unit procedures 50 occurring in parallel.

Similar to the general recipe of FIGS. 66 through 81, the master recipe has header information as shown in the view of FIG. 83. The header information includes the procedure name or identifier, the version and version date, the author, approval information, product name and code, batch size, and other general information pertinent to the master recipe 46.

Figure 84:
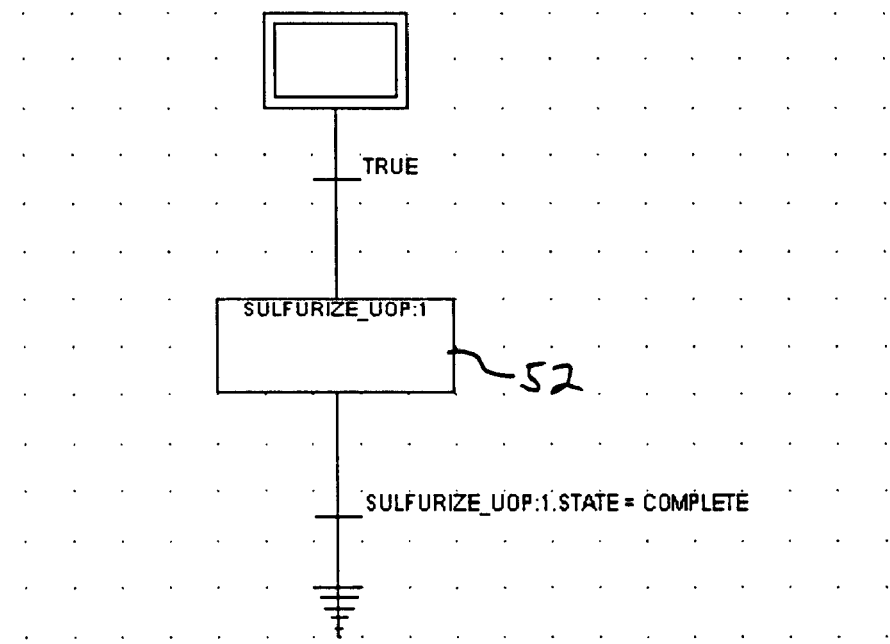
FIG. 84 shows a the Procedure Flow Chart for the unit operation Sulferize_OP:1 from the master recipe of the second example.
Figure 85:
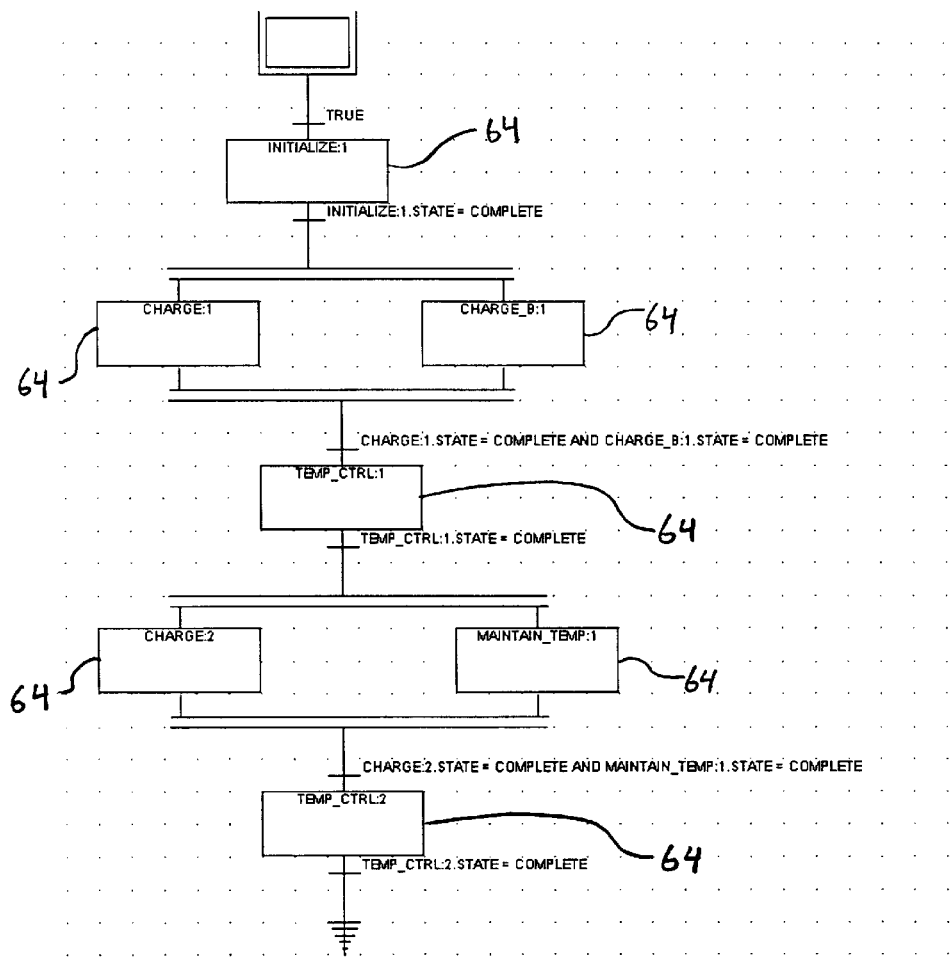
FIG. 85 shows a the detailed Procedure Flow Chart for the unit procedure Sulferize_UPC:1 from the master recipe of the second example.
Figure 86:
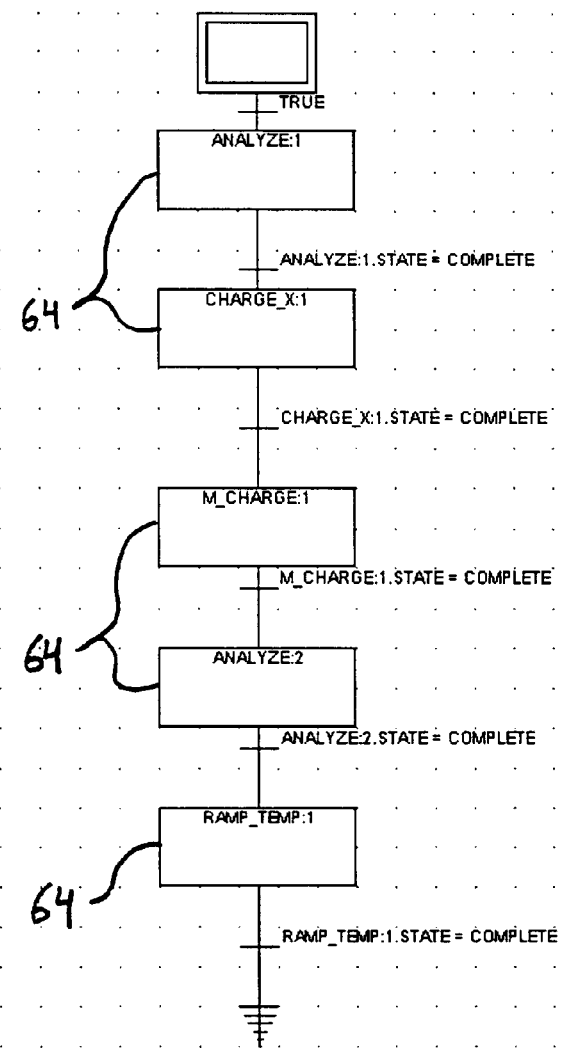
FIG. 86 shows a the detailed Procedure Flow Chart for the unit procedure Esterify_UPC:1 from the master recipe of the second example.

FIG. 84 depicts the ※ Sulferize_UOP:1※ unit operation which is the only unit operation 52 underlying the ※ Sulferize_UPC:1※ unit procedure 50 and FIG. 85 depicts the detailed procedure for the sulferize unit procedure in PFC format. FIG. 86 depicts the detailed procedure for the esterify unit procedure in PFC format and FIG. 87 depicts the detailed procedure for the separate unit procedure in PFC format. FIG. 88 provides a list of the process actions 62 from the general recipe 44 defined by FIGS. 72, 74, 80, and 81 and the recipe segment 64 for the master recipe 46 that correspond to the process actions of the general recipe. The recipe segments or the master recipe are defined by FIGS. 82 and 85–87. FIG. 88 provides each recipe segment for the master recipe of FIG. 82 in the column labeled ※ Recipe Segment.※ The process action from the general recipe of FIG. 72 that is performed by each corresponding recipe segment is given in the row for that recipe segment under the column labeled "Process Action.※ The process action 62 is identified by the name or identifier for the process action followed by an abbreviated process stage and index number identifier. The abbreviated process stage and index number identifier consists of a one or two character alpha prefix which stands for the process stage the process action is used in followed by the index number of the process action in the procedure for that stage. The alpha prefix is either ※ SU※ which stands for the "Sulferize_process stage, "E" which stands for the "Esterify※ process stage, or "SE※ which stands for the "Separate※ process stage. The Prefix "SU2" means that the process action listed in the "Process Action※ column of the table in FIG. 88 is used in the general recipe at index number 2 of the process stage ※ Sulferize※ (for which the detailed procedure is provided in FIG. 74). For example, the process action Add, SU2 listed in the FIG. 88 is used in the general recipe in the ※ Sulferize※ process stage at index number 2. The corresponding recipe segment which performs that process action in the general recipe is ※ Charge:1.※ This recipe segment is used in the detailed procedure for the unit procedure ※ Sulferize_UPC:1※ shown in FIG. 85.

It should be noted that each of the recipe segments 64 used in the master recipe 46 includes a recipe segment name, such as ※ Charge※ or ※ Charge_B※, followed by a colon and a number, for example ⌘ Charge:1,⌘ ⌘ Change-B:1.⌘ The numeric suffix following the colon is added to make the recipe segment identifier in the master recipe unique. This is because each recipe segment may be used more than once in the master recipe. For example, the recipe segment "Charge⌘ is used twice in the unit procedure "Sulferize__UPC:1⌘ depicted in FIG. 85. The first time it is used the recipe segment is identified as ⌘ Charge:1⌘ and the second time it is used the recipe segment is identified as "Charge:2,⌘ thus keeping both recipe segment identifications unique.

FIG. 88 also identifies the unit 88 associated with the recipe segments 64 for the master recipe 46. The unit in which a specific recipe segment is performed is listed in the row for that recipe segment under the column labeled ⌘ Associated Unit⌘. If a material is associated with a recipe segment it is listed in the row for that recipe segment under the column labeled ⌘ Material.⌘ The column labeled ⌘ Class/Instance Based⌘ identifies if a particular recipe segment is class based or instance based, as discussed previously.

Figures 89, 90:
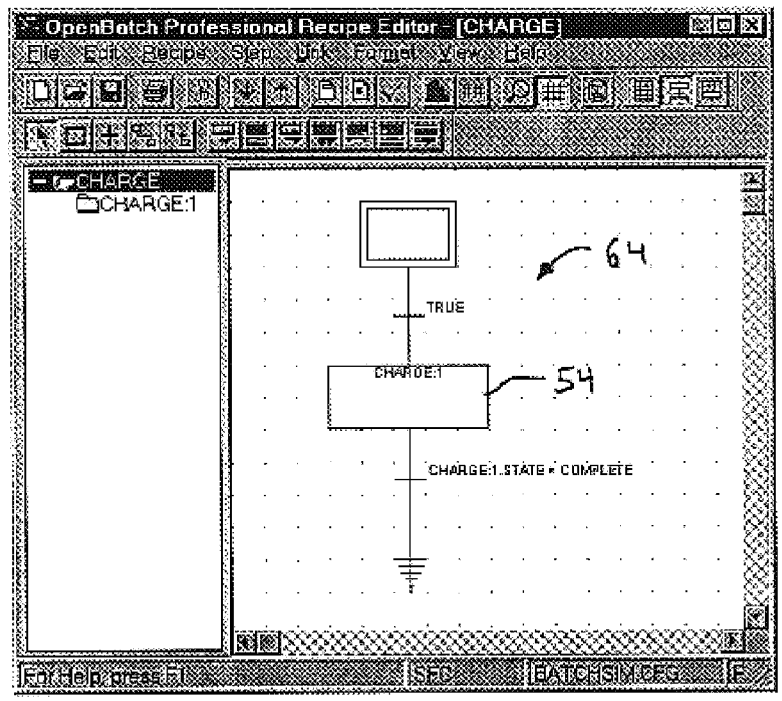
FIG. 89 shows a view from the OPENBATCH professional recipe editor in accordance with the preferred embodiments of the invention for a recipe segment from the master recipe of the second example.
FIG. 90 shows a view for mapping recipe segment parameters to process action parameters in accordance with the preferred embodiments of the invention.

FIG. 89 depicts the OPENBATCH⌘ professional Recipe Editor screen for the recipe segment charge which performs the process action ⌘ Add⌘ from the general recipe. In this case, the recipe segment 64 is composed of a single recipe phase 54, the recipe phase ⌘ Charge:1.⌘ FIG. 90 shows a screen for mapping recipe segments 64 to process actions 62 so that the recipe conversion algorithms know what the process action corresponding to a recipe segment is. The mapping equations include defining how the recipe segment parameters map to the corresponding process action parameters. In the case depicted in FIG. 90 the mapping between a ⌘ Change⌘ recipe segment and an process action is shown. This screen allows process action parameters to be mapped to the ⌘ Amount__to__Charge⌘ and ⌘ Flow__Rate⌘ recipe segment parameters. The mapping can be a numerical mapping, such a 100 gallons to 100 gallons or 100 gallons to 378.54 liters or the mapping could be in the form or an equation, such as Amount__to__Charge= Material Volume X Material Density.

Figure 91:
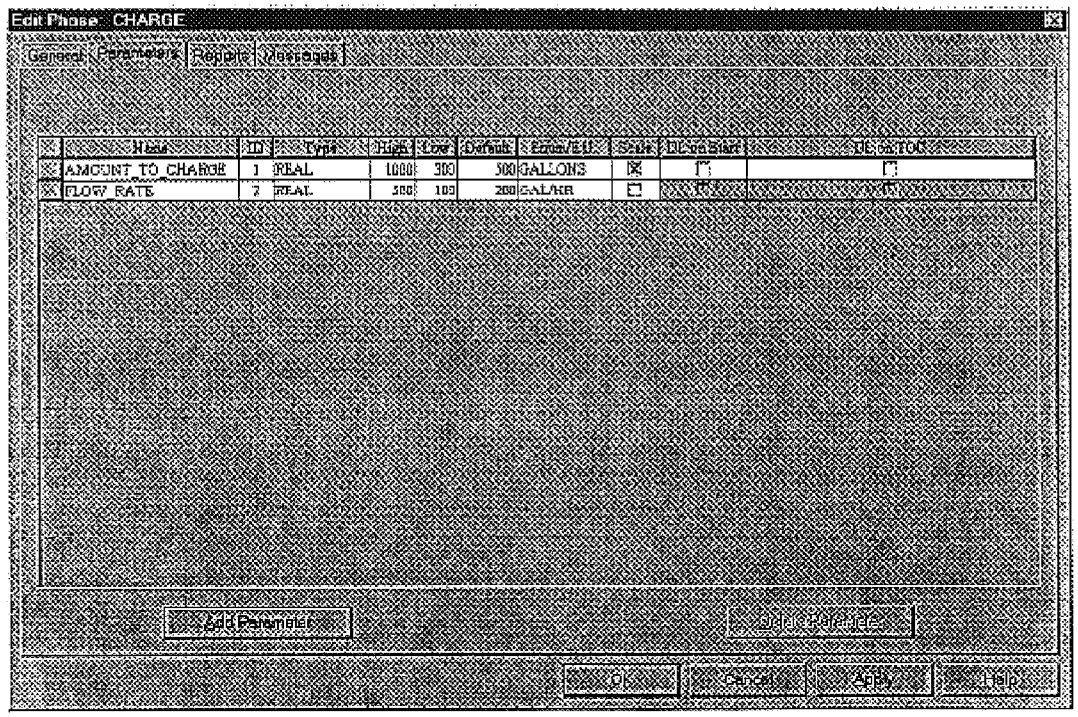
FIG. 91 shows a view for editing recipe phase parameters of the master recipe in accordance with the preferred embodiments of the invention.
Figure 92:
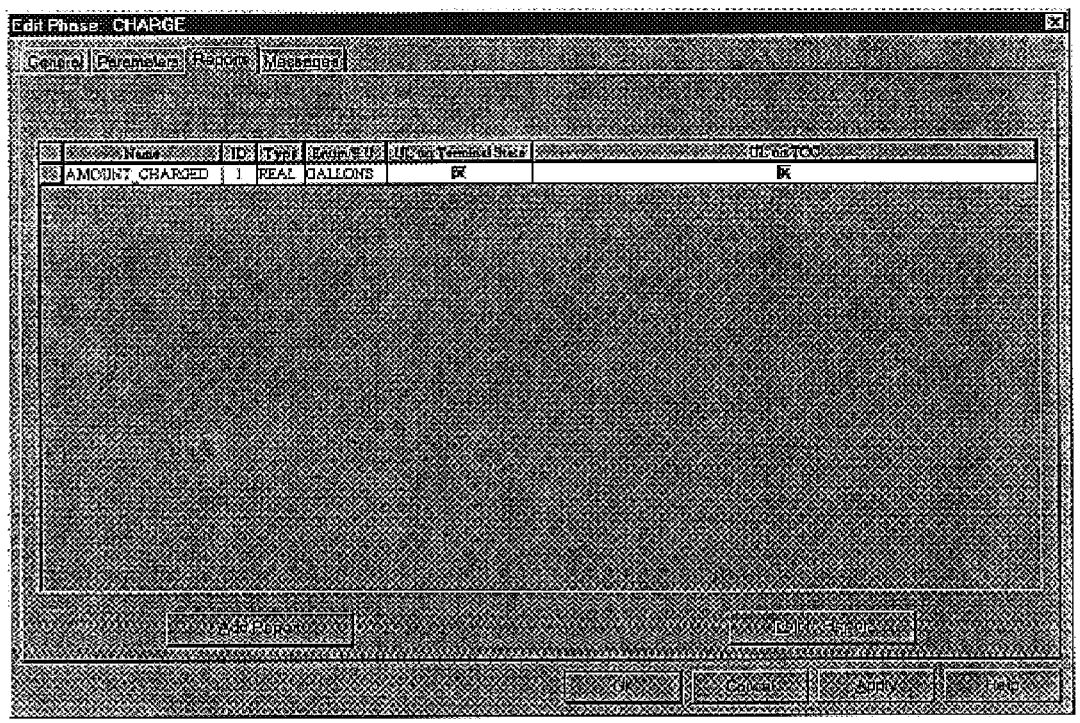
FIG. 92 shows a view for reviewing reports associated with recipe phases of the master recipe in accordance with the preferred embodiments of the invention.
Figure 93:
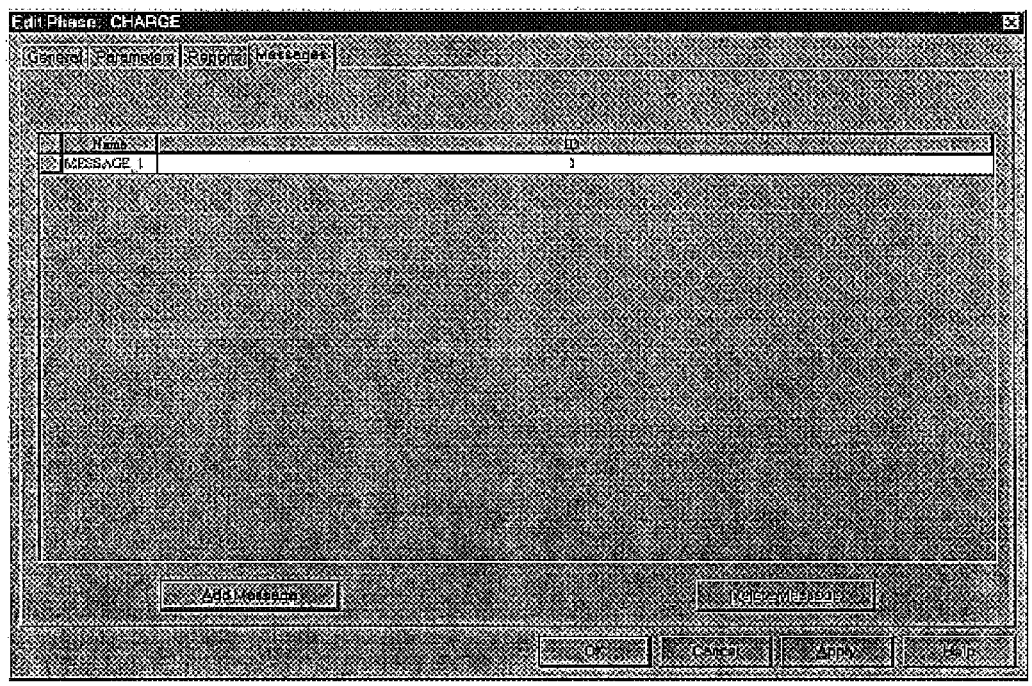
FIG. 93 shows a view for reviewing messages associated with recipe phases of the master recipe in accordance with the preferred embodiments of the invention.
Figure 94:
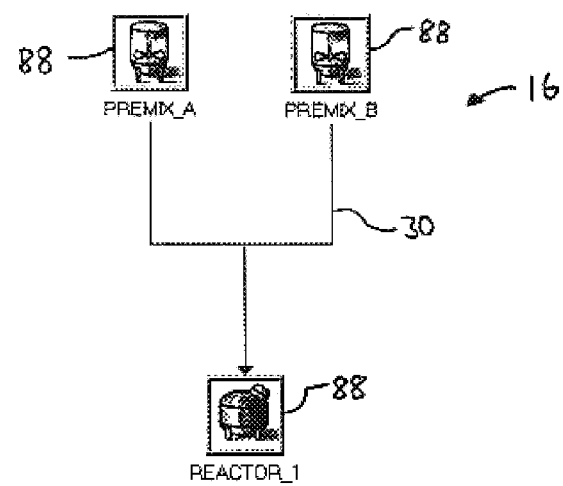
FIG. 94 shows the process cell configuration for the second example.

FIGS. 91 through 93 show the various properties pages underlying the recipe phase ⌘ Charge:1.⌘ The underlying properties pages include the general sheet, which provides header information, the parameters sheet which provides the parameters associated with the recipe phase 54, and the reports and messages sheets.

Figure 97:
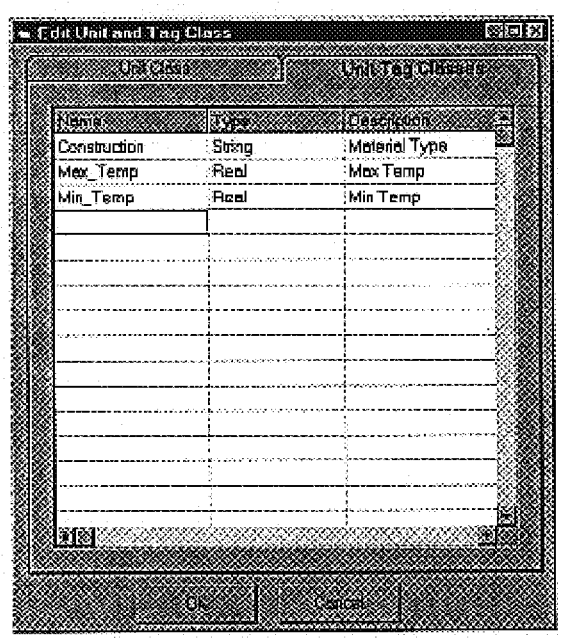
FIG. 97 is a view for editing equipment information associated with units in the process cell in accordance with the preferred embodiments of the invention.
Figure 98:
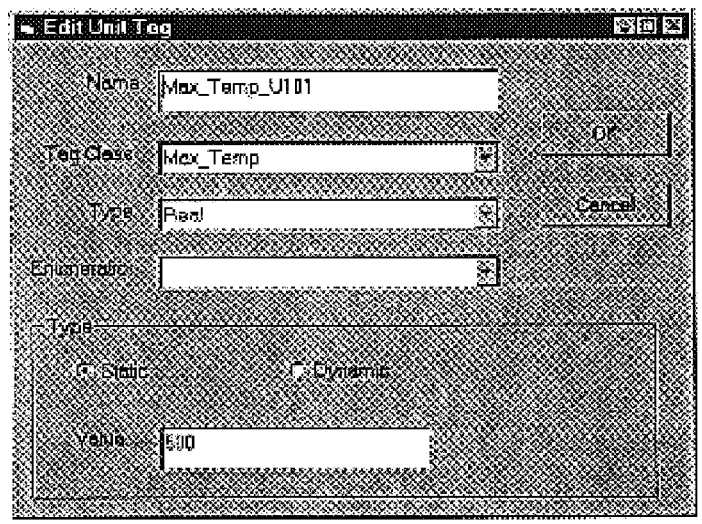
FIG. 98 is another view for editing equipment information associated with units in the process cell in accordance with the preferred embodiments of the invention.
Figure 99:
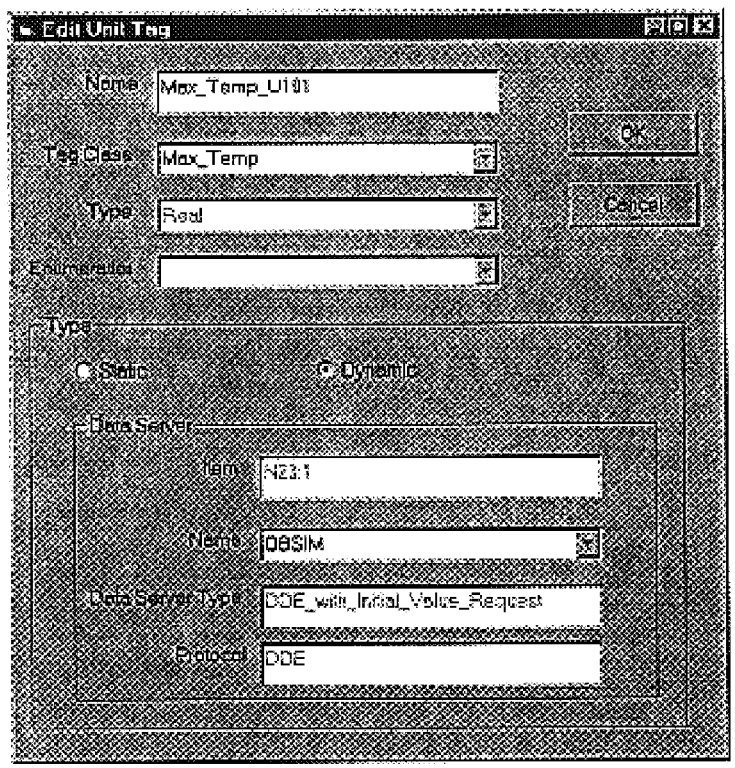
FIG. 99 is still another view for editing equipment information associated with units in the process cell in accordance with the preferred embodiments of the invention.

FIGS. 97 through 99 show the various screens for defining and editing the equipment information 86 associated with the units 88 in the process cell 14.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A method for automatically creating a set of master recipes from a general recipe using site information, each master recipe comprising a plurality of recipe segments, the general recipe comprising a plurality of process actions, each master recipe for manufacturing at least one product from at least one input material by performing the process actions on the at least one input material, each master recipe for use with a specific set of equipment in a process cell, each process action implemented on the set of equipment by at least one recipe segment, the general recipe for describing how to manufacture the at least one product from the at least one input material by performing the process actions on the at least one input material, the general recipe being independent of equipment, the method comprising:
   creating a list of recipe segments from the general recipe and the site information, the list of recipe segments including each process action in the general recipe and for each process action a listing of corresponding recipe segments capable of performing that process action in process cell; and
   creating the set of master recipes from the list of recipe segments, the general recipe, and the site information.

2. A method as recited in claim 1, wherein the method does not require human interaction.

3. A method as recited in claim 1, wherein each of the master recipes is for use with a single one of the process cells.

4. A method as recited in claim 1, wherein each of the master recipes comprises a data file.

5. A method as recited in claim 4, wherein the data file is inked with at least one OLE object.

6. A method as recited in claim 1, wherein the master recipe comprises a procedure flow chart.

7. A method as recited in claim 1, wherein the process cell includes a batch control system interfacing the set of equipment, the batch control system is for controlling the operation of the set of equipment, and each of the master recipes is for use with the batch control system to control the set of equipment in the process cell.

8. A method as recited in claim 7, wherein:
   the batch control system further includes a batch server in communication with at least one process connected device, the at least one process connected device interfacing the set of equipment, the at least one process connected device is for controlling the set of equipment, and the batch server is for controlling the process connected devices; and
   the master recipe is for use with the batch server to control the process connected devices to manufacture the at least one product.

9. A method as recited in claim 7, wherein the batch control system has a process control application residing on the batch control system, the process control application is for operating on the batch control system, and each master recipe is for execution by the process control application to control the set of equipment.

10. A method as recited in claim 1, wherein each master recipe includes a formula and equipment requirements.

11. A method as recited in claim 1, wherein each master recipe includes at least one unit operation.

12. A method as recited in claim 11, wherein each unit operation includes a procedure, a formula, and equipment requirements.

13. A method as recited in claim 1, wherein each master recipe includes at least one unit procedure.

14. A method as recited in claim 13, wherein each unit procedure includes a procedure, a formula, and equipment requirements.

15. A method as recited in claim 1, wherein:
   the recipe segments are organized into at least one segment path in the master recipe, the at least one segment path interconnected in a production path to form the master recipe;

the process actions are organized into at least one process branch in the general recipe, the at least one process branch interconnected in a dependency path to form the general recipe, each process branch having one or more corresponding segment paths which can perform the process branch on the set of equipment; and the second step includes
  a) dividing the general recipe into the dependency path and a collection of the at least one process branches,
  b) using the list of recipe segments to analyze each process branch in the collection of the at least one process branches and create a segment path series for the process branch, the segment path series including all the segment paths corresponding to the process branch, the analysis resulting in a collection of segment path series corresponding to the collection of the at least one process branch,
  c) using the collection of segment path series, the dependency path, and the site information to create a set of production paths, and
  d) using the set of production paths, the collection of segment path series, and the site information to create a set of master recipes.

16. A method as recited in claim 15, wherein the at least one process branch comprises two or more process branches.

17. A method as recited in claim 16, wherein:
each process branch has a branch end, and
the dependency path includes at least one material join, the at least one material join connecting at least two branch ends.

18. A method as recited in claim 15, wherein:
the at least one segment path is for processing at least one material separately without a material join from another segment path and the at least one process branch is for describing how to process the at least one material separately without a material join from another process branch; and
the at least one material comprises the at least one input material, the at least one product, or an intermediate material.

19. A method as recited in claim 1, wherein the general recipe comprises a data file.

20. A method as recited in claim 19, wherein the data file is linked with at least one OLE object.

21. A method as recited in claim 1, wherein the general recipe is comprises a process dependency chart.

22. A method as recited in claim 1, wherein the general recipe comprises a process sequence table.

23. A method as recited in claim 1, wherein the general recipe comprises a sequence function chart.

24. A method as recited in claim 1, wherein each general recipe includes a formula and equipment requirements.

25. A method as recited in claim 1, wherein each general recipe includes at least one process operation.

26. A method as recited in claim 25, wherein each process operation includes a procedure, a formula, and equipment requirements.

27. A method as recited in claim 1, wherein each general recipe includes at least one process stage.

28. A method as recited in claim 27, wherein each process stage includes a procedure, a formula, and equipment requirements.

29. A method as recited in claim 1, wherein the site information comprises a data file.

30. A method as recited in claim 1, wherein the site information comprises material flow information, recipe segment information, and equipment information.

31. A method as recited in claim 30, wherein the material flow information comprises information describing how material can flow between the set of equipment in the process cell.

32. A method as recited in claim 30, wherein the recipe segment information includes:
  a listing of all the recipe segments available to perform the process actions in the process cell; and
  a summary of the process action that each available recipe segment performs.

33. A method as recited in claim 32, wherein:
the set of equipment comprises units; and
the recipe segment information further includes a listing of the unit associated with each recipe segment and a listing of the at least one input material associated with each recipe segment.

34. A method as recited in claim 30, wherein the recipe segment information comprises operational limits associated with the process action that each recipe segment performs in the process cell.

35. A method as recited in claim 30, wherein the equipment information comprises equipment limits.

36. A method as recited in claim 1, wherein:
the set of equipment comprises units, each unit may have a unit start recipe segment or a unit end recipe segment associated with the unit, and
the equipment information comprises a list of the unit start recipe segments and the unit end recipe segments associated with each unit.

37. A method as recited in claim 1, wherein each recipe segment comprises a data file for performing the corresponding process action on the set of equipment.

38. A method as recited in claim 37, wherein the data file is linked with at least one OLE object.

39. A method as recited in claim 1, wherein each recipe segment comprises a recipe phase.

40. A method as recited in claim 1, wherein each recipe segment includes recipe segment parameters.

41. A method as recited in claim 1, wherein each recipe segment includes a procedure, a formula, and equipment requirements.

42. A method as recited in claim 1, wherein each of the process actions comprises a data file.

43. A method as recited in claim 1, wherein each of the process actions includes process action parameters.

44. A method as recited in claim 1, wherein the at least one input material and the at least one product are bulk materials.

45. A method as recited in claim 15, wherein:
  the site information includes optimization information;
  and the second step includes using the optimization information to select at least one optional production path from the set of production patls and creating the set of master recipes from the at least one optimal production path.

46. A method as recited in claim 45, wherein the selection information includes cycle time information and the selection criteria is used to select the at least one optimal production path which will produce the at least one product in the least time.

47. A method as recited in claim 45, wherein the selection information includes equipment path information and the selection criteria is used to select the at least one optimal production path which will produce the at least one product in the least numbers of equipment.

48. A method as recited in claim 45, wherein the selection information includes material transfer cost information and the selection criteria is used to select the at least one optimal production path which will produce the at least one product with the least material transfer costs.

49. A method as recited in claim 1, wherein the set of equipment has an equipment layout and the general recipe is independent of equipment layout.

50. A method for automatically creating a set of master recipes from a general recipe using site information, each master recipe comprising a plurality of recipe segments, the recipe segments organized into at least one segment path, the at least one segment path interconnected in a production path to form the master recipe, the general recipe comprising a plurality of process actions, the process actions organized into at least one process branch, the at least one process branch interconnected in a dependency path to form the general recipe, each master recipe for manufacturing at least one product from at least one input material by performing the process actions on the at least one input material, each master recipe for use with a specific set of equipment in a process cell, each process action implemented on the set of equipment by at least one recipe segment, each process branch having one or more segment paths which perform the process branch on the set of equipment, the general recipe for describing how to manufacture the at least one product from the at least one input material by performing the process actions on the at least one input material, the general recipe being independent of equipment, the site information including recipe segment information, material flow information, and equipment information, the method including the steps of:

a) creating a list of recipe segments from the general recipe and the site information, the list of recipe segments including each process action in the general recipe and for each process action a listers of corresponding recipe segments capable of performing that process action in the process cell;

b) dividing the general recipe into the dependency path and a collection of the at least one process branches;

c) using the list of recipe segments to analyze each process branch in the collection of the at least one process branches and create a segment path series for the process branch, the segment path series including all the segment paths corresponding to the process branch, the analysis resulting in a collection of segment path series corresponding to the collection of the at least one process branch;

d) using the collection of segment path series, the dependency path, and the site information to create a set of production paths; and e) using the set of production paths, the collection of segment path series, and the site information to create a set of master recipes.

51. A method as recited in claim 50, wherein the method does not require human intervention.

52. A method as recited in claim 50, wherein each master recipe is for use with a single process cell.

53. A method as recited in lain 50, wherein each master recipe comprises a data file.

54. A method as recited in claim 53, wherein the data file is linked with at least one OLE object.

55. A method as recited in claim 50, wherein each master recipe comprises a procedure flow chart.

56. A method as recited in claim 50, wherein the process cell includes a batch control system interfacing the set of equipment, the batch control system is for controlling the operation of the set of equipment, and each master recipe is for use with the batch control system to control the set of equipment in the process cell.

57. A method as recited in clam 50, wherein each master recipe includes at least one unit operation.

58. A method as recited in claim 50, wherein each master recipe includes at least one unit procedure.

59. A method as recited in claim 50, wherein the at least one process branch comprises two or more process branches.

60. A method as recited in claim 59, wherein: each process branch has a branch end, and the dependency path includes at least one material join, the at least one material join connecting at least two branch ends 61.

61. A method as recited in claim 50, wherein:

the at least one segment path is for processing at least one material separately without a material join from another segment path and the at least one process branch is for describing how to process the at least one material separately without a material join from another p process branch; and the at least one material comprises the at least one input material, the at least one product, or an intermediate material.

62. A method as recited in claim 50, wherein the general recipe comprises a data file.

63. A method as recited in claim 50, wherein the data file is linked with at least one OLE object.

64. A method as recited in claim 50, wherein the general recipe comprises a process dependency chart.

65. A method as recited in claim 50, wherein the general recipe comprises a process sequence table.

66. A method as recited in claim 50, wherein the general recipe comprises a sequence function chart.

67. A method as recited in claim 50, wherein each general recipe includes at least one process operation.

68. A method as recited in claim 50, wherein each general recipe includes at least one process stage.

69. A method as recited in claim 50, wherein the site information comprises a data file.

70. A method as recited in claim 50, wherein the recipe segment information includes:

a listing of all the recipe segments available to perform the process actions in the process cell; and a summary of the process action that each available recipe segment performs.

71. A method as recited in claim 50, wherein each recipe segment comprises a data file for performing the corresponding process action on the set of equipment.

72. A method as recited in claim 71, wherein the data file is inked with at least one OLE object.

73. A method as recited in claim 50, wherein each recipe segment comprises a recipe phase.

74. A method as recited in claim 50, wherein each process action comprises a data file.

75. A method as recited in claim 50, wherein:

the site information includes optimization formation; and the method includes using the optimization information to select at least one optimal production path from the set of production paths and creating the set of master recipes,from the at least one optimal production path.

76. A method for automatically creating a set of master recipes from a general recipe using site information, each master recipe comprising a plurality of recipe segments, the recipe segments organized into at least one segment path, the at least one segment path interconnected in a production path to form the master recipe, the general recipe comprising a plurality of process actions, the process actions organized into at least one process branch, the at least one process branch interconnected in a dependency path to form the general recipe, each master recipe for manufacturing at least one product from at least one input material by performing the process actions on the at least one input material, each master recipe for use with a specific set of equipment in a process cell, each process action implemented on the set of equipment by at least one recipe segment, each process branch having one or more segment paths which perform the process branch on the set of equipment, the general recipe for describing how to manufacture the at least one product from the at least one input material by performing the process actions on the at least one input material, the general recipe being independent of equipment, the site information including recipe segment information, material flow information and equipment information, the method including the steps of a) creating a list of recipe segments from the general recipe and the recipe segment information, the list of recipe segments including each process action in the general recipe and for each process action a listing of corresponding recipe segments capable of performing that process action in the process cell;

b) dividing the general recipe into the dependency path and a collection of the at least one process branches;

c) using the list of recipe segments and the material flow information to analyze each process branch in the collection of the at least one process branches and create a segment path series for the process branch, the segment pat series including all the segment paths corresponding to the process branch, the analysis resulting in a collection of segment path series corresponding to the collection of the at least one process branch;

d) using the collection of segment path series, the dependency path, and the material flow information to create a set of production paths; and e) using the set of production paths, the collection of segment path series, and the site information to create a set of master recipes.

77. A method as recited in claim 76, wherein the method does not require human intervention.

78. A method as recited in claim 76, wherein each master recipe is for use with a single process cell.

79. A method as recited in claim 76, wherein each master recipe comprises a data file.

80. A method as recited in claim 79, wherein the data file is linked with at least one OLE object.

81. A method as recited in claim 76, wherein each master recipe comprises a procedure flow chart.

82. A method as recited in claim 76, wherein the process cell includes a batch control system interfacing the set of equipment, the bath control system is for controlling the operation of the set of equipment, and each master recipe Is for use with the batch control system to control the set of equipment in the process cell.

83. A method as recited in claim 76, wherein each master recipe includes at least one unit operation.

84. A method as recited in claim 76, wherein each master recipe includes at least one unit procedure.

85. A method as recited in claim 76, wherein the at least one process branch comprises two or more process branches.

86. A method as recited in claim 85, wherein:
each process branch has a branch end, and
the dependency path includes at least one material join, the at least one material join connecting at least two branch ends.

87. A method as recited in claim 76, wherein:
the at least one segment path is for processing at least one material separately without a material join from another segment path and the at least one process branch is for describing how to process the at least one material separately without a material join from another process branch; and
the at least one material comprises the at least one input material, the at least one product, or an intermediate material.

88. A method as recited in claim 76, wherein the general recipe comprises a data file.

89. A method as recited in claim 88, wherein the data file is linked with at least one OLE object.

90. A method as recited in claim 76, wherein the general recipe comprises a process dependency chart.

91. A method as recited in clam 76, wherein the general recipe comprises a process sequence table.

92. A method as recited in claim 76, wherein the general recipe comprises a sequence function chart.

93. A method as recited in claim 76, wherein each general recipe includes at least one process operation.

94. A method as recited in claim 76, wherein each general recipe includes at least one process stage.

95. A method as recited in claim 76, wherein the site information comprises a data file.

96. A method as recited in claim 76, wherein the recipe segment information includes:
a listing of all the recipe segments available to perform the process actions in the process cell; and
a summary of the process action that each available recipe segment performs.

97. A method as recited in claim 76, wherein each recipe segment comprises a data file for performing the corresponding process action on the set of equipment.

98. A method as recited in claim 97, wherein the data file is linked with at least one OLE object.

99. A method as recited in claim 76, wherein each recipe segment comprises a recipe phase.

100. A method as recited in claim 76, wherein each of the process actions comprises a data file.

101. A method as recited in claim 76, wherein:
the site information includes optimization information; and
the method includes using the optimization information to select at least one optimal production path from the set of production paths and creating the set of master recipes from the at least one optimal production path.

102. A method for automatically seating a set of master recipes from a general recipe using site information, each master recipe comprising a plurality of recipe phases, the general recipe comprising a plurality of process actions, each master recipe for manufacturing at least one product from at least one input material by performing the process actions on the at least one input material by using recipe segments, the recipe segments comprising at least one recipe phase, each process action being performed by one recipe segment, each master recipe for use with a specific set of equipment in a process cell, each process action having one or more corresponding recipe segments that implement the process action on the set of equipment, the general recipe for describing how to manufacture the at least one product from the at least one input material by performing the process actions on the at least one input material, the general recipe being independent of equipment, the method comprising:

a first step of creating a list of recipe segments from the general recipe and the site information, the list of recipe segments including each process action in the general recipe and for each process action a listing of corresponding recipe segments capable of performing that process action in the process cell; and a second step of creating the set of master recipes from the list of recipe segments, the general recipe, and the site information.

103. A method as recited in claim 102, wherein the method does not require human intervention.

104. A method as recited i claim 102, wherein each master recipe is for use with a single process cell.

105. A method as recited in claim 102, wherein each master recipe comprises a data file.

106. A method as recited in claim 105, wherein the data file is linked with at least one OLE object.

107. A method as recited in claim 102, wherein each master recipe comprises a procedure flow chart.

108. A method as recited in claim 102, wherein the process cell includes a batch control system interfacing the set of equipment, the batch control system is for controlling the operation of the set of equipment, and each master recipe is for use with the batch control system to control the set of equipment in the process cell.

109. A method as recited in claim 102, wherein each master recipe includes at least one unit operation.

110. A method as recited in claim 102, wherein each master recipe includes at least one unit procedure.

111. A method as recited in claim 102, wherein:

the recipe segments are organized into at least one segment path in the master recipe, the at least one segment path interconnected in a production path to form the master recipe, the process actions organized into at least one process branch in the general recipe, the at least one process branch interconnected in a dependency path to form the general recipe, each process branch having one or more corresponding segment paths which can perform the process branch on the set of equipment, and the second step includes
a) dividing the general recipe into the dependency path and a collection of the at least one process branches,
b) using the list of recipe segments to analyze each process branch in the collection of the at least one process branches and create a segment path series for the process branch, the segment path series including all the segment paths corresponding to the process branch, the analysis resulting in a collection of segment path series corresponding to the collection of the at least one process branch,
c) using the collection of segment path series, the dependency path, and the site information to create a set of 5 production paths, and
d) using the set of production paths, the collection of segment path series, and the site information to create a set of master recipes.

112. A method as recited in claim 111, wherein the at least one process branch comprises two or more process branches.

113. A method as recited in claim 112, wherein:
each process branch has a branch end, and
the dependency path includes at least one material join, the at least one material join connecting at least two branch ends.

114. A method as recited in claim 102, wherein:
the at least one segment path is for processing at least one material separately without a material join from another segment path and the at least one process branch is for describing how to process the at least one material separately without a material join from another process brand; and
the at least one material comprises the at least one input material, the at least one product, or an intermediate material.

115. A method as recited in claim 102, wherein the general recipe comprises a data file.

116. A method as recited in claim 115, wherein the data file is linked with at least one OLE object.

117. A method as recited in claim 102, wherein the general recipe comprises a process dependency chart.

118. A method as recited in claim 102, wherein the general recipe comprises a process sequence table.

119. A method as recited in claim 102, wherein the general recipe comprises a sequence function chart.

120. A method as recited in clam 102, wherein each general recipe includes at least one process operation.

121. A method as recited in claim 102, wherein each general recipe includes at least one process stage.

122. A method as recited in claim 102, wherein the site information comprises a data file.

123. A method as recited in claim 102, wherein the recipe segment information includes:
a listing of all the recipe segments available to perform the process actions in the process cell; and
a sublunary of the process action that each available recipe segment performs.

124. A method as reacted in claim 102, wherein each recipe segment comprises a data file for performing the corresponding process action on the set of equipment.

125. A method as recited in claim 124, wherein the data file is linked with at least one OLE object.

126. A method as recited in claim 102, wherein each process action comprises a data file.

127. A method as recited in claim 102, wherein:
the site information includes optimization information; and
the second step included using the optimization information to select at least one optimal production from the set of production paths and creating the set of master recipes from the at least one optimal production path.

* * * * *

UNITED STATES PATENT AND TRADEMARK OFFICE
CERTIFICATE OF CORRECTION

PATENT NO. : 6,834,370 B1
DATED : December 21, 2004
INVENTOR(S) : Dennis Brandl et al.

It is certified that error appears in the above-identified patent and that said Letters Patent is hereby corrected as shown below:

Title page,
Item [54], Title, "METHODS FOR CREATING MASTER RECIPES" should be
-- CREATING MASTER RECIPES FOR MANUFACTURING PRODUCTS --

Column 54,
Line 14, please insert -- the -- after "in"

Column 56,
Line 52, "optional" should be -- optimal --
Line 53, "patls" should be -- paths --

Column 57,
Line 34, "listers" should be -- listing --
Line 58, "lain" should be -- claim --

Column 58,
Line 3, "clam" should be -- claim --
Line 13, after "ends" delete "61."
Line 19, after "another" delete "p"
Line 51, "inked" should be -- linked --
Line 57, "formation" should be -- information --

Column 59,
Line 53, "bath" should be -- batch --
Line 54, "Is" should be -- is --

Column 60,
Line 49, "seating" should be -- creating --

Column 61,
Line 10, "i" should be -- in --

UNITED STATES PATENT AND TRADEMARK OFFICE
CERTIFICATE OF CORRECTION

PATENT NO. : 6,834,370 B1
DATED : December 21, 2004
INVENTOR(S) : Dennis Brandl et al.

It is certified that error appears in the above-identified patent and that said Letters Patent is hereby corrected as shown below:

Column 62,
Line 14, "brand" should be -- branch --
Line 28, "clam" should be -- claim --
Line 38, "sublunary" should be -- summary --

Signed and Sealed this

Twenty-fourth Day of May, 2005

JON W. DUDAS
*Director of the United States Patent and Trademark Office*